United States Patent [19]

Iwano et al.

[11] Patent Number: 5,537,501
[45] Date of Patent: Jul. 16, 1996

[54] OPTICAL CONNECTOR

[75] Inventors: Shiniichi Iwano; Ryo Nagase, both of Ibaraki-ken; Kazunori Kanayama, Tokyo; Etsuji Sugita, Tokyo; Yasuhiro Ando, Tokyo, all of Japan

[73] Assignee: Nippon Telegraph and Telephone Corporation, Tokyo, Japan

[21] Appl. No.: 360,358

[22] Filed: Dec. 21, 1994

Related U.S. Application Data

[63] Continuation-in-part of Ser. No. 22,391, Feb. 24, 1993, Pat. No. 5,404,416, which is a continuation of Ser. No. 773,212, Oct. 9, 1991, abandoned, which is a division of Ser. No. 616,981, Nov. 21, 1990, Pat. No. 5,121,454.

[30] Foreign Application Priority Data

| Nov. 24, 1989 | [JP] | Japan | 1-303185 |
| Dec. 1, 1989 | [JP] | Japan | 1-310680 |
| Mar. 2, 1990 | [JP] | Japan | 2-49546 |
| Apr. 16, 1990 | [JP] | Japan | 2-97774 |
| Aug. 20, 1990 | [JP] | Japan | 2-86416 U |
| Aug. 20, 1990 | [JP] | Japan | 2-217166 |

[51] Int. Cl.[6] ............................................. G02B 6/38
[52] U.S. Cl. ............................... 385/58; 385/56; 385/59; 385/60
[58] Field of Search ............................... 385/56, 59, 60, 385/58

[56] References Cited

U.S. PATENT DOCUMENTS

| 4,895,425 | 1/1990 | Iwano et al. |
| 5,121,454 | 6/1992 | Iwano et al. ........................ 385/59 |

FOREIGN PATENT DOCUMENTS

| 0119013 | 9/1984 | European Pat. Off. |
| 0156608 | 10/1985 | European Pat. Off. |
| 0223608 | 5/1987 | European Pat. Off. |
| 0228063 | 7/1987 | European Pat. Off. |
| 0307518 | 3/1989 | European Pat. Off. |
| 0307518 | 3/1989 | European Pat. Off. |
| 0330231 | 8/1989 | European Pat. Off. |
| 0339876 | 11/1989 | European Pat. Off. |
| 61-109189 | 7/1986 | Japan |
| 63-239407 | 3/1987 | Japan |

OTHER PUBLICATIONS

CS85-128, Low Cost High Performance Push-On-Lock (List continued on next page.)

*Primary Examiner*—Rodney B. Bovernick
*Assistant Examiner*—Robert E. Wise
*Attorney, Agent, or Firm*—Wigman, Cohen, Leitner & Myers

[57] ABSTRACT

To realize an optical fiber connector coupled or decoupled by simple insertion and removal operation without applying ferrule connecting force to other elements (package board or back panel), the optical connector comprises a first housing (33); a second housing (34); a third housing (36) slidably housed within the second housing; a first engage mechanism (37, 38) provided between the second and third housings, for engaging these two housings when the first and third housings are not coupled; a second engage mechanism (39, 40) provided between the first and third housings, for engaging these two housings when the first housing is coupled to second and third housings; a first release member (41) provided for the first housings, for releasing the first engage mechanism when the third housing is engaged to the first housing; and a second release member (42) provided for the second housing, for releasing the second engage mechanism when the second housing is coupled to the third housing or the first housing is decoupled from the second and third housings. Further, to allow the optical connector to be preferably applicable to a plug-in connector with the smallest possible dimensions and with the highest possible package density, a novel connector floating structure, a novel slidable ferrule supporting structure, a strong optical plug connecting mechanism, a reliable optical plug or jack insertion structure, a cleanable and replaceable connector jack, etc. are also disclosed.

2 Claims, 45 Drawing Sheets

OTHER PUBLICATIONS

Optical Fiber Connectors, Sugita, et al. Dec. 20, 1985, pp. 51–58 & 113.

C5970, F01 Type Connectors for Optical Fiber Cords, Jan. 1987, pp. 889–904.

Review of the Electrical Cummunications Laboratories, vol. 35, No. 5, Sept. 1987, "High Performance Push–Pull Coupling Single Fiber Connectors and Plug–In Fiber–Optic Connectors", pp. 529–533, Sugita, Shintaku and Sasakura.

Review of the Electrical Communications Laboratories, vol. 35, No. 5, Sep. 1987, Tokyo; pp. 529–533.

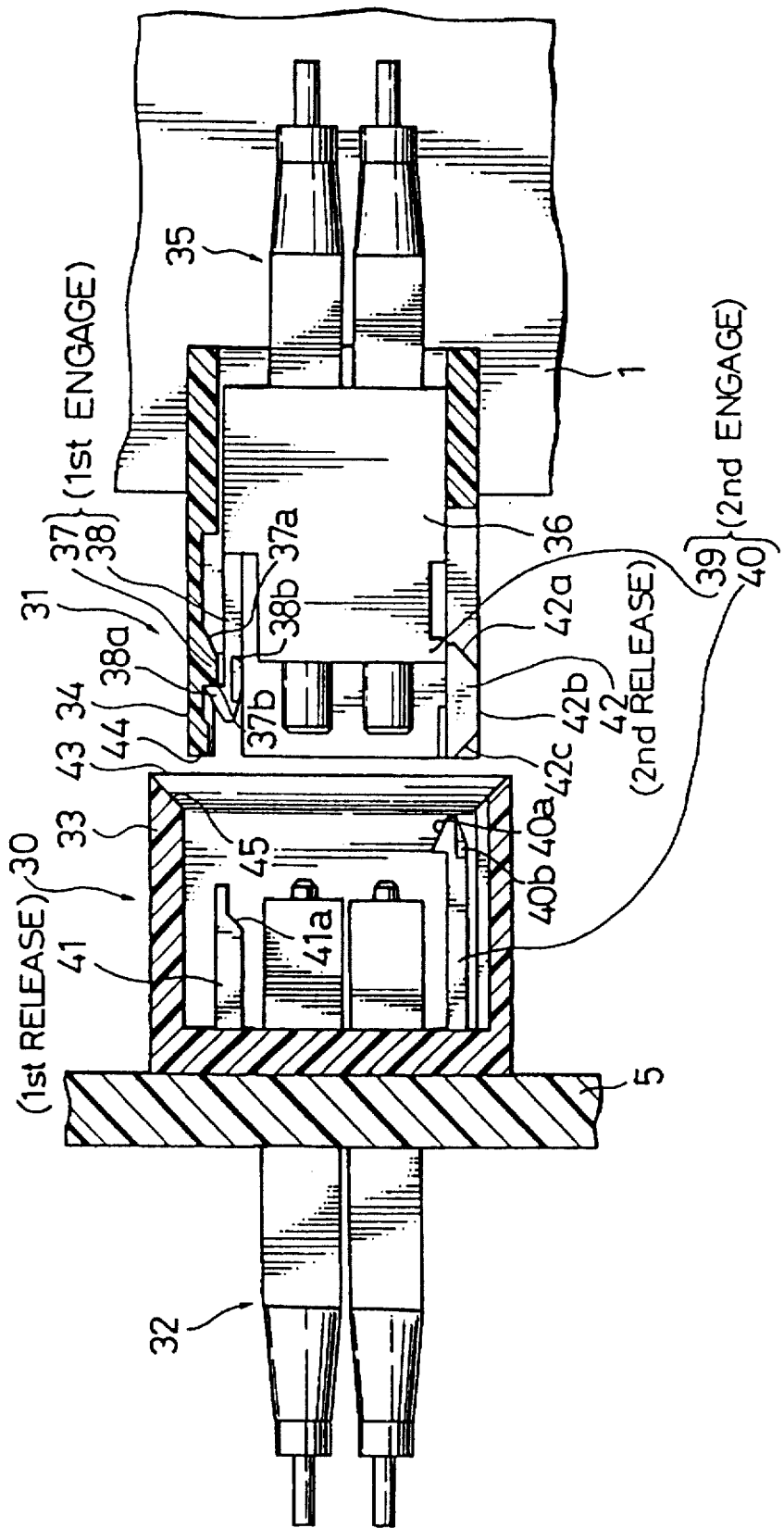

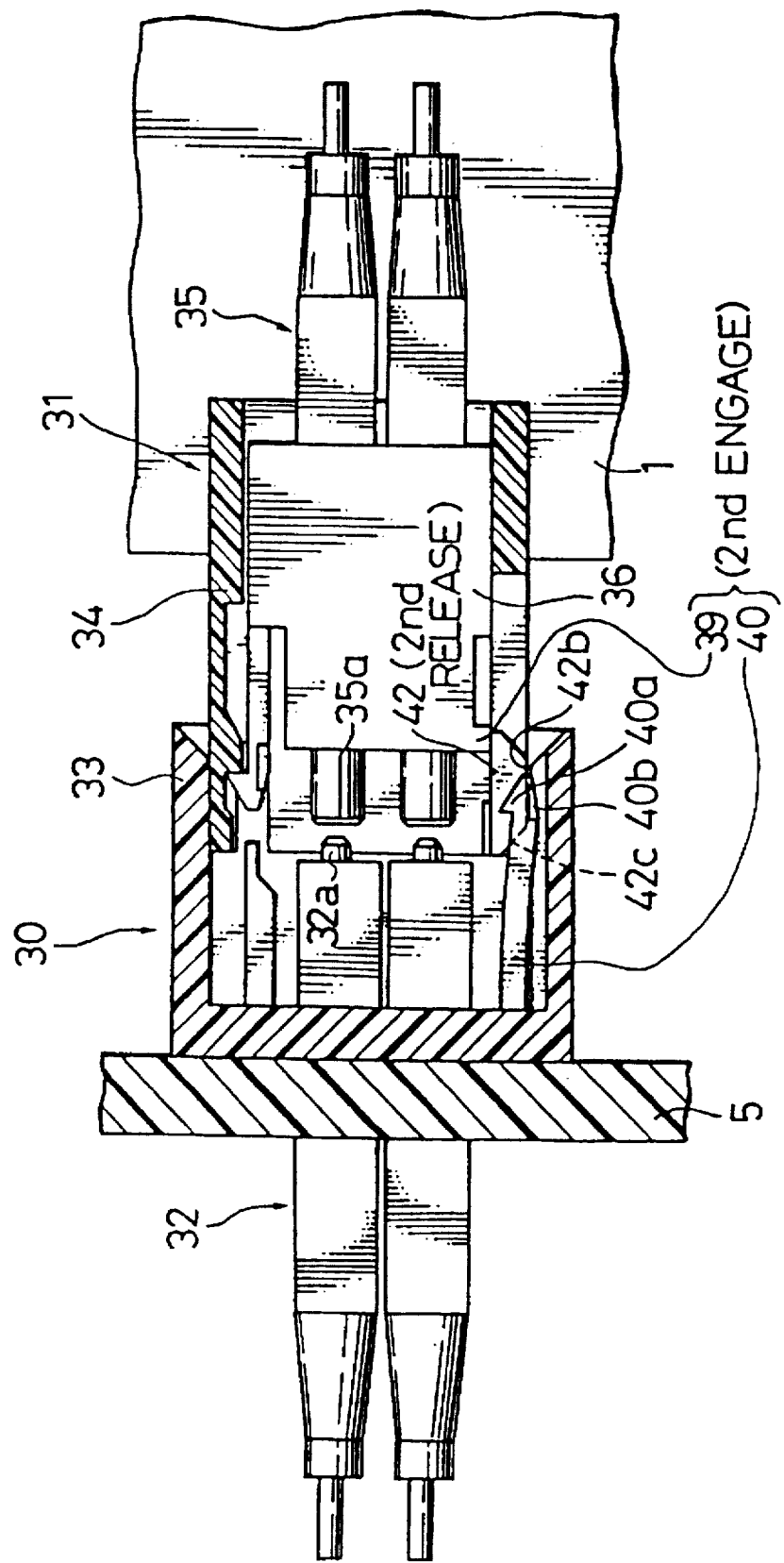

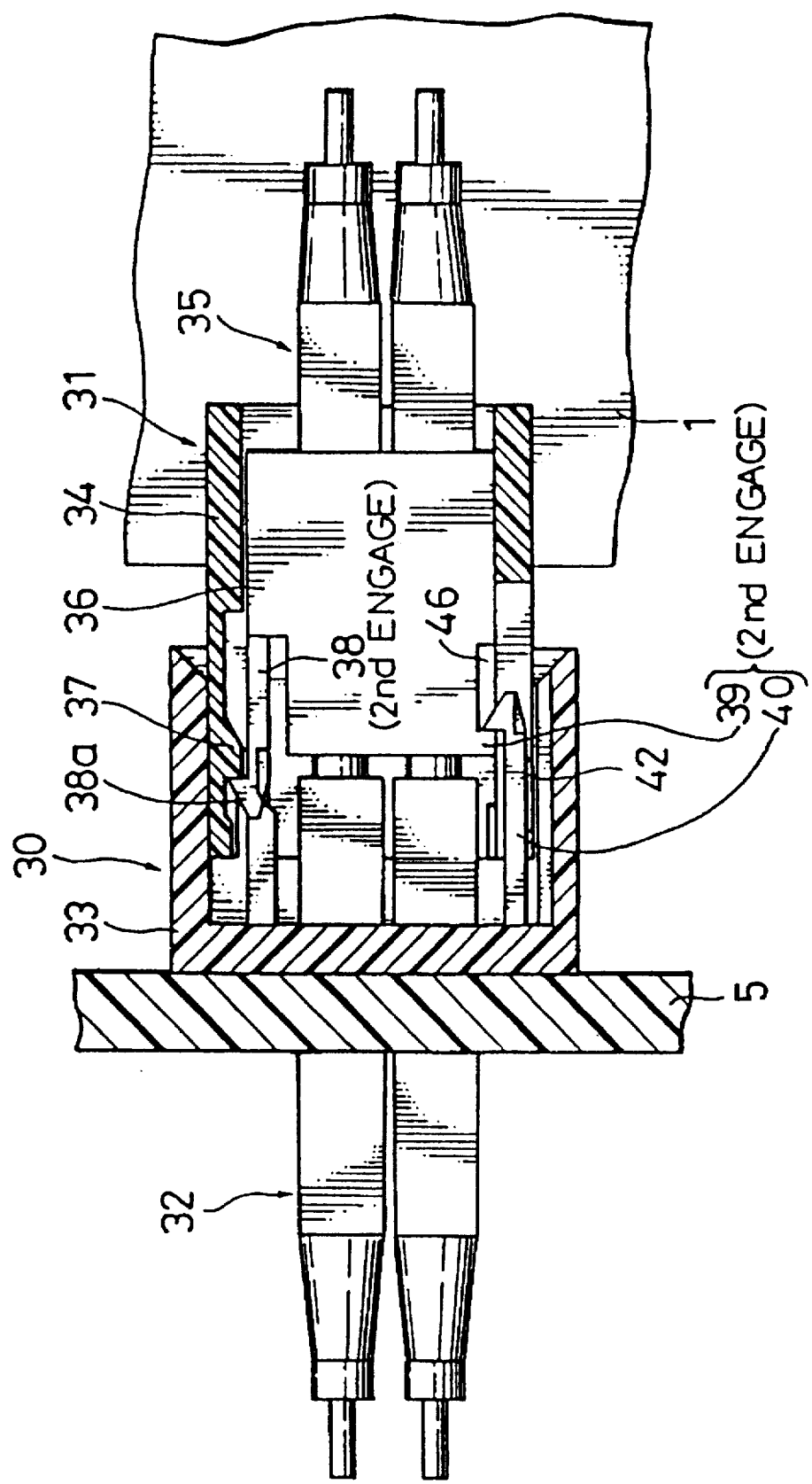

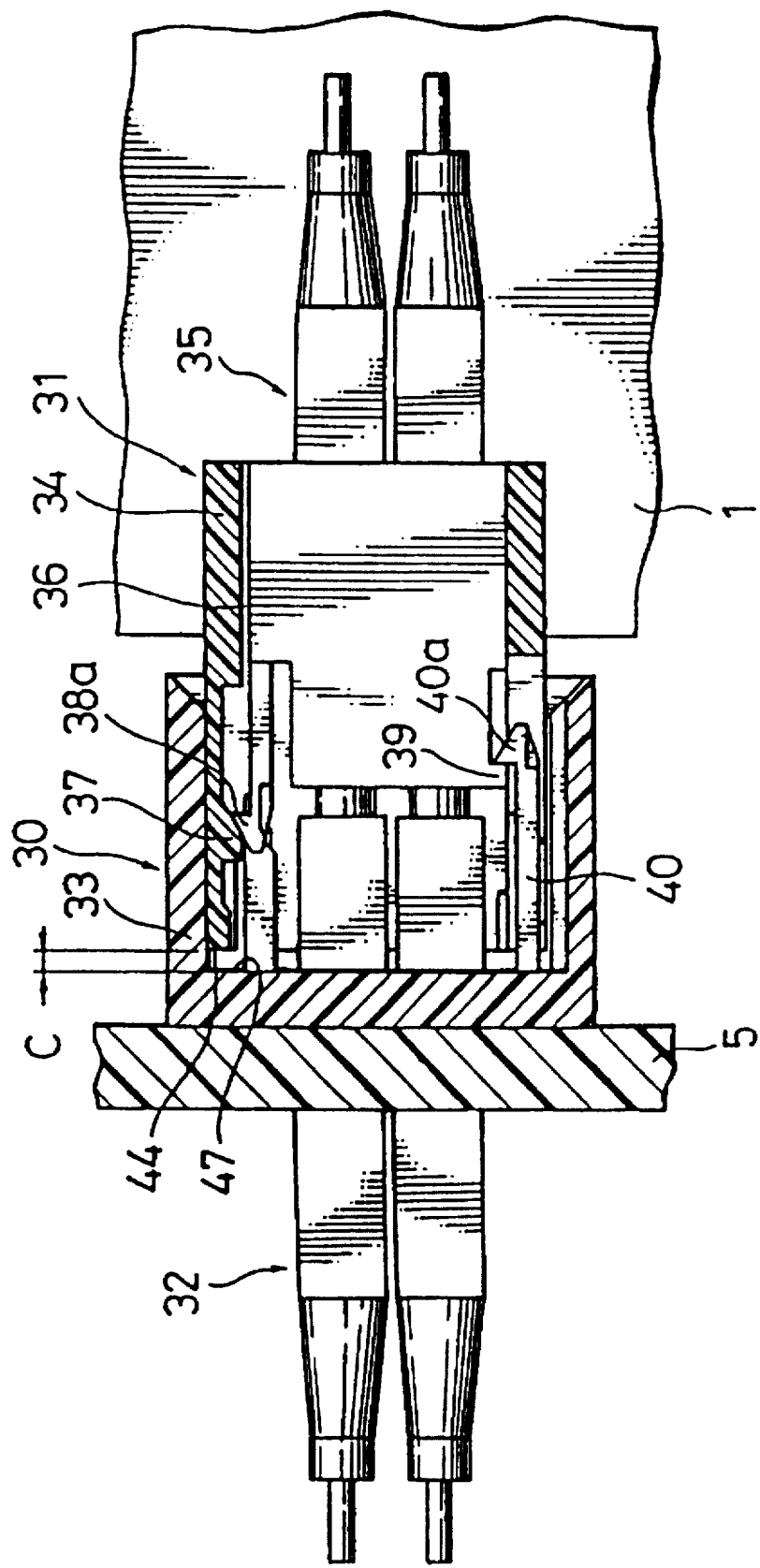

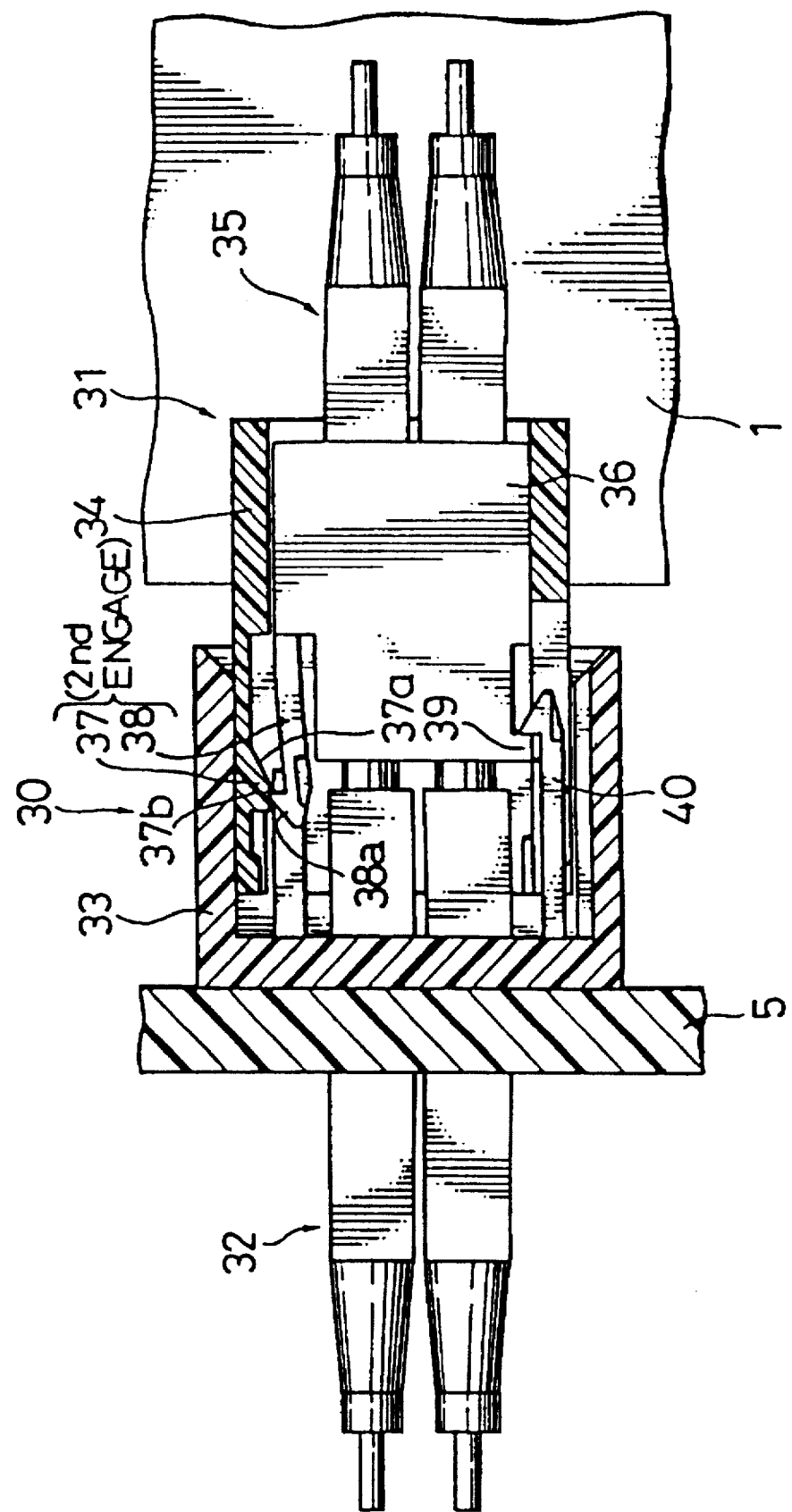

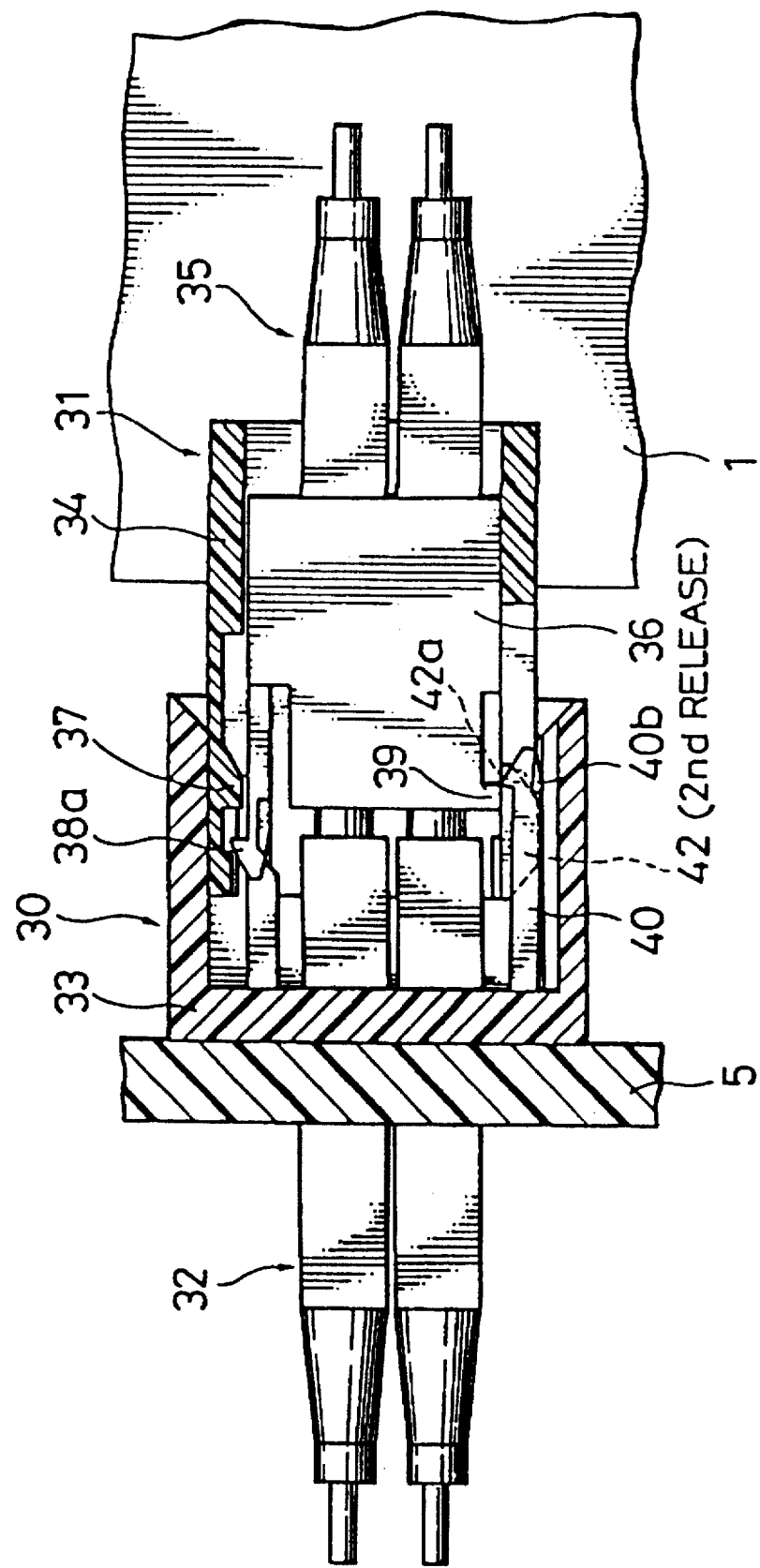

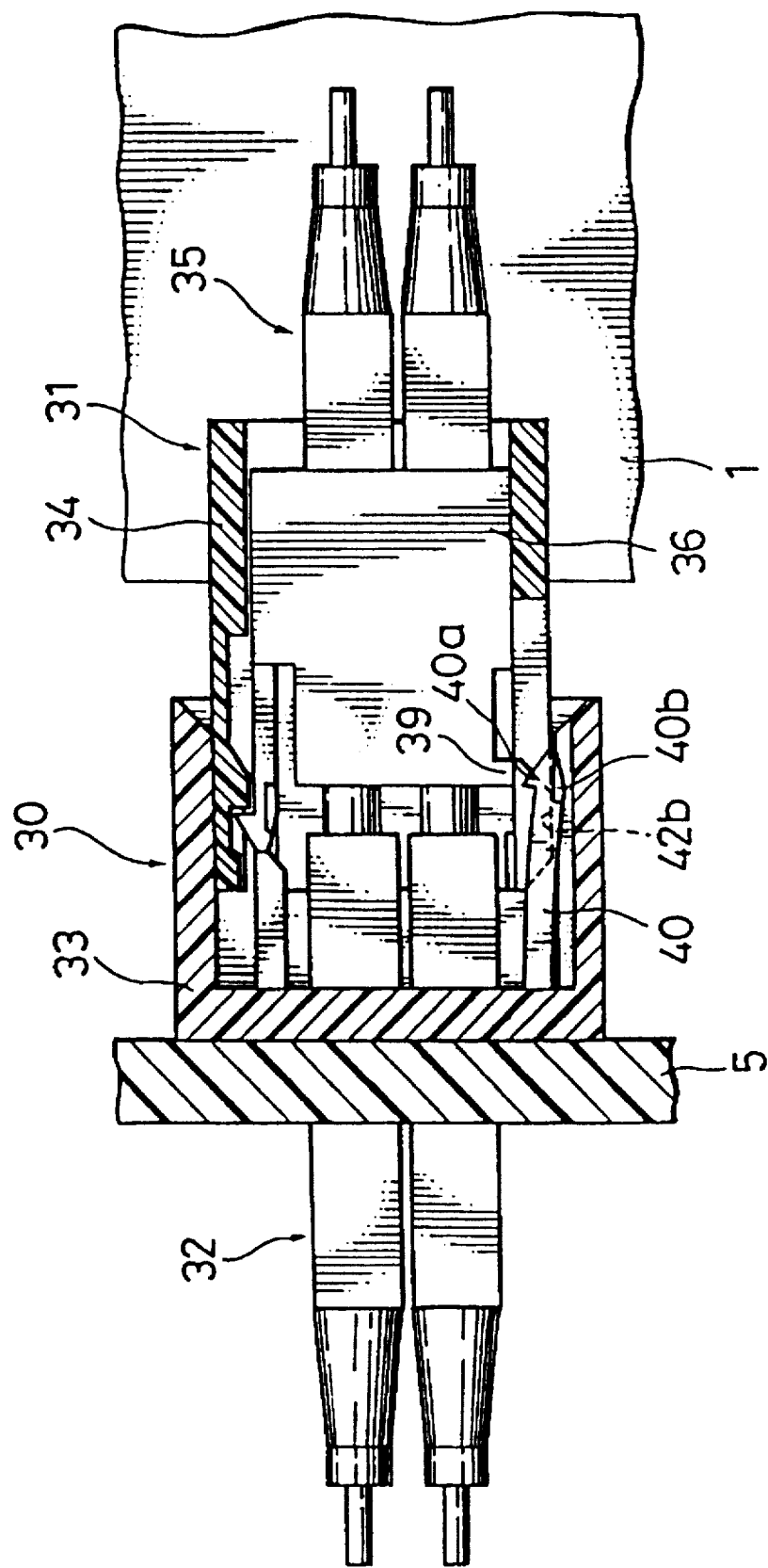

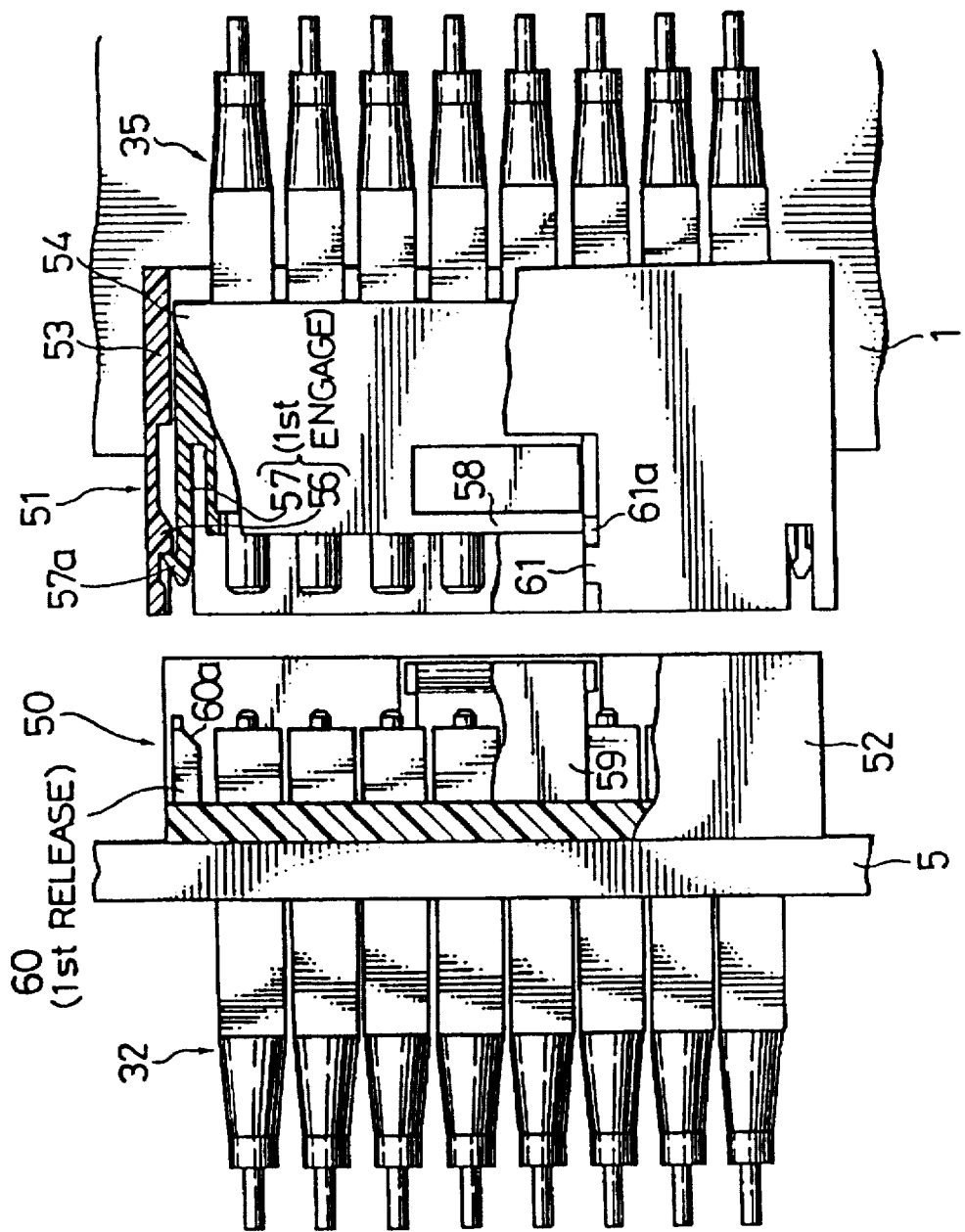

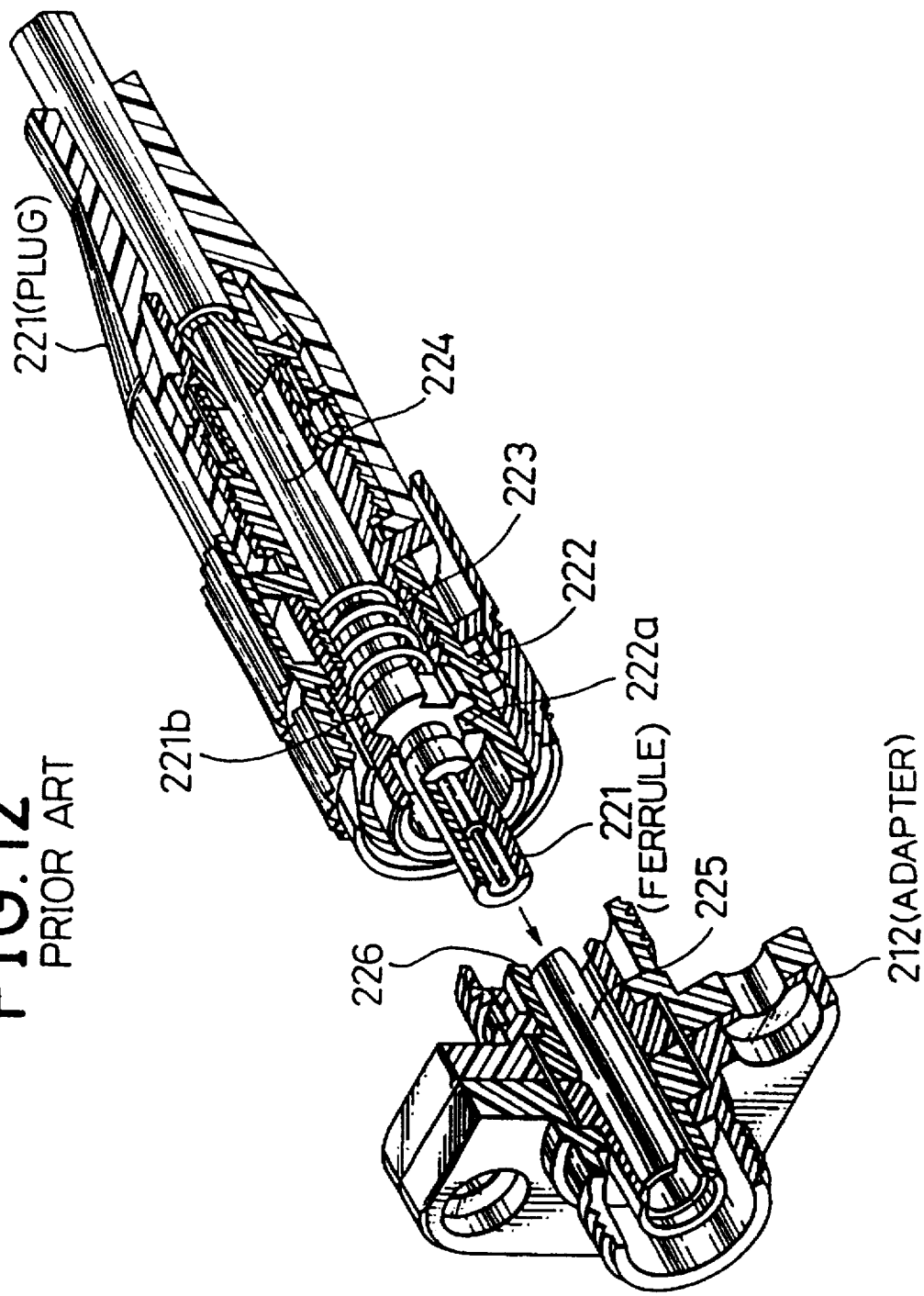

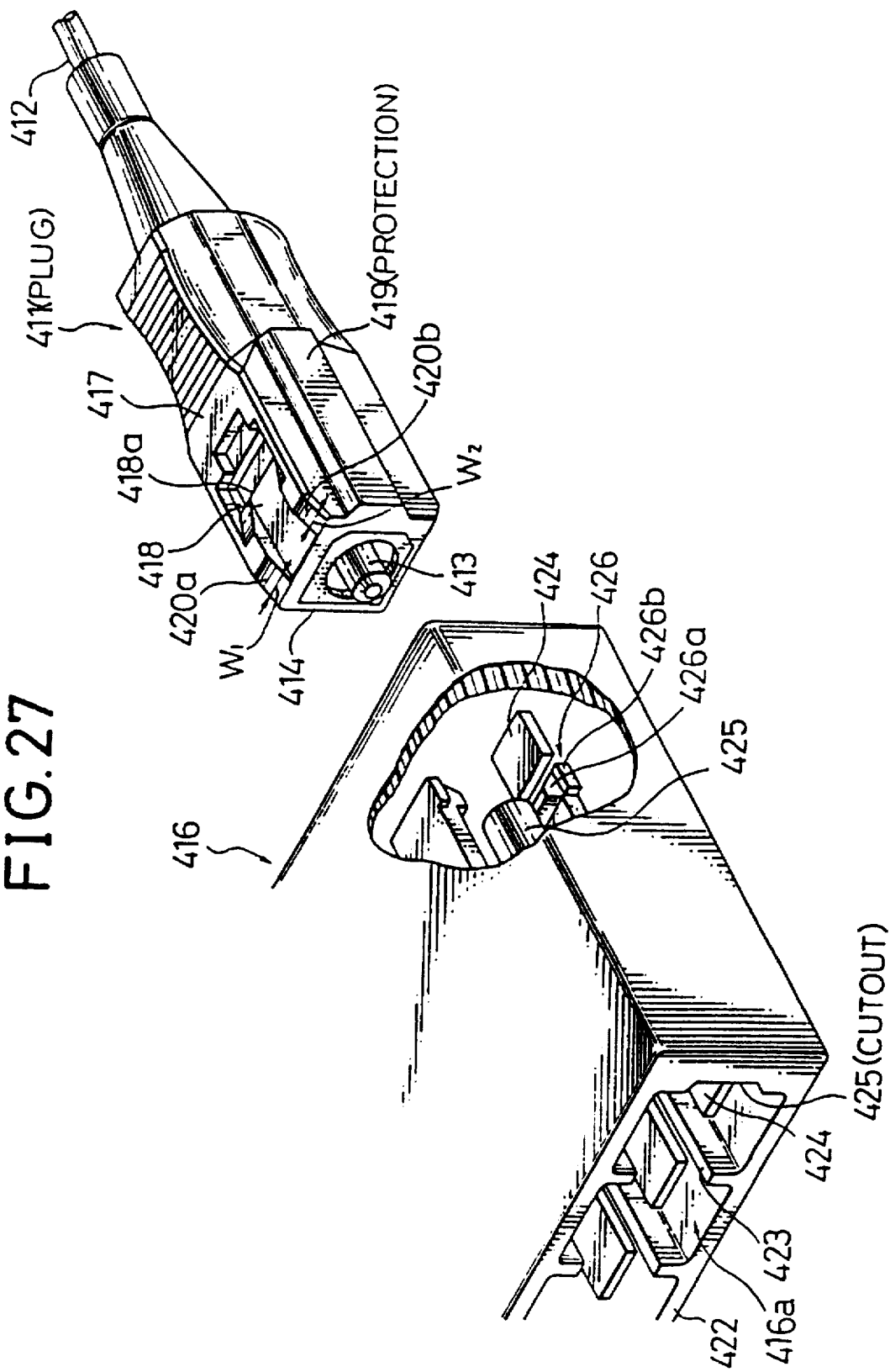

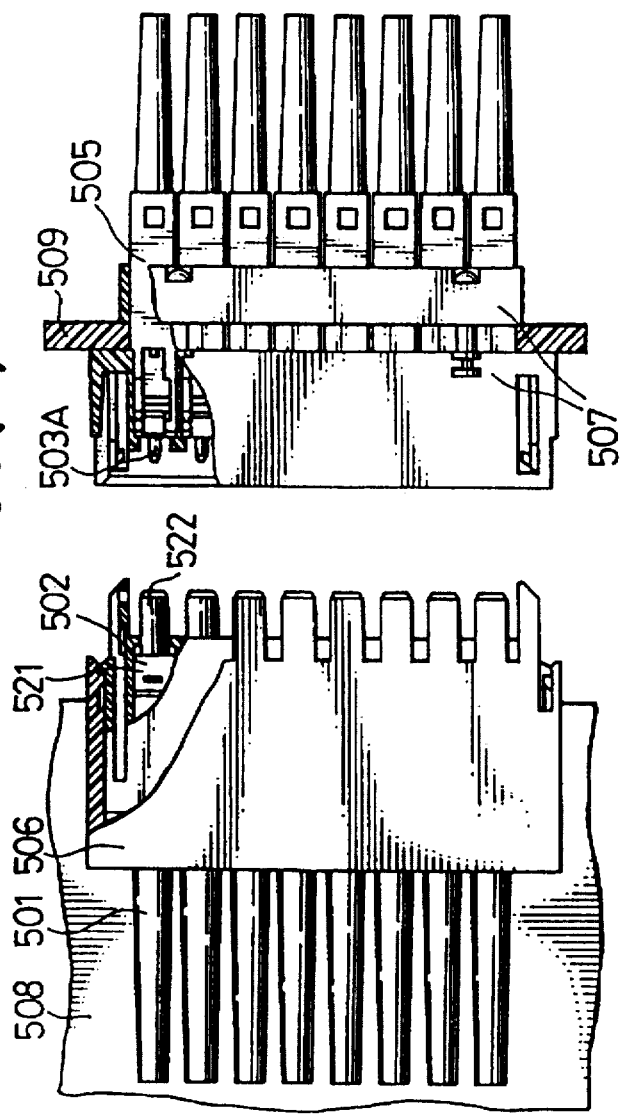
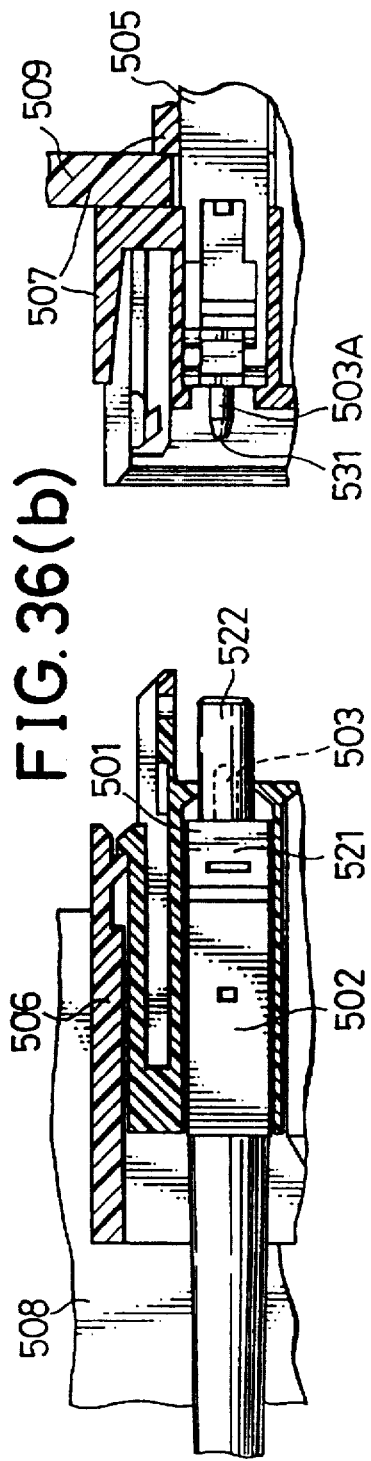
FIG.36(a)
FIG.36(b)

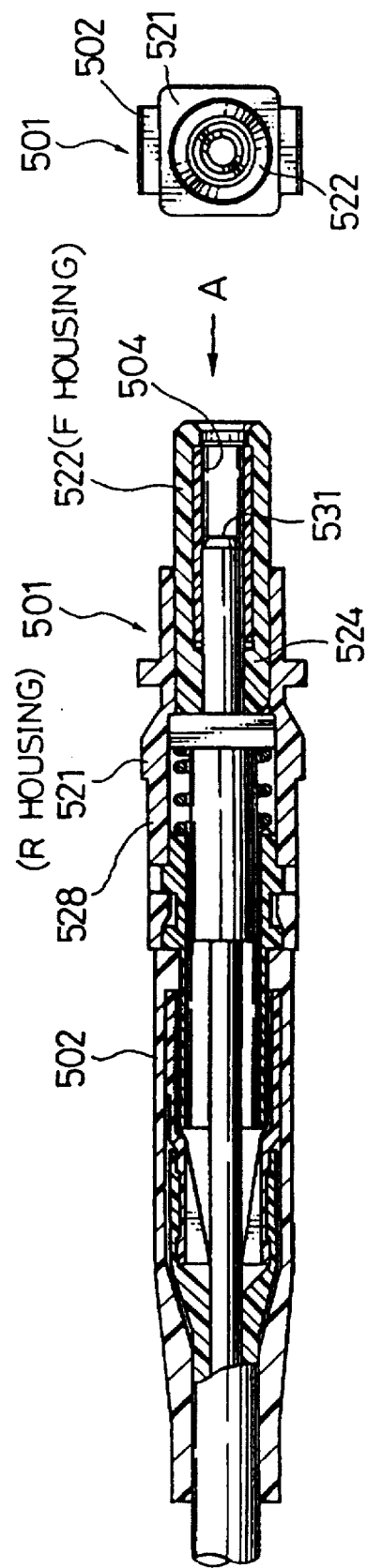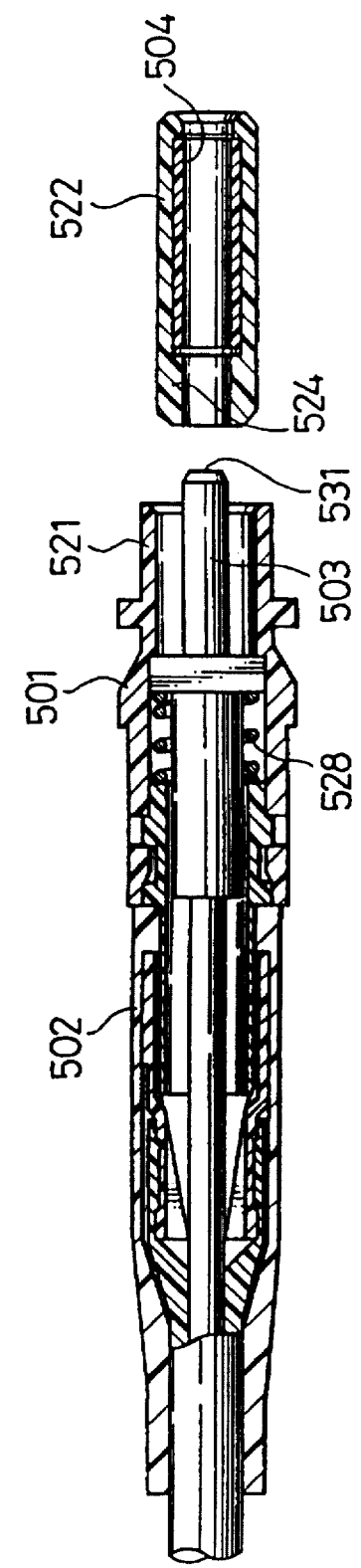
FIG. 37(a) FIG. 37(b)
FIG. 38

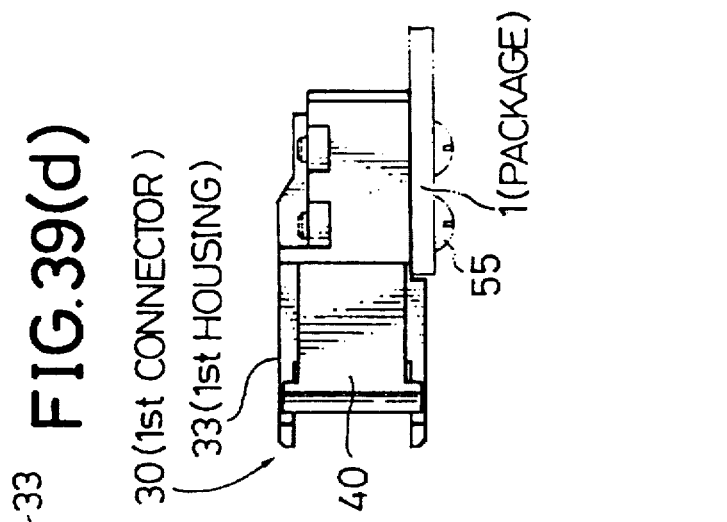
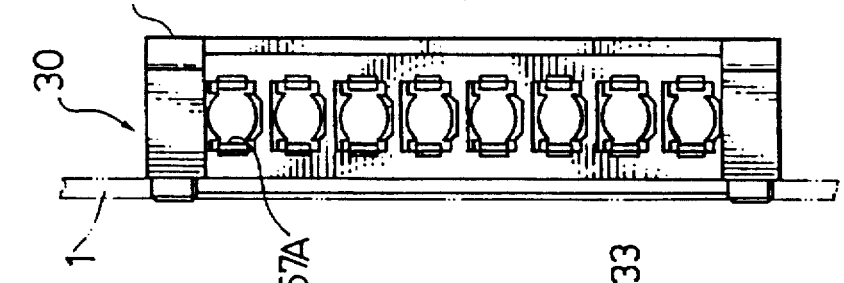
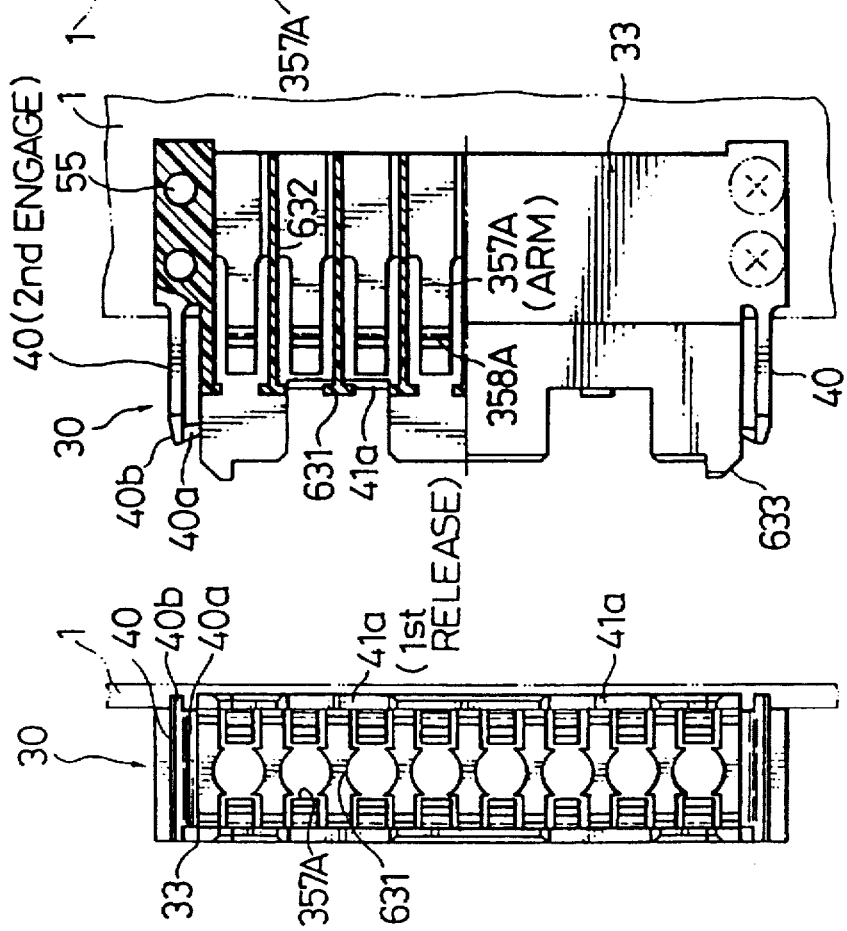

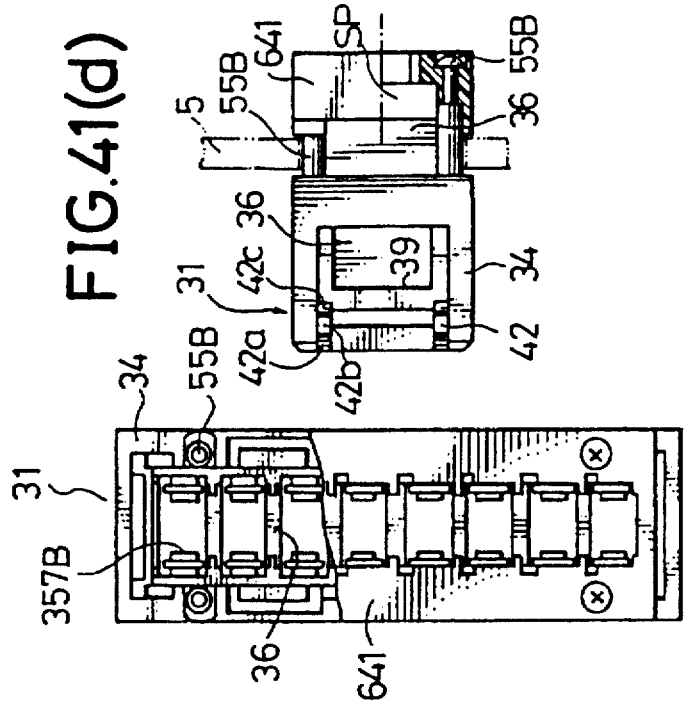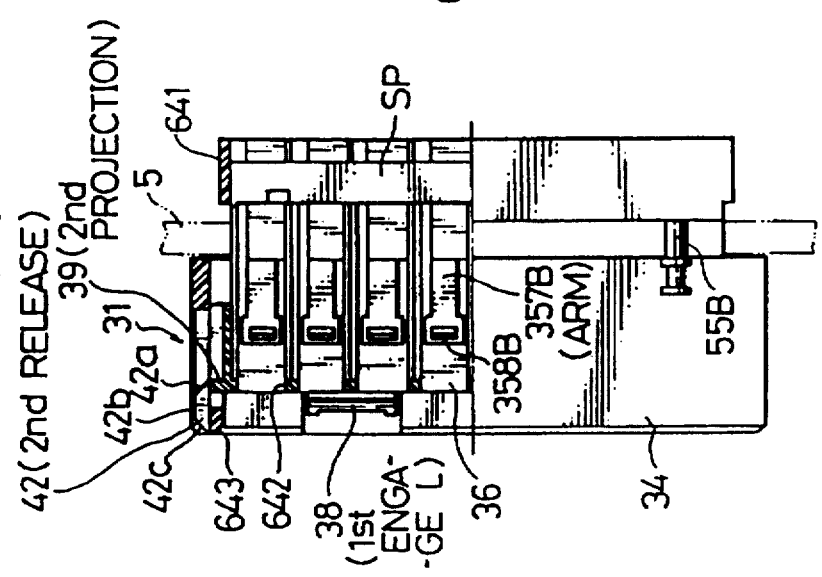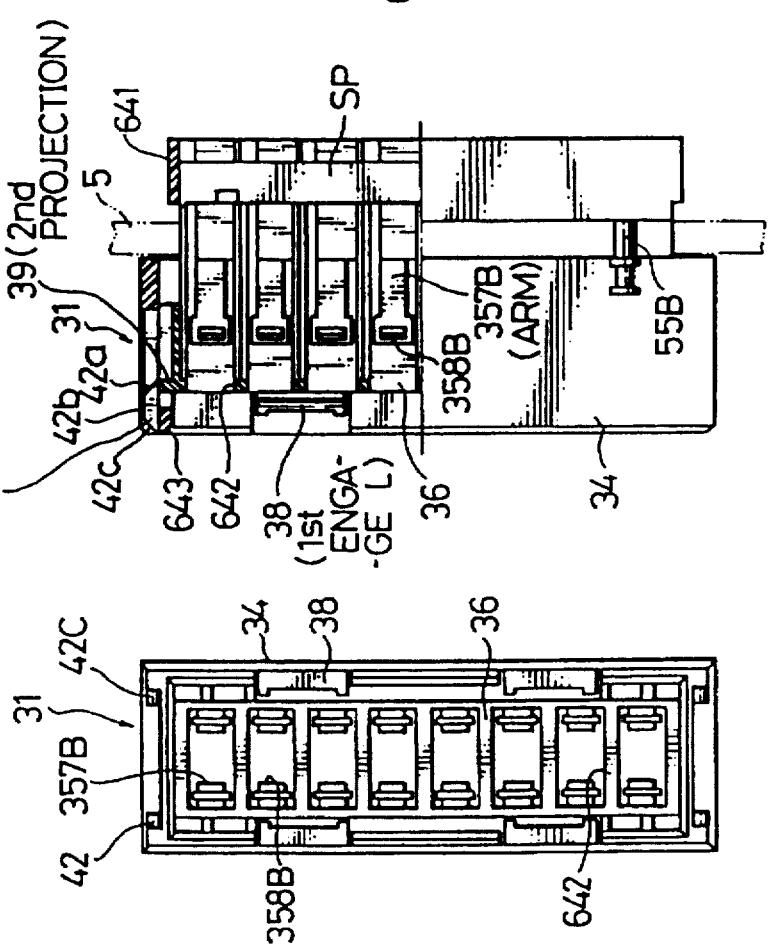

5,537,501

OPTICAL CONNECTOR

CROSS-REFERENCE TO RELATED APPLICATIONS

This application is a continuation-in-part of U.S. Ser. No. 08/022,391, filed Feb. 24, 1993 now U.S. Pat. No. 5,404, 416; which is a continuation of abandoned U.S. Ser. No. 07/773,212, filed Oct. 9, 1991, now abandoned, which is a divisional of U.S. Ser. No. 07/616,981, filed Nov. 21, 1990, now U.S. Pat. No. 5,121,454, issued Jun. 9, 1992.

BACKGROUND OF THE INVENTION

1. Field of the Invention

The present invention relates to an optical connector for connecting optical fibers, and more specifically to an optical fiber connector preferably applicable to a plug-in optical connector for removably connecting a number of package boards (on each of which various optical and electrical components or parts are mounted as a completed part subassembly) to a back panel perpendicular to the package board in book-shelf fashion to construct a high-density assembly unit.

2. Description of Prior Art

With the progress of higher optical performance in optical communication systems, a higher density assembly unit composed of so-called plug-in connectors is required more and more.

In the plug-in optical connector, it is required that a number of optical fibers must be simultaneously coupled to or decoupled from each other by a simple insertion and removal coupling operation. Further, since a number of optical fibers are coupled to each other under pressure within the connector housings, a certain connector housing locking mechanism is required to prevent the ferrule coupling pressure from being directly applied to the package board and the back panel via the connector housings.

Further, in an optical assembly unit, since a number of backage boards are connected to a back panel via plug-in connectors in book-self arrangement fashion, it is necessary to absorb an assembly error in the direction perpendicular to the axial direction of the optical connector element (plug and jack), without increasing the dimensions or the size of the optical connector.

In addition, since a number of optical connector elements (plug and jack) are simultaneously fitted to the plug-in optical connector, it is also necessary to absorb each dimensional and assembling error in the axial direction of the plug/jack. In absorption of the axial coupling error between the plug/jack and the connector, it is not preferable to increase the axial connector length; that is, it is necessary to stably support the plug/jack within the connector housing without increasing the axial length of the plug/jack.

Further, when an optical plug comprising a ferrule which is connected to an end of an optical fiber is fitted to the optical connector, a optical plug locking mechanism including elastic cantilever arm members with a claw at the free end thereof, are provided between the optical plug and the optical connector housing. However, since the locking mechanism is reduced in size more and more with increasing fiber arrangement density, it is necessary to more firmly lock the connector plug to the connector housing, even when a high tensile strength is applied to the optical fiber, in spite of a simple insertion and removal operation.

Further, when the optical plug is inserted into the optical connector, it is particularly preferable that the optical plug is easily fitted to the connector housing in a predetermined orientation to eliminate an axis alignment error between two mated optical ferrules in order to maintain high optical signal transmission characteristics.

Further, when an optical jack comprising a ferrule which is connected to an end of an optical fiber and an alignment sleeve is fitted to the optical connector, it is preferable that the ferrule end can be easily cleaned and further the ferrule alignment sleeve can be easily replaced with a new one, because the wear chip is produced within the ferrule alignment sleeve whenever the optical jack is coupled to or decoupled from the connector housing.

The structure and arrangement of the prior-art optical connector, plug, jack etc. will be described in more detail hereinafter with reference to the attached drawings under DETAILED DESCRIPTION OF THE PREFERRED EMBODIMENTS.

SUMMARY OF THE INVENTION

With these problems in mind, therefore, it is the primary object of the present invention to provide an optical connector which can be locked and unlocked by simple insertion and removal coupling operation to connect two mated optical fibers under pressure, without directly applying the ferrule coupling pressure to the package board and the back panel, while absorbing the optical connector element coupling error along the axial direction thereof.

It is the second object of the present invention to provide an optical connector which can absorb an assembly error in the direction perpendicular to the ferrule axial direction, without increasing the connector housing size.

It is the third object of the present invention to provide an optical connector which can slidably and stably support the optical connector element (ferrule) within the connector housing without increasing the axial length of the ferrule.

It is the fourth object of the present invention to provide an optical connector by which an optical plug can be firmly locked to the connector housing even when a high tensile force is applied to the optical fiber.

It is the fifth object of the present invention to provide an optical connector by which the optical plug can be always fitted to the connector housing in a predetermined orientation to eliminate an axis alignment mismatching between two mated optical ferrules.

It is the sixth object of the present invention to provide an optical connector having an optical jack whose ferrule can be easily cleaned and whose ferrule alignment sleeve can be easily replaced with a new one.

To achieve the above-mentioned first object, the optical connector according to the present invention comprises: (a) a first housing (33) for supporting at least one first optical plug or jack; (b) a second housing (34) coupled to said first housing; (c) a third housing (36) slidably coupled to and within said second housing (34) and also coupled to first housing (33), for supporting at least one second optical ferrule connected to said first optical ferrule; (d) first engage means (37, 38) provided between said second and third housings, for engaging said third housing with said second housing when said third housing is not coupled to said first housing; (e) second engage means (39, 40) provided between said first and third housings, for engaging said third housing with said first housing when said first housing is coupled to said second and third housings; (f) first release means (41) provided for said first housing, for releasing said first engage means when said third housing is being engaged to said first housing by means of said second engage means; and (g) second release means (42) provided for said second housing, for releasing said second engage means when said second housing is being coupled to said third housing, and said first housing is being decoupled from said second third housings. The first engage means comprises a first projection (37) formed in said second housing and a first elastic lever (38) formed in said third housing; and said first release means comprises a release member (41) for deforming said first elastic lever in a direction perpendicular to an axial direction of the plug and jack. The second engage means comprises a second projection (39) formed in said third housing and a second elastic lever (40) formed in said first housing, and said second release means comprises a release member (42) for deforming said second elastic lever in a direction perpendicular to an axial direction of the plug and jack. The first projection (37) is formed with a first projection engage surface (37b) and a first projection inclined surface (37a), said first elastic lever (38) is formed with a first lever claw (38a) engageable with said first projection engage surface (37b) and a first lever side projection (38a), and said first release member (41) is formed with a first release member inclined surface (41a) engageable with the first lever side projection (38a); when said second housing is coupled to said first housing, said first release member inclined surface (41a) is brought into contact with said first lever side projection (38a) to deform said first elastic lever (38) so that said third housing is decoupled from said second housing to allow said third housing to be axially slidable within said second housing; and when said second housing is decoupled from said first housing, said first projection inclined surface (37a) is brought into contact with said first lever claw (38b) to deform said first elastic lever (38) so that said third housing is coupled with said second housing. The second elastic lever (40) is formed with a second lever claw (40a) engageable with said second projection (39) and a second lever side projection (40b), and said second release member (42) is formed with a second release member first inclined surface (42c) and a second release member second inclined surface (42a); when said second housing is coupled to said first housing, said second release member first inclined surface (42c) is brought into contact with said second lever side projection (40b) to deform said second elastic lever so that said second housing is coupled to said first housing; and when said second housing is decoupled from said first housing, said second release member second inclined surface (42a) is brought into contact with said second lever side projection (40b) to deform said second elastic lever so that said second housing is decoupled from said first housing. Further, it is preferable that at least two said first engage means (37, 38), at least two said second engage means (39, 40), at least two said first release means (41), and at least two said second release means (42) are arranged in symmetry with respect to outer side surfaces of a connector housing of a plug-in optical connector in which a number of optical plugs and jacks arranged in a line can be connected simultaneously.

In the optical connector according to the present invention, the optical connector housing mounted on package can be engaged with and disengaged from the optical connector housing mounted on back panel of unit frame by only inserting and removing the elements into and from the unit frame; the connector itself is provided with a lock mechanism; and no specific precision is required with respect to the engagement position along the axial direction of the optical connector elements. Therefore, since the optical elements on the package side housing can be connected to the optical elements on the back panel side housing located deep into the unit frame by only inserting and removing the package board into and from the back panel, after the optical connector has been connected, no resiliency of the optical connector elements will be directly applied to the back panel in the case of the plug-in optical connector according to the present invention.

The functions of the optical connector according to the present invention will be summarized as follows:

In engagement, when the second connector comprising the second and third housings is coupled to the first connector comprising the first housing,
(1) the second connector is coupled to the first connector in condition that the second housing and the third housing are kept engaged,
(2) the first optical connector elements are connected to the second optical connector elements,
(3) the first housing of the first connector is engaged with the third housing of the second connector,
(4) the third housing is disengaged from the second housing, and
(5) further the dimensional error in the insertion direction can be absorbed by inserting the second housing.

In disengagement, when the second connector is removed from the first connector,
(1) the third housing is moved with the first housing,
(2) the second housing is engaged with the third housing,
(3) the third housing is disengaged from the first housing,
(4) the first optical connector elements are disconnected from the second optical connector elements, and
(5) the second connector is removed from the first connector.

To achieve the above-mentioned second object, the optical connector further comprises: plug-in connector housing floating means provided on one side surface of the connector housing in contact with a back panel or a package board (125) on which various optical and electrical parts are mounted as a subassembly unit. The floating means comprises: (a) a slot (133) formed with the back panel or package board in such a way that the slot extends in the direction perpendicular to the axial direction of the optical plug (35) or jack (124); (b) an axle member (127) fixed to said connector housing and slidably fitted into the said slot; and (c) a reverse side housing or a nut member (128) fixed to an end of said axle member so as to loosely sandwich the back panel or package board between said axle and a reverse side housing or nut members.

According to the present invention, it is possible to realize a simple and precious floating structure such that slot members formed with a float slot are fitted to through-holes formed in the package board; the float axle members of the housing are inserted into the float slots; and the nut members are fixed to the end of the float axle members. In this case, the floating condition can be controlled by a clearance between the float axle members and the slots of the slot members.

To achieve the above-mentioned third object, the optical connector further comprises an optical connector plug including: (a) a plug housing (202) formed with a shoulder portion (253) between a large hollow portion (254) and a small hollow portion (252) and formed no projection between said two portions; (b) a plug ferrule (201) connected to an optical fiber (204) and formed with a flange portion (201b) slidably fitted into the large hollow portion of said plug housing and an end portion (201a) passed through the small hollow portion of said plug housing; and (c) a spring (203) housed within said plug housing to urge the flange portion of said plug ferrule against the shoulder portion (253) of said plug housing. A mated jack ferrule (201) is fitted to the small hollow portion (252) of said plug housing (202) via a sleeve holder (206) having a floating slit sleeve (205) therewithin so as to absorb an axial dimensional fitting error between the plug ferrule and the jack ferrule by axially urging the flange portion (201b) of said plug ferrule by an inner end of the sleeve holder (206) against said spring (203).

According to the present invention, the ferrule is supported within the plug housing, and urged in the axial direction by the spring. When the sleeve holder is inserted from the ferrule support side into the plug housing, the sleeve holder is brought into contact with the flange portion of the ferrule passing through the shoulder portion against the urging force of the spring, so that the ferrule can be inserted deep further from the initial position to absorb the axial positional error.

To achieve the above-mentioned fourth object, each of said first and third housing (352) further comprises an elastic lever arm (357) axially extending forward and inwardly and having a claw (358) formed with an insertion inclined surface, an engage surface, and a side projection at a free end thereof, and the optical connector further comprises: (a) a plug housing (359) connected to an end of an optical fiber (361) and coupled to said housing, said plug housing having an outer engage projection (360); and (b) a knob block (362) slidably fitted between said housing and said plug housing, said knob block having an outer release projection (364) formed with an engage inclined surface and a release inclined surface. When said plug housing (359) is coupled to said housing (352), the engage inclined surface of the outer release projection (364) of said knob block (362) is brought into contact with said side projection of said inner elastic lever arm (357) of said first or third housing (352) to outwardly deform said inner lever arm so that said outer engage projection (360) is engaged with the engage surface of said inner elastic arm (357); when said plug housing (359) is decoupled from said first or third housing (352), the release inclined surface of the outer release projection (364) is brought into contact with the side projection of said inner elastic lever arm (357) to outwardly deform said inner lever arm so that said inner elastic arm is disengaged from said engage projection (360).

In the optical connector according to the present invention, when the optical plug is inserted into the connector housing, since the engage projections of the optical plug are brought into contact with the claws of the elastic arms provided for the connector housing to deform the elastic arms, the engage surfaces of the engage projections are engaged with the engage surfaces of the claws.

Under these conditions if the optical cord of the optical plug is pulled, although the force is transmitted to the claws via the engage projections, since the point of force application is offset from the base portion of the elastic arm relative to the connector housing, a moment is generated around the elastic arm in such a direction that the elastic arm end goes toward the optical plug side about the fixed end of the elastic arm. As a result, when a tensile force is applied to the optical cord in the direction that the optical plug is separated from the plug adapter, since the elastic arm end moves toward the optical plug side, the engage surface of the claw is further urged toward the engage surface of the engage projection, thus resulting in secure engagement conditions. On the other hand, when the optical plug is removed from the connector housing; that is when the knob block is gripped and the optical plug is pulled away from the connector housing, since the engage release projections of the blocks push upward the engage release side projections of the elastic arms of the connector housing, the elastic arms are deformed in the direction that the engage projections are removed from the claws. Therefore, when the optical cord is pulled, the optical plug can be removed from the connector housing.

To achieve the above-mentioned fifth object, said first or third housing (416) formed with at least one housing cutout (425) and at least two opposing housing projections (424), and the optical connector further comprises a square cross-section optical connector plug (411) formed with an axially extending plug projection (419) on one side surface thereof so as to be engaged with the housing cutout (425) and with two axially extending plug grooves (418) on two opposing side surfaces thereof so as to be engaged with the two opposing housing projections (424), an outside contour of said square optical connector plug being symmetrical with respect to a plane including an axial center of said connector plug and a middle portion of the plug projection but asymmetrical with respect to the axial center of said connector plug.

In the optical connector according to the present invention, when optical connector plugs are mounted on the connector housing at the highest possible mounting density, since the two opposing side surfaces are symmetrical with respect to a central plane parallel to the two opposing side surfaces but asymmetrical with respect to a central axis of the two opposing side surfaces, it is possible to prevent the optical connector plug from being inserted into the insertion hole of the connector housing in the erroneous mismatching direction opposite to the predetermined direction, thus securing a correct insertion of the plug into the housing at all times.

To achieve the above-mentioned sixth object, the optical connector further comprises an optical connector jack (501) having: (a) a rear housing (521) fitted to said connector housing; (b) a front housing (522) removably engaged with said rear housing; (c) an alignment sleeve (504) fixedly fitted into said front housing; (d) a ferrule (503) connected to an end of an optical fiber and fitted into said alignment sleeve so that a front end thereof extends frontward from the engagement position between said rear and front housings. The front and rear housings are removably engaged with each other via thread or friction.

In the connector jack according to the present invention, the front and rear housings can be removed easily by loosening the thread or releasing them against frictional force. Since the front housing is removed, the alignment sleeve in the front housing is easily removed from the jack for replacement with a new one. Further, after removal of the front housing, since the ferrule end surface projects from the rear housing, the ferrule end surface can be cleaned easily.

In the optical connector according to the present invention, although various features have been explained of the optical connector composed of two connector housings. Without being limited thereto, however, it is also possible to apply the features of the present invention to the optical adapter for connecting a single optical plug and jack.

BRIEF DESCRIPTION OF THE DRAWINGS

FIGS. 2 to 3 show a first embodiment of the optical connector according to the present invention for assistance in explaining the first feature thereof;

FIG. 2 is a partially broken, perspective view of the optical connector;

FIGS. 3(a) to 3(j) are side cross-sectional views for assistance in explaining the engagement and disengagement steps of the optical connector shown in FIG. 2;

FIGS. 4 and 5 show a second embodiment of the optical connector according to the second embodiment, in which the number and the location of the engage means and the release means are modified so as to be applicable to a plug-in connector;

FIG. 4 is a plan, partially broken view thereof;

FIG. 5 is a side, partially broken view thereof;

FIGS. 8 to 11 show an embodiment of the floating structure of the plug-in connector according to the present invention for assistance in explaining the second feature thereof;

FIG. 11 is an exploded view showing the essential portions of the floating structure for assistance in explaining the method for assembly;

FIG. 12 is a perspective, partially broken view showing a prior-art optical connector connected via an adapter;

FIGS. 15 to 17 are views for assistance in explaining the third features of the present invention;

FIG. 19 is a partially broken, cross-sectional view showing an embodiment in which the optical connector according to the present invention is applied to a push-pull optical connector using an adapter;

FIG. 20 is a front view showing the optical plug thereof;

FIG. 21 is a plan view of the same;

FIG. 22 is a left side views of the optical plug shown in FIG. 20;

FIG. 23 is a pricipal illustration showing the engagement relationship of the optical connector;

FIG. 24 is a partially broken, cross-sectional view showing another embodiment in which the optical connector according to the present invention is applied to a plug-in optical connector fixed to a back panel;

FIGS. 27 to 31 are views for assistance in explaining the fifth feature of the present invention;

FIG. 27 is a perspective view showing an embodiment of the optical connector according to the present invention;

FIG. 28(a) is a front view showing the same;

FIG. 28(b) is a top view showing the same;

FIG. 28(c) is a side, partially cross-sectional view showing the same;

FIG. 28(d) is a bottom view showing the same; plug of the present invention;

FIG. 29 is a side cross-sectional view showing the state where the optical connector plug is inserted;

FIG. 30 is a plan view showing the connector housing of the present invention;

FIGS. 33 to 38 are views for assistance in explaining the sixth feature of the present invention;

FIG. 35 is a cross-sectional view showing a modification of the front housing;

FIG. 36(a) is a partially broken cross-sectional view showing the entire construction of a third embodiment of the optical connector jack according to the present invention;

FIG. 36(b) is a cross-sectional view showing a pair of optical connector jack and the optical connector;

FIG. 37(a) is a cross-sectional view showing an optical connector jack;

FIG. 37(b) is a side view showing the same optical connector jack shown in FIG. 37(a);

FIG. 38 is a similar cross-sectional view showing the optical connector jack shown in FIG. 37(a) from which the front housing is removed away;

FIGS. 39 to 41 are views for assistance in explaining the first to fifth features of the optical connector according to the present invention;

FIG. 39(a) is a left side view showing one embodiment of the first optical connector applied to a plug-in optical connector;

FIG. 39(b) is a front view showing the same;

FIG. 39(c) is a right side view showing the same;

FIG. 39(d) is a top view showing the same;

FIG. 41(a) is a left side view showing one embodiment of the second optical connector applied to a plug-in optical connector;

FIG. 41(b) is a front view showing the same;

FIG. 41(c) is a right side view showing the same;

FIG. 41(d) is a top view showing the same;

DETAILED DESCRIPTION OF THE PREFERRED EMBODIMENTS

Embodiments of the optical connector according to the present invention will be described hereinbelow in detail with reference to the attached drawings.

The first feature of the present invention relates to an optical connector structure for connecting optical fibers, and more specifically to an optical connector applicable to a plug-in optical connector used to connect two or more package boards on which optical or electric parts are mounted into an assembly unit frame.

Prior to the description of the optical connector, a reference will be made to a prior-art optical connector with reference to the attached drawings.

Figure 1A:
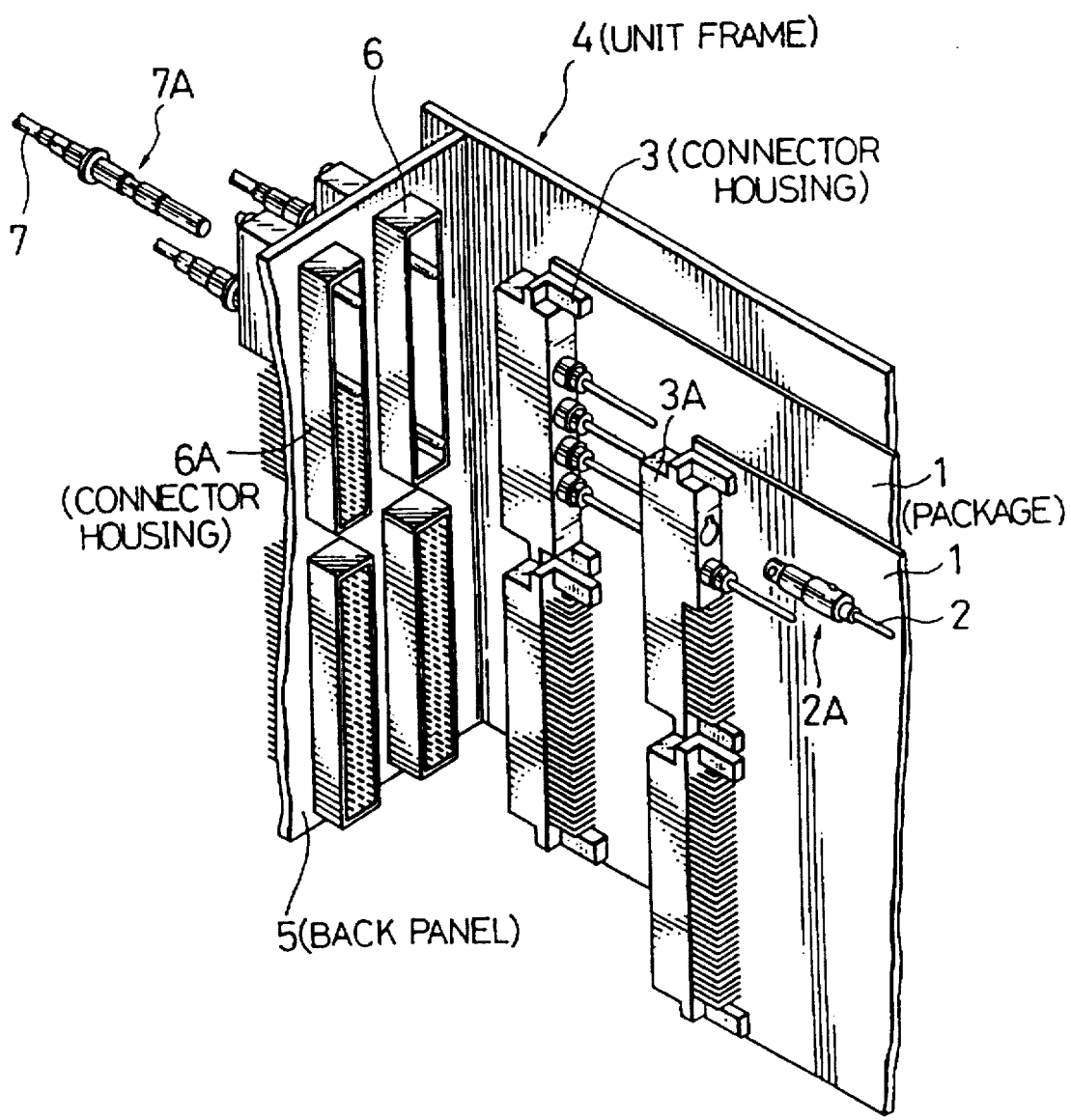
FIG. 1(a) is a perspective view showing prior-art plug-in optical connectors arranged in book-self arrangement fashion into an assembly unit for assistance in explaining the function thereof.

To connect two optical fibers, it is necessary to use optical connectors provided with precise engagement mechanism. In particular, when a package board on which various optical modules are mounted is connected to a unit frame and further optical signals are transmitted between the two package boards and between the package board and an external device, a plug-in optical connector as disclosed in for instance U.S. Pat. No. 4,895,425 entitled "Plug-in Optical Fiber Connector" is adopted, FIG. 1(a) is a perspective view for assistance in explaining the usage and the structure of the prior-art plug-in optical connector, disclosed in this patent document.

A circuit board on which various optical/electrical parts are mounted is fixed to a package board 1. An optical fiber 2 of the circuit is terminated within a ferrule inside of an optical jack (connector element) 2A and guided into the connector housing 3 or 3A fixed to the package board 1. On the other hand, another optical fiber 7 guided from another package board or a device is terminated within a ferrule inside of an optical plug (connector element) 7A and guided into the connector housing 6 and 6A fixed to a back panel 5 of a unit frame 4. Therefore, the package board 1 can be engaged with or disengaged from the back panel 5 via connectors by inserting/removing the package board 1. For instance, when the package board 1 is moved toward the back panel 5, the connector housings 3 and 3A fixed to the package boards 1 are engaged with the connector housings 6 and 6A fixed to the back panel 5 and additionally the inner optical connector elements 7A and 2A are coupled to each other by connection between the package board 1 and the back panel 5.

As described above, in the plug-in optical connector, it is required that the optical connector elements can be securely engaged or disengaged by only inserting or removing the package board 1 into or from the back panel 5. In general, after connected, two ferrules of optical connector elements are urged toward each other by a spring, so that a resiliency of about 1 kgf is generated between two optical connector elements. Therefore, a lock mechanism is required for each connector element.

In the conventional plug-in optical connector, however, no lock mechanism is generally provided for the optical connector. This is because the position at which the optical connector is engaged is located deep in the unit and additionally the connector must be engaged with or disengaged from the back panel by only inserting or removing the package board into or from the back panel.

Instead of the lock mechanism, it is also possible to provide a separate engage structure at the front surface of the package board, independently from the connector, as disclosed in Japanese Published Unexamined (Kokai) Utility Model Appli. No. 61-109189, entitled "Package Lock Mechanism".

This document shows a structure such that package boards are mounted on a shelf having a plane perpendicular to the package insertion/removal direction, in which a leaf spring deformable in the direction perpendicular to the package insertion/removal direction is mounted on the package board, and a part of the leaf spring is engaged with a plane perpendicular to the shelf.

In the prior-art package lock structure as described above, however, since the resiliency between the optical connector elements is directly transmitted to the back panel or the unit frame via the connector housing, the connector resiliency increases roughly proportionally with increasing number of the connector elements to be connected. Therefore, with the progress of optical technology, the number of the connector elements per unit tends to increase and therefore the connector resiliency also increases, thus resulting in a problem in that a resiliency to the back panel is large and therefore the unit frame or the rack may be deformed. For instance, the assumption is made that the resiliency per connector element is 1 kgf; the number of the elements per package board is 4; and the number of package boards per unit is 30. In this case, a force as large as 120 kgf is alway applied to the back panel and the unit frame.

Once the unit frame and the back panel are deformed, since the mutual connection positional relationship between the package board and the back panel changes, there exists a problem in that the stability in the connection characteristics of the optical and electric connectors deteriorate.

On the other hand, a push-pull lock (single core) optical connector is disclosed in Electronic Communication Transaction CS-85-128 (Published Dec. 20, 1985), in which the optical connector itself is provided with a lock mechanism and the connector element can be engaged with or disengaged from the connector adaptor by only the insertion and removal operation.

Figure 1B:
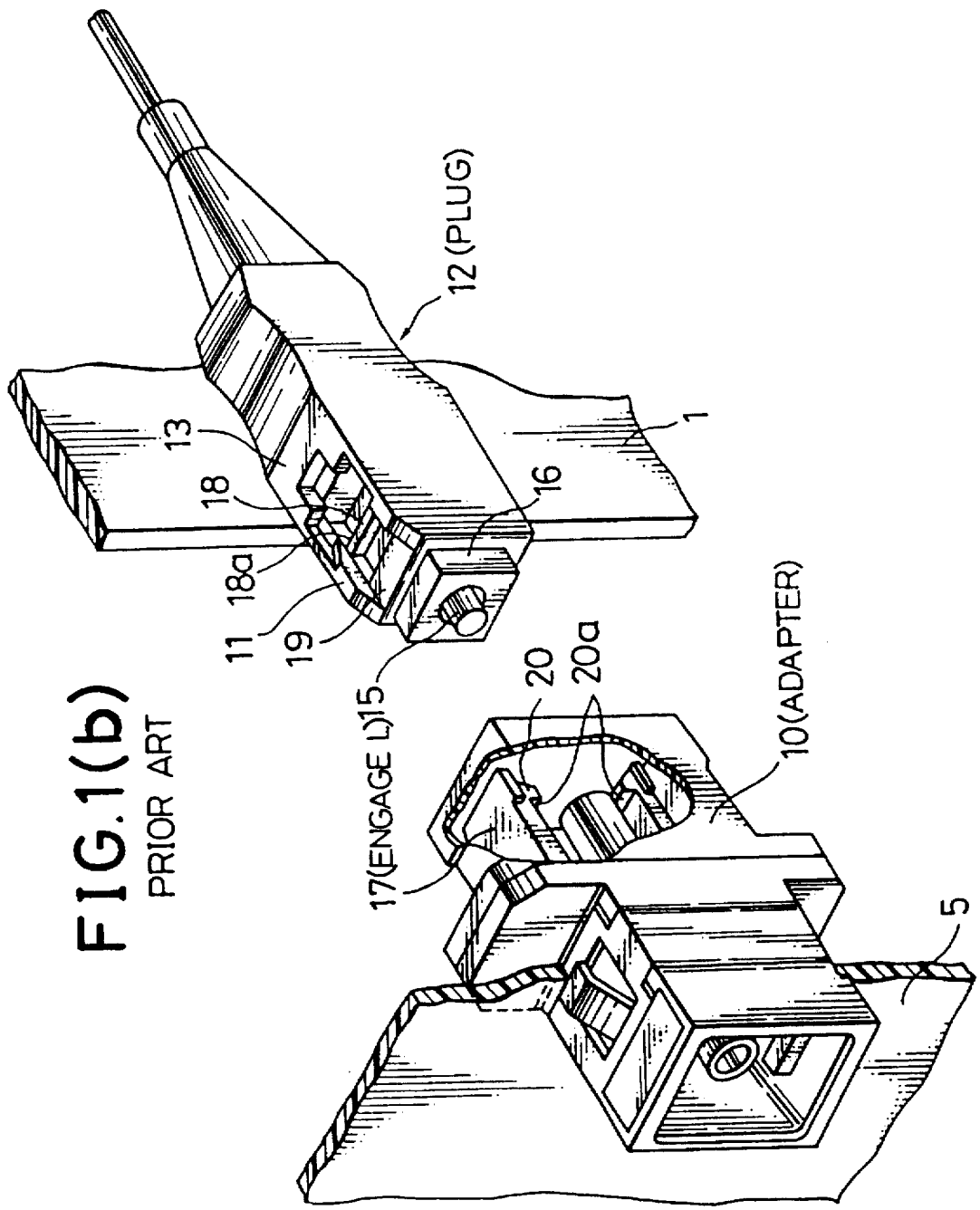
FIG. 1(b) is a perspective, partially broken view showing a prior-art push-pull optical connector using an adapter.

FIG. 1(b) shows a plug-in optical connector to which the above-mentioned optical connector structure is applied. In the drawing, an adaptor 10 is mounted on a back panel 5 and a knob 13 of a plug 12 is fixed to the package board 1. Further, although not shown, another plug for terminating a cable from another package board or a device is mounted on the side (the left side) opposite to the package side of the adaptor 10.

The plug 12 is composed of a plug housing 16 for supporting an optical connector element (referred to as ferrule) 15 and a knob 13. The plug housing 16 is slidable inside the knob 13 in the axial direction of the element 15. Only when the package board 1 is inserted into the back panel 5, an engage lever 17 of the adaptor 10 mounted on the back panel 5 is engaged with a projection portion 18 of the housing 16 of the plug 12, so that the package plug 12 is engaged with the adaptor 10. To release the engagement, the engage lever 17 of the adaptor 10 is disengaged from the projecting portion 18 of the housing 16 of the plug 12 by deforming the engage lever 17 outwardly when two projections 11 are brought into contact with two side projections 17a of the engage lever 17, before the package board 1 is removed from the back panel 5.

In the plug-in optical connector as described above, however, there exists an essential problem as follows: To securely engage the plug 12 with the adapter 10, it is necessary to sufficiently insert the knob 13 of the plug 12 (i.e. the package board provided with the knob 13) into the adapter 10 and then to remove it a little back (foward the right).

To generate an engage force between a claw portion 20 of the engage lever 17 and the projection portion 18, an engage surface 20a of the claw portion 20 must be brought into contact with an engage surface 18a of the projection 18. However, since the position of the engage surface 20a away from the back panel 5 and the position of the engage surface 18a relative to the package board 1 are determined, respectively on the basis of the parts dimensions and the parts assembly precision, when the above-mentioned insertion and removal operation is required so that the package board 1 is sufficiently inserted into the back panel 5 to engage the engage lever 17 with the projection portion 18, and thereafter removed a little backward to a position at which an engagement force is generated due to contact between the engage surface 20a of the claw portion 20 and the engage surface 18a of the projection portion 18, the optical connector coupling workability is remarkably reduced, because the package board 1 must be removed a little backward at high precision.

In addition, various connectors such as package electric connectors (91), (92), plural connectors of different type, etc. are generally mounted on the same package board and backpanel together with the optical connectors. These package connectors are usually used by sufficiently inserting the package board into contact with the back panel without backward removal operation. Therefore, the afore-mentioned optical connector which requires a little backward removal operation cannot be mounted on the same package board 1 together with various other connectors coupled without backward removal.

Further, when a plurality of various connectors are mounted on the same package board, each plug-in optical connector element is usually required to absorb a positional coupling error of about 1 mm in the axial direction of the optical connector element, because there inevitably exist some production error (dispersion) in the unit frame and the package board and some assembly error at connector mounting position. Therefore, in the prior-art optical connectors, there exists a problem in that it is difficult to absorb the production and assembly errors and additionaly to allow the optical connector to be mounted on the same package board together with other connectors of different types.

As described above, in the prior-art plug-in optical connector, since the optical connector is not provided with a connector lock mechanism, a resiliency of the optical connector is directly applied to the package board and the back panel, thus resulting in a problem in that the back panel is easily deformed.

In addition, when the prior-art lock mechanism for the optical connector is simply applied to the plug-in optical connector so that the optical connector elements can be engaged with or disengaged from each other by only the simple insertion and removal operation, there are drawbacks such that the high connector dimension precision is required or the connector coupling workability is deteriorated.

The first feature of the optical connector according to the present invention is to provide an optical connector, in particular usable as a plug-in optical connector by which optical connector elements can be engaged with or disengaged from each other by simple insertion and removal operation; the connector itself can be locked; and no high axial-direction positional precision is required when engaged.

An first embodiment of the present invention will be described hereinbelow with reference to FIGS. 2 and 3. Here, it should be noted that although the optical connector according to the present invention can be applied to the ordinary optical connector, the plug-in optical connector to which the present invention is applied will be explained by way of example, because the plug-in optical connector can make the best use of the feature of the present invention.

Figure 2:
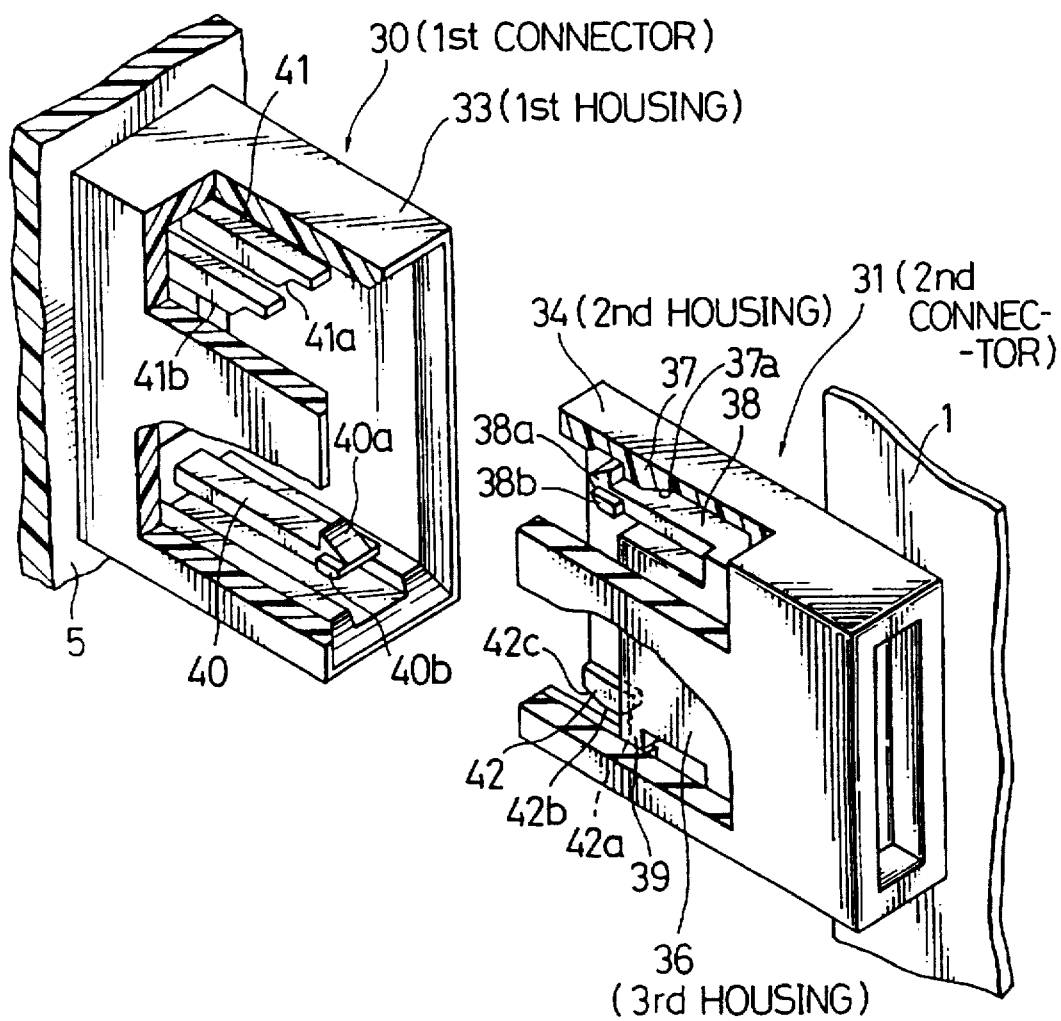

FIG. 2 is a perspective, partially broken view for assistance in explaining the optical connector housing according to the present invention, in which the optical connector elements are not shown. FIGS. 3(a) to 3(j) are cross-sectional views for assistance in explaining the engagement steps of the connector.

The connector of the present invention is composed of a first connector 30 and a second connector 31. The first connector 30 includes a first housing 33 for housing first optical connector elements (plugs) 32 (shown in FIG. 3a). The second connector 31 includes a third housing 36 for housing second optical connector elements (jacks) 35 (shown in FIG. 3a) connected to the first optical connector elements 32. This third housing 36 is slidable within the second housing 34 in the axial direction of the optical connector elements 32 and 35.

Before the first connector 30 is connected to the second connector 31, the second housing 34 and the third housing 36 are engaged with each other by first engage means composed of a first projection portion 37 having an inclined surface 37a and an engage surface 37b formed in the second housing 34 and a first elastic engage lever 38 having a claw portion 38a and a side projection 38b formed in the third housing 36.

When the first connector 30 is connected to the second connector 31, the first housing 33 and the third housing 36 are engaged with each other by second engage means composed of a second projection portion 39 formed in the third housing 36 and a second elastic engage lever 40 having a claw portion 40a and a side projection 40b formed in the first housing 33.

After the first connector 30 and the second connector 31 have been connected, since the first engage means 37 and 38 between the second housing 34 and the third housing 36 is released by a first engage release means composed of a first release member 41 having an inclined surface 41a for deforming the first elastic engage lever 38 in the direction perpendicular to the axial direction of the optical connector element, the third housing 36 is slidable relative to the second housing 34 in the axial direction of the optical connector element.

When the first connector 30 and the second connector 31 are disconnected, the second engage means 39 and 40 between the first housing 33 and the third housing 36 is released by a second engage release means composed of a second release member 42 having two inclined surfaces 42a and 42b for deforming the second elastic engage lever 40 in the direction perpendicular to the axial direction of the optical connector element.

The engagement conditions of the optical connector according to the present invention will be explained hereinbelow in further detail with reference to FIGS. 3(a) to 3(j), in which the engagement and disengagement steps of the optical connector according to the present invention are shown in order.

FIG. 3(a) shows a status where two connectors 30 and 31 are not yet connected. The first connector 30 is fixed to a back panel 5, and the second connector 31 is fixed to a package board 1. Two first optical connector elements 32 are supported within the first housing 33 of the first connector 30. The third housing 36 is disposed within the second housing 34 slidably in the right and left direction in FIG. 3(a). Before engagement of these two connectors 30 and 31, the third housing 36 is engaged with the second housing 34 by the first engage means 37 and 38 so as not to be slid toward the right direction, because a claw portion 38a of the first elastic engage lever 38 is engaged with a first projection portion 37. Plural second optical connector elements 35 are supported within this third housing 36.

In engagement, the package board 1 is moved toward the back panel 5 in the leftward direction in the drawing to insert the second housing 34 into the first housing 33. In this case, an end portion 44 of the second connector 31 is guided along a guide surface 45 of an end portion 43 of the first connector 30.

FIG. 3(b) shows a status where the second housing 34 and the third housing 36 are fitted to the first housing 33. In these conditions, end portions 32a of the first optical connector elements 32 supported within the first housing 33 and end portions 35a of the second optical connector elements 35 supported within the third housing 36 are both opposingly located so as to be smoothly coupled to each other.

Further, since the side projection portion 40b of the second elastic engage lever 40 is deformed in the downward direction in the drawing by the inclined surface 42c of the second release portion 42 and brought into contact with a lower flat surface 42b of the second release portion 42, the second housing 34 and the third housing 36 can be smoothly inserted into the first housing 33 without interference of the second elastic engage lever 40 with the second and third housings 34 and 36, so that the second engage lever 40 can be engaged with the second projection 39.

FIG. 3(c) shows a state where the package board 1 is further pushed toward the back panel 5. Under these conditions, the first and second engage means 37, 38 and 39, 40 are both brought into engagement. That is, the first projection portion 37 is kept engaged with the first engage lever 38 in the first engage means, and further the second elastic engage lever 40 is slid down from the second release member 42 so that the claw 40a of the second elastic engage lever 40 is located within a groove 46 formed in the third housing 36.

Therefore, a resiliency between the first optical connector elements 32 and the second optical connector elements 35 is indirectly applied to the back panel 5 and the package board 1, respectively via the three housings 33, 34 and 36 and the first and second engage means 37, 38, 39, and 40.

Under these conditions, since the first optical connector elements 32 and the second optical connector elements are coupled to each other, an urging force of about 1 kgf per fiber is generated between the first optical connector element 32 and the second optical connector element 35. However, this force is received by the back panel 5 and the package board 1 via these housings 33, 34 and 36.

Figure 3D:
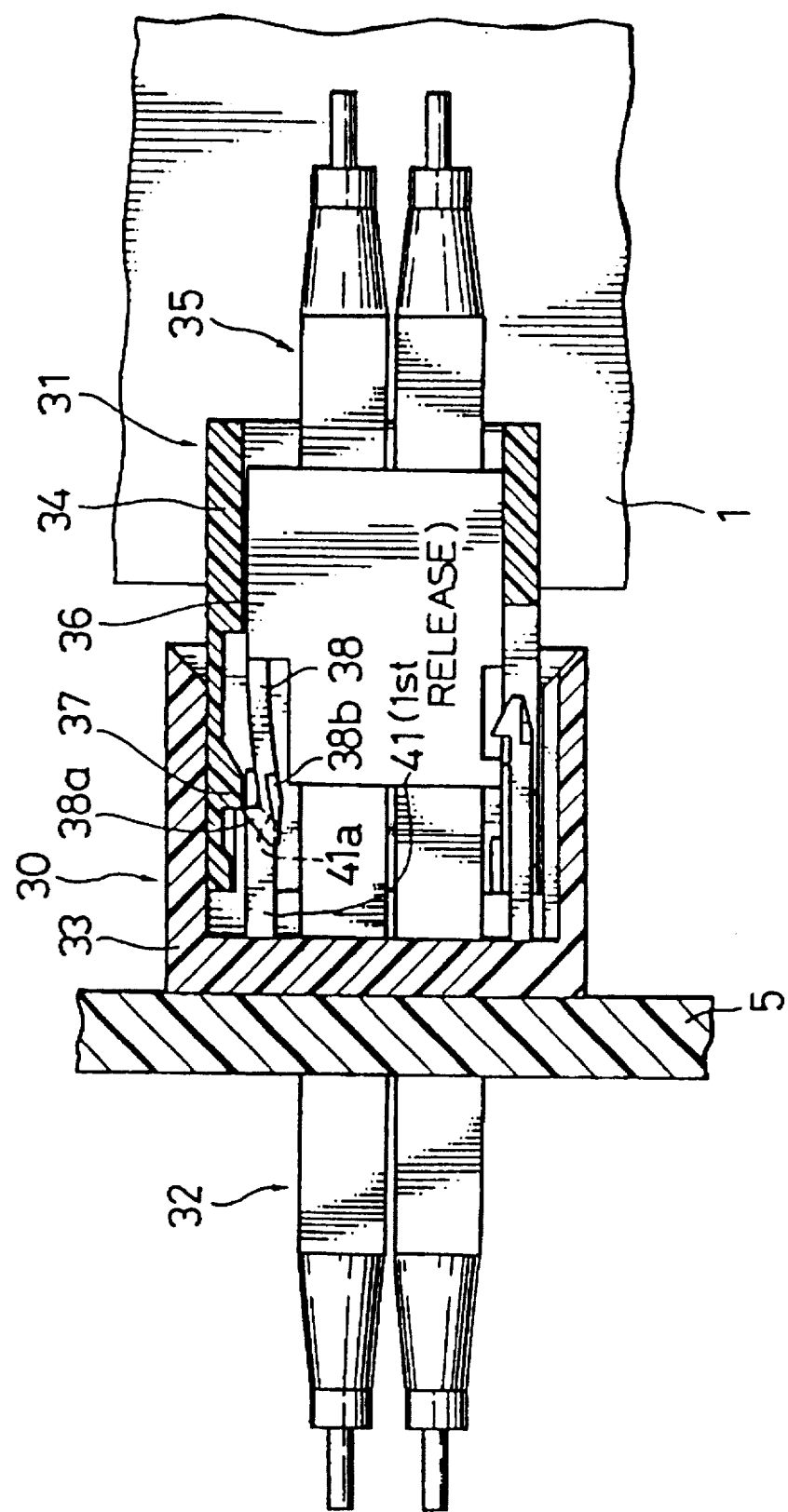

FIG. 3(d) shows a state where the package board 1 is further pushed toward the back panel 5. When the package board 1 is further pushed, the second housing 34 and the third housing 36 are both pushed into the first housing 33. Therefore, the side projection portion 38b of the first elastic engage lever 38 of the first engage means is pushed downward by the inclined surface 41a of the first release member 41, so that the first claw portion 38a is disengaged from the first projection portion 37 of the first engage means.

FIG. 3(e) shows a state where the package board 1 is further pushed a little from the state shown in FIG. 3(d), to release the first engage means. Since the engagement between the first projection portion 37 and the first claw portion 38a is released, the third housing 36 is shifted in the rightward direction by a resiliency generated between the first optical connector elements 32 and the second optical connector elements 35, until the second projection portion 39 is brought into contact with the second elastic engage lever 40 of the second engage means. In this state, the first connector 30 is connected to the second connector 31.

Under these conditions, the resiliency between the connector elements is received by the second projection portion 39 and the second elastic engage lever 40 of the second engage means via the first housing 33 and the third housing 36, without applying the resiliency to the back panel 5, the second housing 34 and the package board 1. In other words, although the first housing 33 supporting the first optical connector elements 32 and the third housing 36 supporting the second optical connector elements 35 are strongly coupled to each other by the second engage means 39 and 40, these housings 33 and 36 are floated from the second housing 34 and the package board 1 with respect to the resiliency.

Figure 3F:
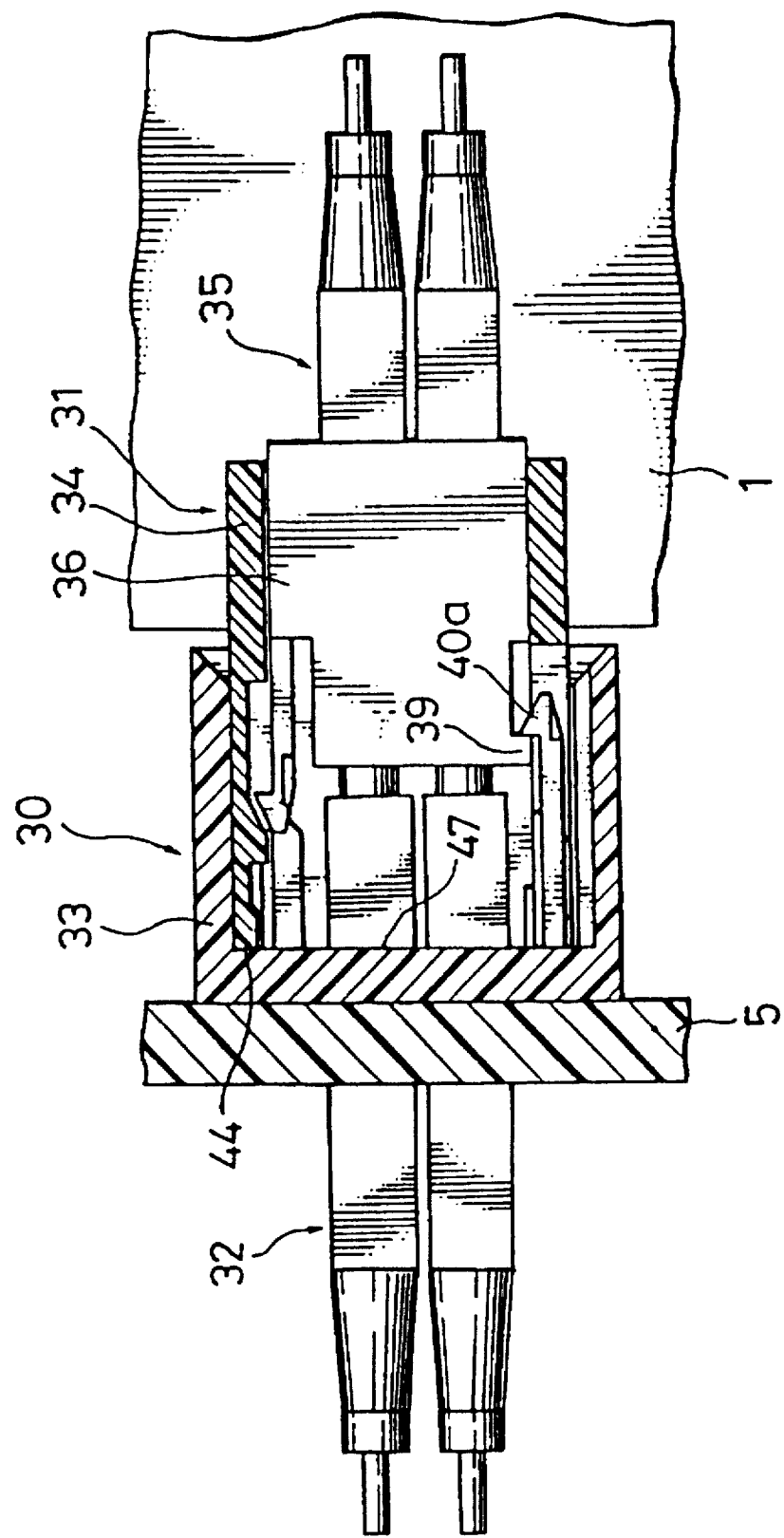

FIG. 3(f) shows a state where the package board 1 is inserted until the end portion 44 of the second housing 34 is brought into contact with the bottom portion 47 of the first housing 33. In this case, even if the package board 1 and the second housing 34 are moved in the leftward direction by a distance C between the end portion 44 and the bottom portion 47 as shown in FIG. 3(e), since the third housing 36 and the first housing 33 are kept engaged by the second projection portion 39 and the second engage claw 40a of the second engage lever 40, the positional relationship between the third and first housings 36 and 33 are kept unchanged.

Therefore, it is possible to maintain the same optical fiber connection conditions as shown in FIG. 3(e).

FIGS. 3(g) to 3(j) show the disengagement steps of the optical connector according to the present invention in order.

FIG. 3(g) shows a state where the package board 1 is removed in the rightward direction from the engagement state as shown in FIGS. 3(e) and 3(f). When the package board 1 is moved in the rightward direction, the second housing 34 fixed to the package board 1 is also moved in the same direction. However, since the third housing 36 is engaged with the first housing 33 by the second projection portion 39 and the second elastic engage lever 40 of the second engage means, the third housing 36 is not moved. Therefore, when the second housing 34 is moved in the rightward direction relative to the position of FIG. 3(e), the first projection portion 37 deformes the elastic first engage lever 38 downward in the first engage means. In more detail, the claw portion 38a of the first elastic engage lever 38 slides on the inclined surface 37a of the first projection 37 and comes on the flat surface 37b of the first projection portion 37 of the first engage means.

Figure 3H:
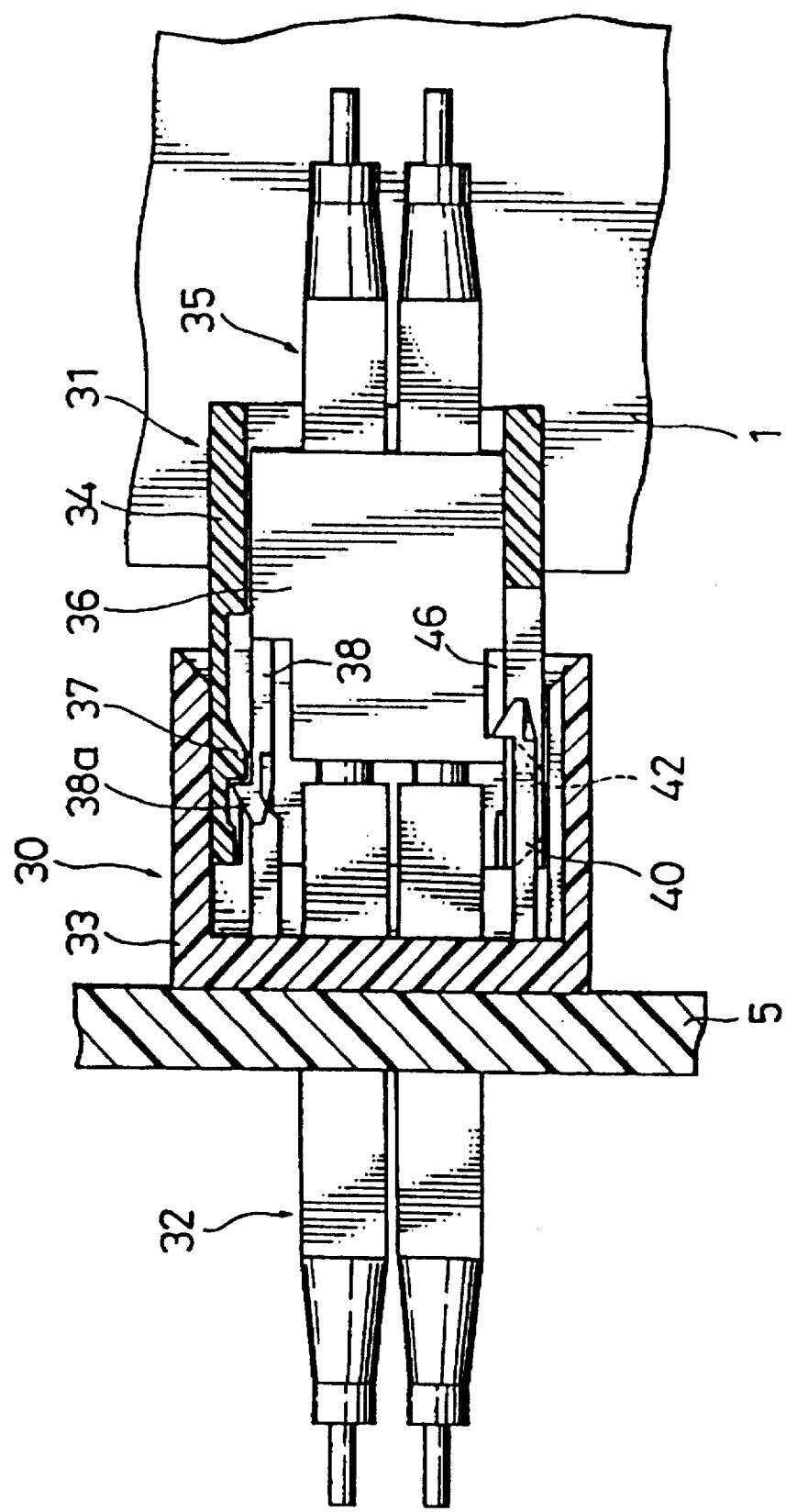

FIG. 3(h) shows a state whether the package board 1 is further moved rightward from the position shown in FIG. 3(g). The claw portion 38a of the first elastic engage lever 38 passes over the first projection portion 37 in the first engage means, so that the first engage means 37, 38 and the second engage means 39, 40 are both kept engaged in the same way as shown in FIG. 3(c).

FIG. 3(i) shows a state where the package board 1 is further moved in the rightward direction. Since the second housing 34 fixed to the package board 1 also moves in the rightward direction, the second release portion 42 of the second housing 34 moves in the same direction. Since the inclined surface 42a of the second release portion 42 is brought into contact with the side projection portion 40b of the second elastic engage lever 40, the projection portion 40b of the second elastic engage member 40 of the second engage means is deformed downward, so that the second elastic engage lever 40 and the second projection portion 39, that is, the second engage means is released. Since the engagement between the first housing 33 and the third housing 36 is released due to the release of the second release means, the third housing 36 is moved rightward to a position where the first claw portion 38a is engaged with the first projection portion 37 by the resiliency generated between the first optical connector elements 32 and the second optical connector elements 35.

FIG. 3(j) shows a state where the package board 1 is further moved rightward from the position shown in FIG. 3(i). The side projection portion 40b of the second elastic engage lever 40 of the second engage means slides on the flat surface 42b of the second release portion 42, and the second claw portion 40a is deformed to a position where the claw portion 40a is not interfaced with the second projection portion 39 of the second engage means. Since the engagement between the third housing 36 and the first housing 33 is released, the package board 1 can be moved further rightward together with the second housing 34 to the disengagement position as shown in FIG. 3(a).

In the above-mentioned embodiment, the first engage means 37, 38, the second engage means 39, 40, the first engage release means 41 and the second engage release means 42 are all disposed one by one respectively on each side surface of the optical connector. However, it is also possible to provide a plurality of each of these means on each side surface thereof. Further, each of these means can be provided on all the (upper and lower and right and left) sides of the optical connector.

Figure 5:
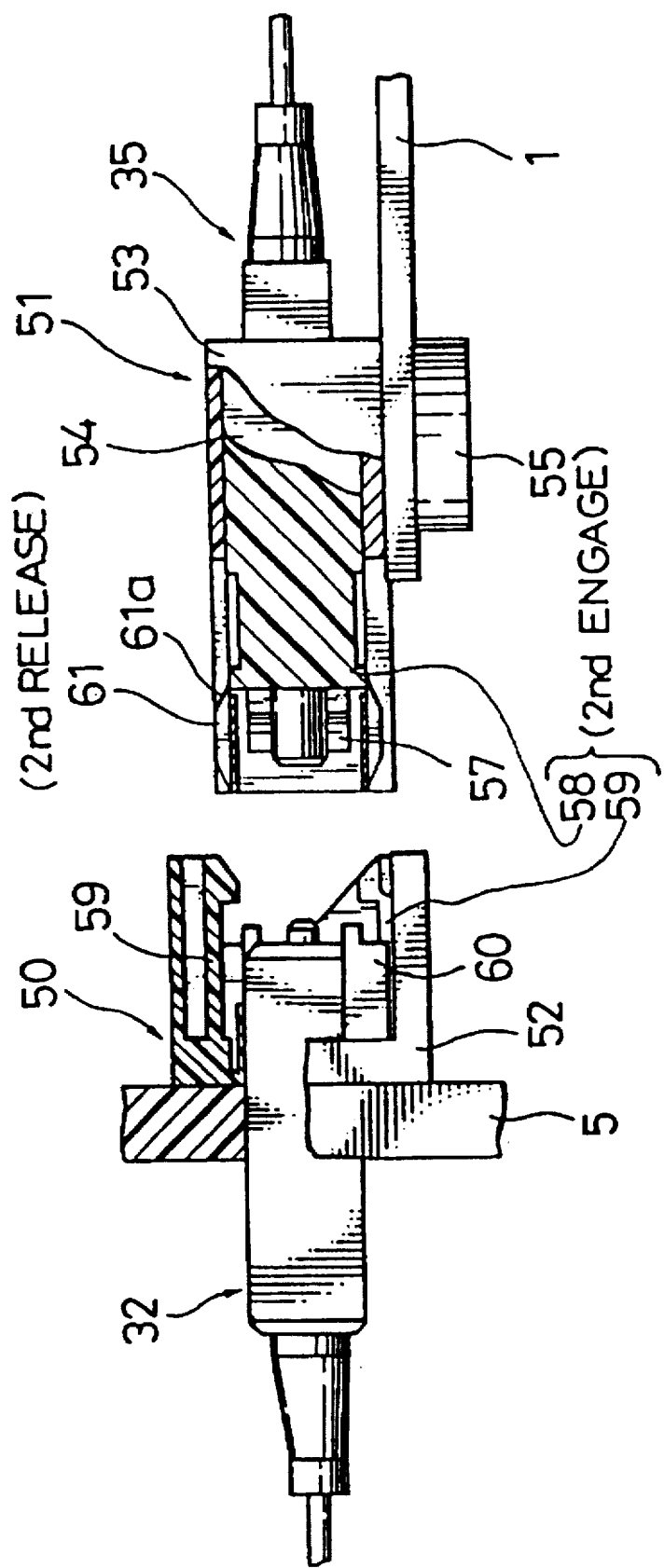

FIG. 4 shows a second embodiment when seen from a direction perpendicular to the package board 1, and FIG. 5 shows the same second embodiment when seen from a direction parallel to the package board 1.

In this second embodiment, the optical connector is composed of a first connector 50 and a second connector 51. The first connector 50 is composed of a first housing 52 for supporting first optical connector elements 32. The second connector 51 is composed of a second housing 53 and a third housing 54 for supporting second optical connector elements 35 coupled to the first optical connector elements 32. The second housing 53 is fixed to the package board 1 with screws 55. The third housing 54 is disposed within the second housing 53 so as to be slidable in the axial direction of the second optical connector elements 35.

Before the first connector 50 is connected to the second connector 51, the second housing 53 and the third housing 54 are engaged with each other by first engage means composed of a first projection portion 56 formed in the second housing 53 and a first elastic engage lever 57 having a claw portion 57a formed in the third housing 54.

When the first connector 50 and the second connector 51 are connected to each other, the first housing 52 is engaged with the third housing 54 by the second engage means composed of a second projection portion 58 formed in the third housing 54 and a second elastic engage lever 59 formed in the first housing 52.

After the first connector 50 has been connected to the second connector 51, the first engage means 56 and 57 between the second housing 53 and the third housing 54 is released by a first engage release mean 60, so that the third housing 54 is slidable relative to the second housing 53 in the axial direction of the optical connector elements 35. The first engage release means is composed of a release member 60 having a first inclined surface 60a for deforming the first elastic engage lever 57 in the direction perpendicular to the axial direction of the optical connector elements 35.

When the first connector 50 is disengaged from the second connector 51, the second engage means 58 and 59 between the first housing 52 and the third housing 54 is released by a second engage release means composed of a release portion 61 having a second inclined surface 61a for deforming the second elastic engage lever 59 in the direction perpendicular to the axial direction of the optical connector elements 32.

The operation of the engagement and disengagement is the same as in the first embodiment.

In the second embodiment, since a pair of engage means and release means are provided on the upper and lower and the right and left side surfaces of the optical connector housings in symmetry with respect to the optical connector, it is possible to stably, receive the resiliency of the optical connector elements under well-balanced conditions. Therefore, this second embodiment is preferable to an optical connector for connecting a large number of optical connector elements.

As described above, in the optical connector according to the present invention, since the connector engagement can be released by simply removing the package board, it is possible to realize a plug-in optical connector excellent in connection workability. Further, even if the number of the optical connector elements and the number of the package boards mounted on the unit frame increase, since no excessive force will not be applied to the back panel and the unit frame, it is possible to prevent the back panel and the unit frame from being deformed or damaged. Therefore, it is possible to increase the number of optical connector elements to be mounted on the back panel or the package board and therefore the assembly density of the optical connector elements.

Further, after the optical connector elements have been connected, since it is possible to push the package board a little toward the back panel, it is possible to absorb the dimensional error between the package board and the unit frame, thus allowing the optical connectors according to the present invention to be widely and economically used for various optical systems.

The second feature of the present invention relates to a plug-in connector supporting structure applicable to a book-self mounting unit, in which a number of vertical package boards are arranged in book-self manner and connected to a back panel via connectors.

Prior to the description of the connector supporting structure, a reference will be made to a prior-art supporting structure.

A plug-in connector mounting structure is also disclosed in U.S. Pat. No. 4,895,425, for instance. The plug-in connector is used to connect a package board on which various parts are mounted to a back panel arranged on the reverse surface of a unit frame in which a plurality of package boards are mounted in book self manner.

The plug-in connector is composed of a back panel connector attached to the back panel and a package connector attached to the package board.

In these plug-in connectors, the connector housing attached to the back panel is usually supported by the back panel in floating structure in order to realize an aligning engagement between the back panel connector and the package board connector by absorbing location error produced when the connectors are attached to the package board and the back panel or the unit frame.

Figure 6:
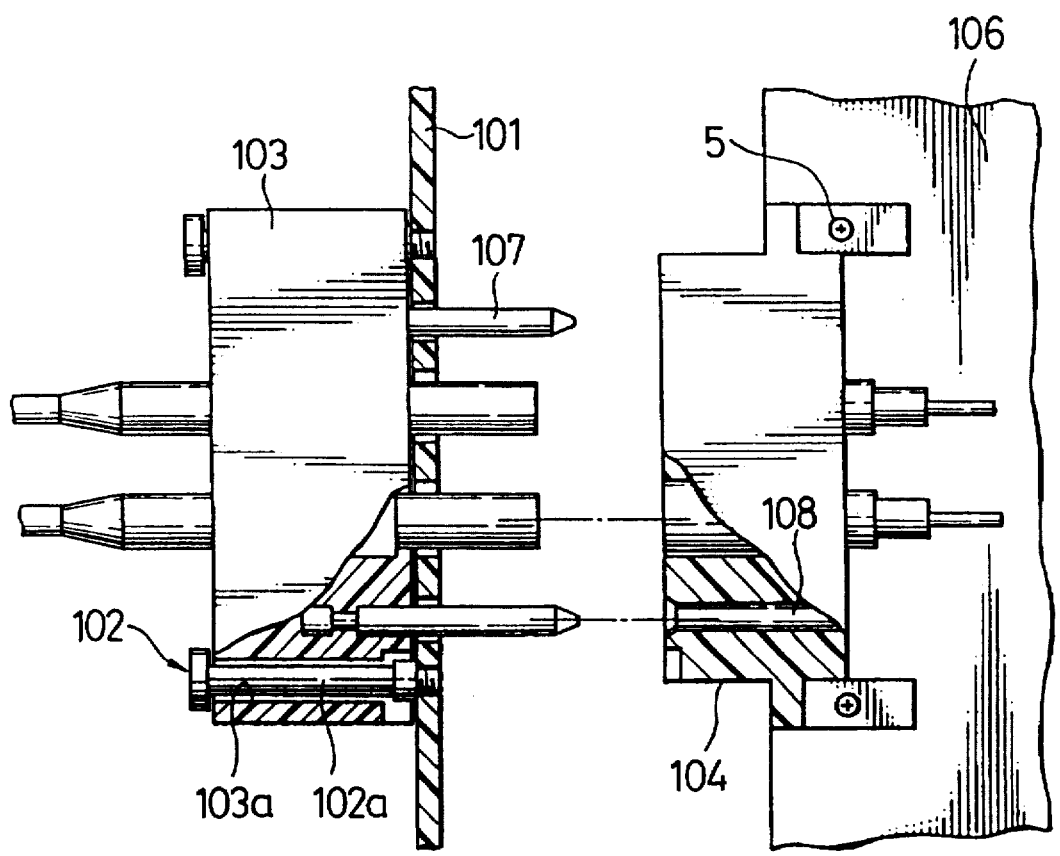
FIGS. 6 and 7 are plan views showing prior-art floating structure of the plug-in connector.

FIG. 6 shows a prior-art floating structure disclosed in the afore-mentioned document, in which a float pin 102 is fixed to a back panel 101; a float hole 103a is formed in a back panel housing 103; and the back panel housing 103 is floatingly supported by the back panel 101 via a gap between a float axle portion 102a of the float pin 102 and the float hole 103a.

In this prior-art floating structure, since the floating portion is provided within the housing 103, the connector shape inevitably increases. Further, the package connector 104 is fixed to the package board 106 with fixing screws 105. In engagement, even if the back panel housing 103 is dislocated relative to the package housing 104, since the guide pin 107 is loosely fitted to the guide hole 108, the floating back panel housing 103 is shifted so as to be aligned with the package housing 104.

In case the looseness is excessively large, the back panel housing 103 is declined, and therefore the guide pin 107 is not well fitted to the guide hole 108. In case the looseness is excessively small, the two housings cannot be well aligned. Therefore, the float hole and the float axle portion must be formed precisely for providing an accurate floating engagement.

Figure 7:
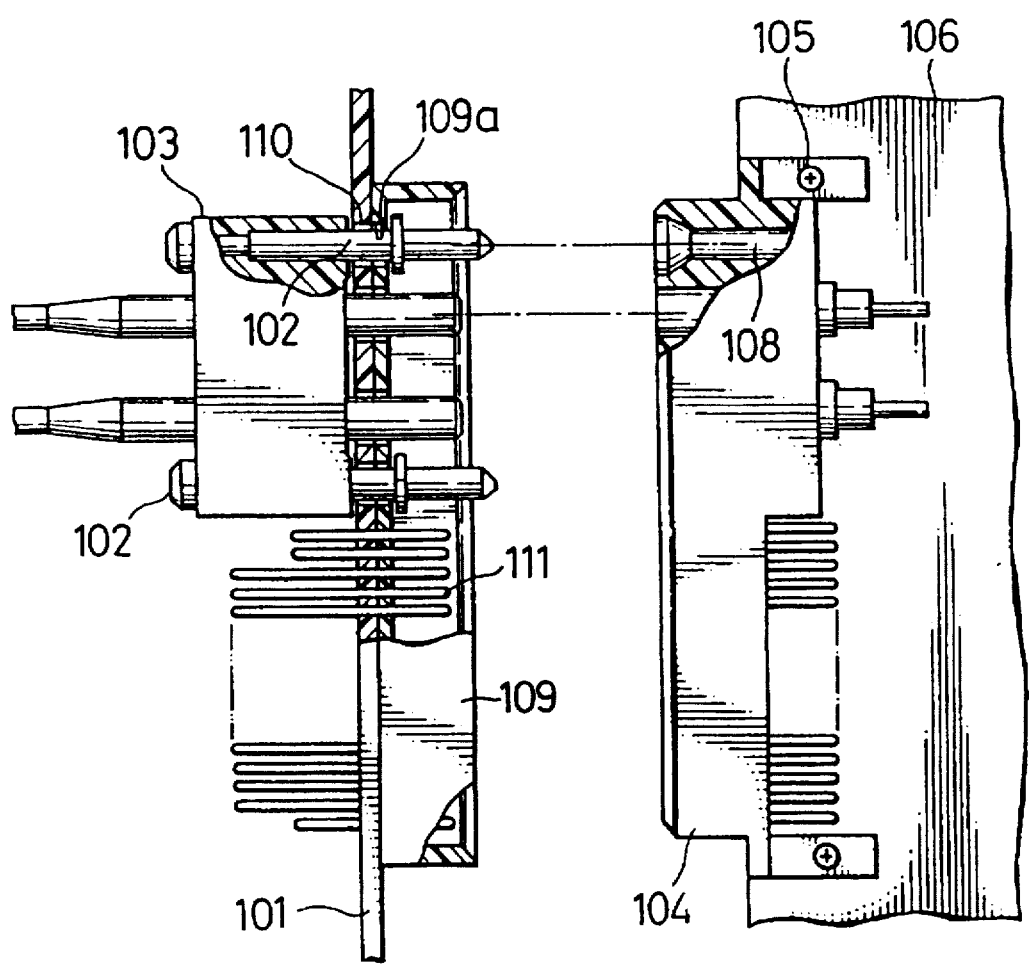

FIG. 7 shows another prior-art floating structure disclosed in the afore-mentioned document, in which the float axle portion 102a of the float pin 102 is disposed outside the back panel housing 3; another member 109 formed with a float hole 109a is fixed to the back panel 101; and the float axle portion 102a is passed through the float hole 109a. Since the diameter of the hole 110 formed in the back panel 101 is determined simply larger than that of the float hole 109a, in practice the float function is mainly dependent upon the shapes of the float hole 109a and the float axle portion 102a.

In this prior-art structure, since the additional member 109 formed with the float 109a and means for fixing the member 109 are required, an additional space is necessary in the thickness direction of the back panel. Further, in this example, the member 109 formed with the float hole 109a is indirectionally supported by the back panel 101 frictionally via electric terminals 110 fixed to the back panel 101.

When the prior-art floating structure is adopted to floatingly support the package housing 104, since the space required for the floating structure is large, there exists a problem in that the connector shape is large and therefore the connector mounting density and the package mounting density decrease.

Further, although it is possible to consider such a structure that the float holes are directly formed in the package board 106, since high manufacturing precision is required to form correctly-circular float holes, there exists a problem in that the cost required to bore the float holes in the package board 104 at high precision inevitably increases.

The second feature of the optical connector according to the present invention is to realize a simple and precious floating structure for floatingly supporting the package housing on the package board. An embodiment of the present invention will be described in detail hereinbelow with reference to the attached drawings.

Figure 9A:
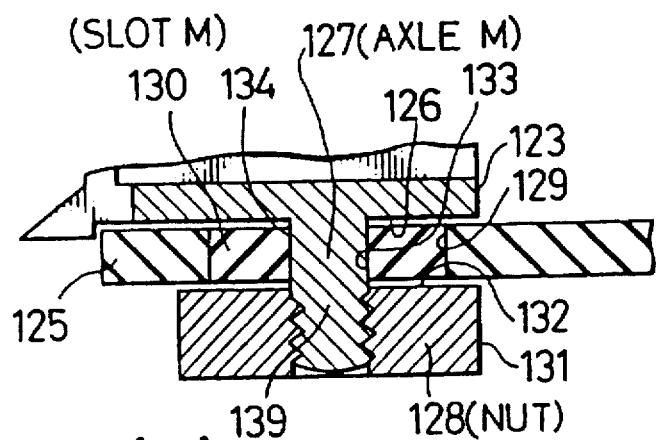
FIGS. 9(a) and 9(b) are enlarged cross-sectional views taken along the lines II—II and III—III in FIG. 8(a), respectively.
Figure 9B:
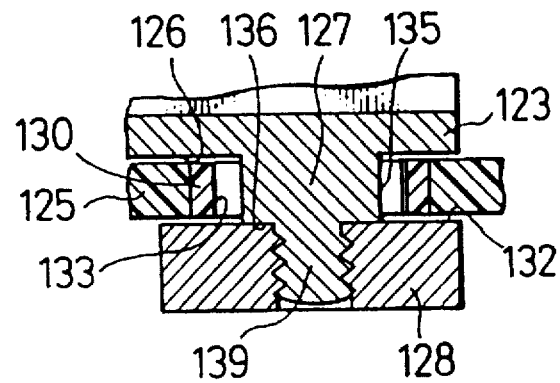
Figure 10B:
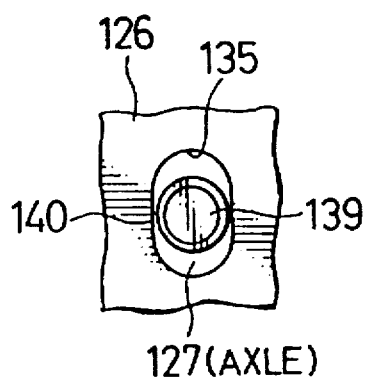
FIG. 10(b) is an enlarged view showing the axle member fitted to the slot member.
Figure 10A:
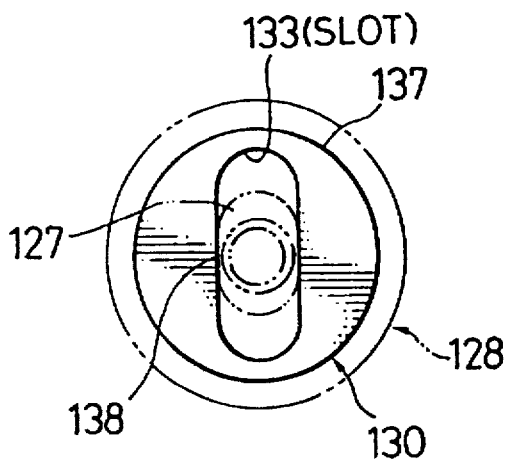
FIG. 10(a) is an enlarged plan view showing a slot member fixed to a package board.
Figure 11:
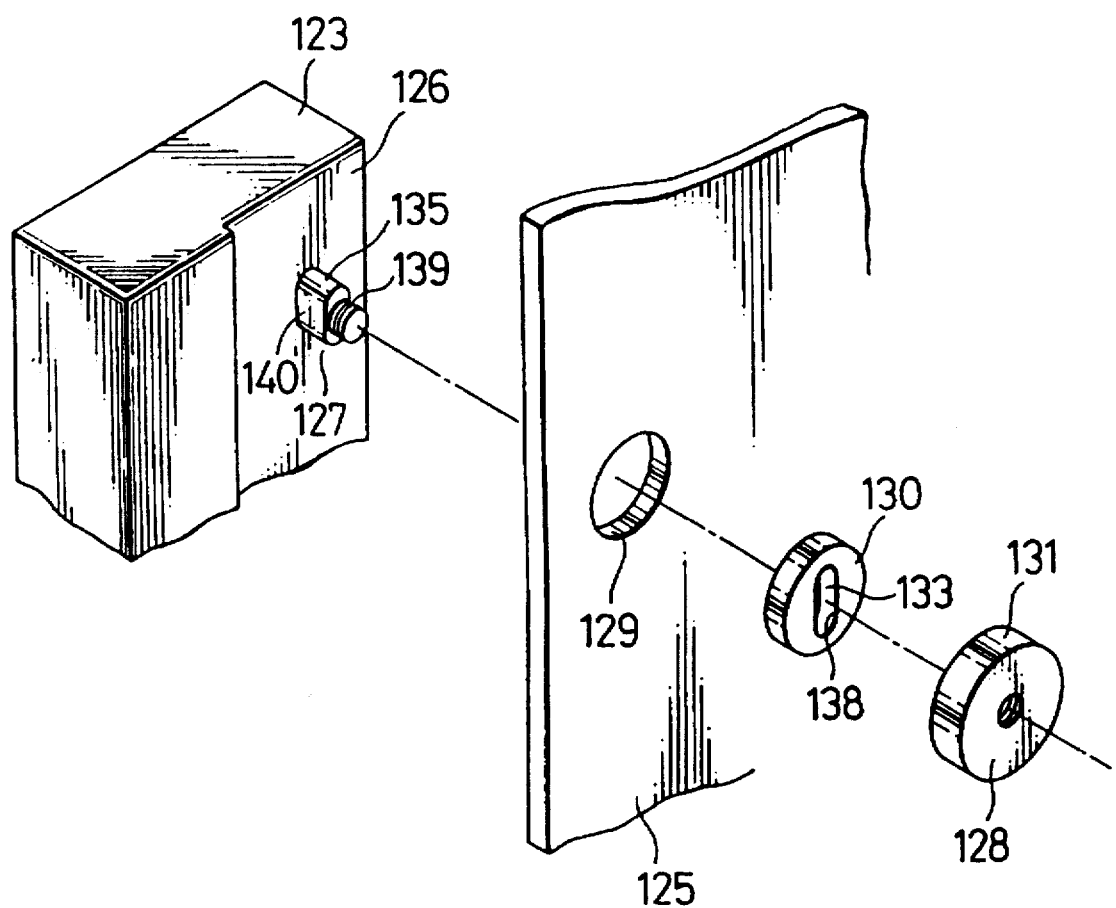

FIGS. 8 to 11 show an embodiment of the present invention. FIGS. 8(a) and 8(b) are partially cross-sectional, plan and side views. FIGS. 9(a) and 9(b) are cross-sectional views taken along the lines II—II and III—III in FIG. 8(a), respectively. FIG. 10(a) is a plan view showing a slot member. FIG. 10(b) is an enlarged view showing the axle member. FIG. 11 is an exploded view showing the essential portions for assistance in explaining the method for assembly.

Figure 8A:
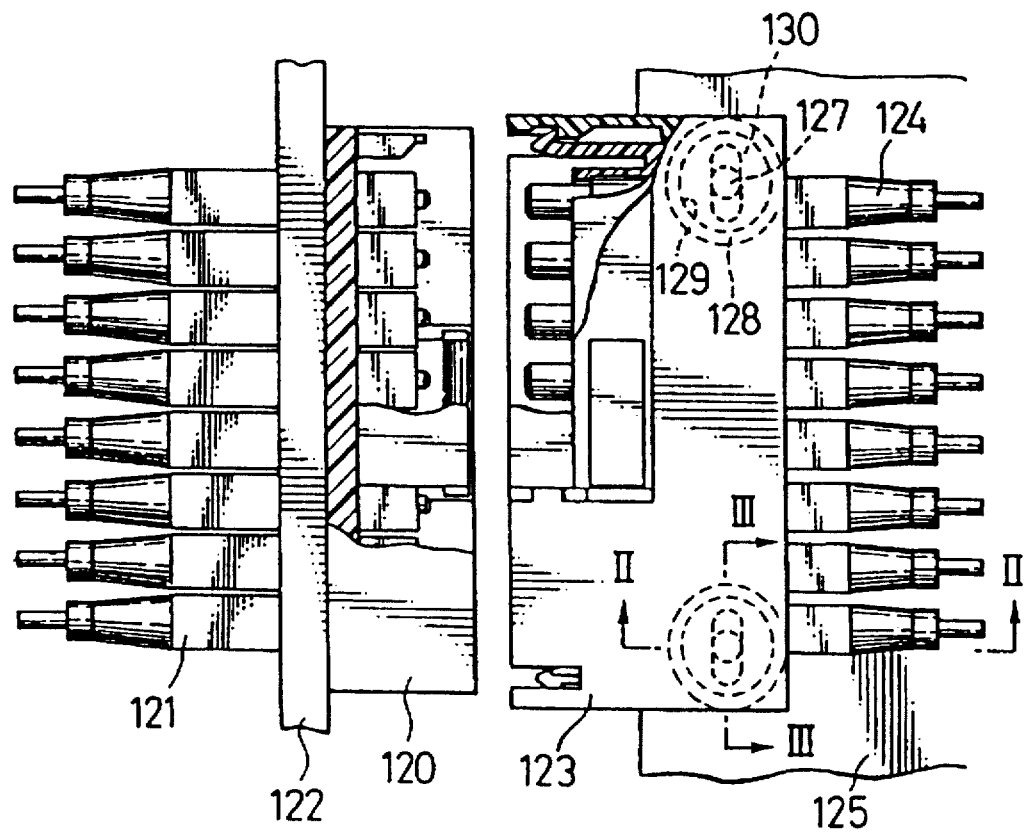
FIGS. 8(a) and 8(b) are partially cross-sectional, plan and side view thereof.

As shown in FIG. 8(a), a back panel housing 120 for supporting optical elements 121 is fixed to a back panel 122. A package housing 123 for supporting optical elements 124 is movably mounted on the back panel housing 120. The package housing 123 is provided with two floating structures as shown by dashed lines so as to be slidable up and down in the drawing relative to the package board 125.

Figure 8B:
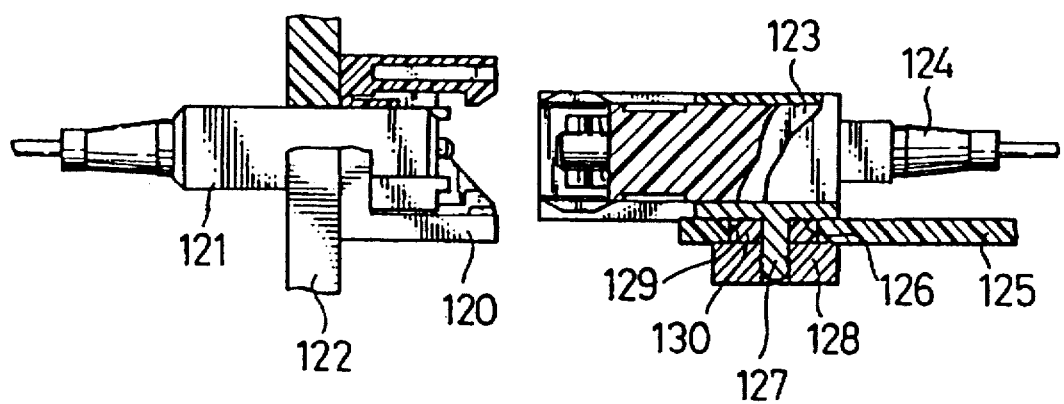

As shown in FIG. 8(b), the package housing 123 supported by the package board 125 via the floating structure composed of an axle member 127 extending from a support surface 126 of the housing 123 and a slot member 130 and a nut member 128 fixed to an end of the axle member 127. The floating support condition will be explained in further detail hereinbelow with reference to FIGS. 9(a) and 9(b).

As shown in FIG. 9(a), a through hole 129 is formed in the package board 125, and the slot member 130 is fitted to the through hole 129. The axle member 127 extending from the support surface 126 of the package housing 123 is passed through the slot member 130. The nut member 128 is fixed to an end of the axle member 127. The diameter 131 of the nut member 128 is larger than that of the through hole 129. Therefore, the package housing 123 is supported by the package board 125 between the support surface 126 of the package housing 123 and the support surface 132 of the nut member 128. Since a gap between a float slot 133 of the slot member 130 and the parallel straight portions 134 of the axle member 127 is small in the direction that the package 125 is inserted (i.e. the right and left direction in FIG. 8(a)), the package housing 123 will not move relative to the package board 25.

On the other hand, as shown in FIG. 9(b), since the width of the float slot 133 of the slot member 130 is larger than that of the outer surface portion 135 of the axle member 127 and therefore the gap between the two is large in the direction perpendicular to the direction that the package board 125 is inserted (i.e. the upper and lower direction in FIG. 8(a)), the axle member 127 is movable within the float slot 133. Further, although the axial portion of the nut member 128 is brought into contact with the shoulder surface 136 of the outer surface portion 135 of the axle member 127, a gap between the support surface 126 and the shoulder surface 132 is determined a little larger than the thickness of the package board 125. Therefore, the package housing 123 is loosely movable in the direction perpendicular to the package board insertion direction.

As shown in FIG. 10(a), the slot member 130 is pressure fitted to the through hole 129 formed in the package board 125. The axle member 127 is loosely fitted to the float slot 133 and movable in the major axis of the slot 133. In more detail, the axle member 127 is formed with a pair of parallel portions 138 having a width a little narrower than that of the minor axis of the float slot 133 and extending in the vertical direction in the drawing to allow the axle member 127 to be slidable along the major axis of the slot 133 only in the vertical direction. Since the axle member 127 is movable along the slot 133, the package housing 123 is floatingly movable along the major axis of the slot 133 without moving along the minor axis of the slot 133. Further, since the slot member 130 can be formed by molding process, it is possible to precisely manufacture the float slot 133 at a relatively low cost.

As shown in FIG. 10(b), the axle member 127 is formed with a float axle portion 135 and a threaded axle portion 139. The float axle portion 135 is formed with a pair of parallel portions 140 into an oval shape in cross section. The float axle portion 135 is fitted into the float slot 133 formed in the slot member 130 by mating the parallel portions 140 of the float axle portions 135 with the parallel portion 138 of the float slot 133.

Since the float hole is formed into a float slot, the float axle portion 135 is movable only along the major axis direction of the float slot 133 without rotation within the float slot 133 of the slot member 130. In other words, the slot member 130 will not rotate relative to the package board 125. Therefore, when two or more floating structures are provided as shown in FIG. 8(a), even if the slot member 130 is loose relative to the package board 125, it is possible to determine the movable direction of the package housing 123 relative to the package board 125.

In general, since the housing 123 is manufactured by molding, it is possible to manufacture the axle member 127 at high precision and at low cost.

FIG. 11 shows a method of assembling the floating structure when the package housing 123 is attached to the package board 125. The slot member 130 is fitted to the through hole 129 formed in the package board 125; the axle member 127 of the package housing 123 is inserted into the float slot 133 of the slot member 130, and the nut member 128 is screwed to the end threaded portion 139 of the axle member 127.

In this embodiment, the floating (movable) direction of the package housing 123 is determined in the direction perpendicular to the optical axis of the optical connector element 124. However, when the housing 123 is required to be moved in another direction, only the major axis direction of the axle member 127 is changed without modifying the shapes of the through hole 129, the slot member 130, and the nut member 128. Further, the floating distance (movable stroke) can be controlled by changing the dimensions of the parallel portion 138 of the float slot 133 or the parallel portion 140 of the axle member 127.

As described above, according to the present invention, it is possible to floatingly mount the package connector housing to the package board at high precision by simple floating structure.

Further, since only simple through holes are required to be formed in the package board, it is possible to mold the package board at high precision and at low cost. Further, when molding process is adopted, it is possible to control the floating distance (movable stroke) at higher precision at lower cost even when the floating structure is more complicated.

Further, when the package boards are mounted in bookself fashion, although the height of parts mounted on the package board is limited so that the two adjacent package boards will not interfere with each other, since floating parts are arranged on the connector mounting side, it is possible to realize the floating structure without increasing the size (thickness) of the package housing. Further, since no floating parts are provided for the connector housing, it is possible to increase the connector element mounting area of the connector housing; that is, the number of mountable optical connector elements can be increased. Further, since only the fixing nut is provided on the reverse surface of the package board, it is possible to increase the mounting density of the package boards to the unit frame, without interference between the two adjacent package boards.

Further, since the package housing is floated, it is unnecessary to float the back panel connector, being different from the prior-art plug-in connector. Therefore, it is possible to fix the back panel housing to the back panel. Therefore, in case the back panel connector element cable connected to an external device is pulled, since no force is applied to the package board within the unit, it is possible to increase the reliability of the device.

The third feature of the present invention relates to an optical connector ferrule holding structure for connecting an optical fiber of an optical connector plug, and preferably applied to a plug-in optical connector used to mount a package board on which various optical and electrical parts are mounted is assembled as a unit.

Prior to description of the ferrule holding structure, a reference will be made to a prior-art holding structure.

(1) JIS C5970 prescribes an F01 single core optical fiber connector as an example of a prior-art optical connector for connecting optical fibers. In this connector, an optical fiber is fixed at the center of a cylindrical ferrule; the ferrule is inserted into a cylindrical hollow alignment sleeve formed with a precisely formed inner hollow portion so that end surfaces of two ferrules butt against each other. This optical connector is composed of a plug and an adaptor, and a pair of plugs are engaged with each other from both the sides of the adaptor.

FIG. 12 shows a one-side plug 211 and an adaptor 212. An optical fiber 224 is bonded to a ferrule 221, and the ferrule 221 is floatingly supported inside a plug housing 222. To push end surfaces of the ferrules 221 against each other, the ferrule 221 is urged by a spring 223 within the plug housing 222. This spring 223 is housed within the plug housing 222 so as to be compressed to a predetermined urging force, the urging force is received when a flange portion 221b of the ferrule 221 is brought into contact with an inner wall 222a formed in the plug housing 222.

A sleeve holder 226 is supported in the adaptor 212, and an elastic sleeve 225 for supporting two ferrules 221 is disposed within the sleeve holder 226 as shown in FIG. 12. When two ferrules 221 are supported via the elastic sleeve 225 within the adaptor 212, two optical fibers 224 are connected with the adaptor 212 interposed between the two plugs 211.

(2) On the other hand, U.S. Pat. No. 4,895,425 discloses a plug-in connector used to transmit optical signals between a package board (on which various optical modules are mounted and which is mounted to a unit frame) and another package board or an external device. In the case of the above plug-in optical connector, since a plurality of connectors are mounted on a package board, there inevitably exists an error with respect to the connector mounting location or the unit frame and package board manufacturing process, so that it is required to maintain correct mutual positional relationship among plural connectors by absorbing an engagement error of about 1 mm in the axial direction of the optical connector element (ferrule). Therefore, plug-jack type optical elements different from the optical fiber connector shown in clause (1) above is used.

(3) To increase the number of fibers per package board in the plug-in connector as described above, it is necessary to prevent the ferrule urging force from being directly applied to the back panel, as already explained with reference to FIGS. 2 and 3. In this optical connector, when the package board is inserted into the optical connector, two opposing optical connectors are automatically locked independently, and when the package board is removed from the optical connector, the two opposing optical connectors are automatically unlocked to allow the package board to be removable from the back panel. In this case, since the positional relationship between two optical elements is maintained correctly under locked condition, it is possible to apply the single fiber connector structure (plug-adapter-plug structure) as explained in clause (1) above or to use the single core optical connector and the plug in common. Therefore, in this optical connector, a plug and a jack having a sleeve holder with a slitted sleeve are usable.

Figure 13A:
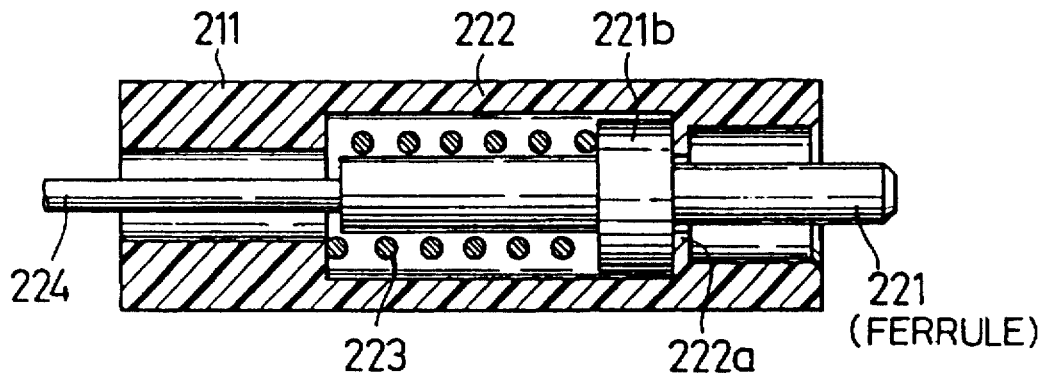
FIGS. 13(a) to 13(c) are side cross-sectional views for assistance in explaining the engagement positional relationship between the plug and the sleeve holder when a prior-art optical connector is applied to the plug-in optical connector.
Figure 13B:
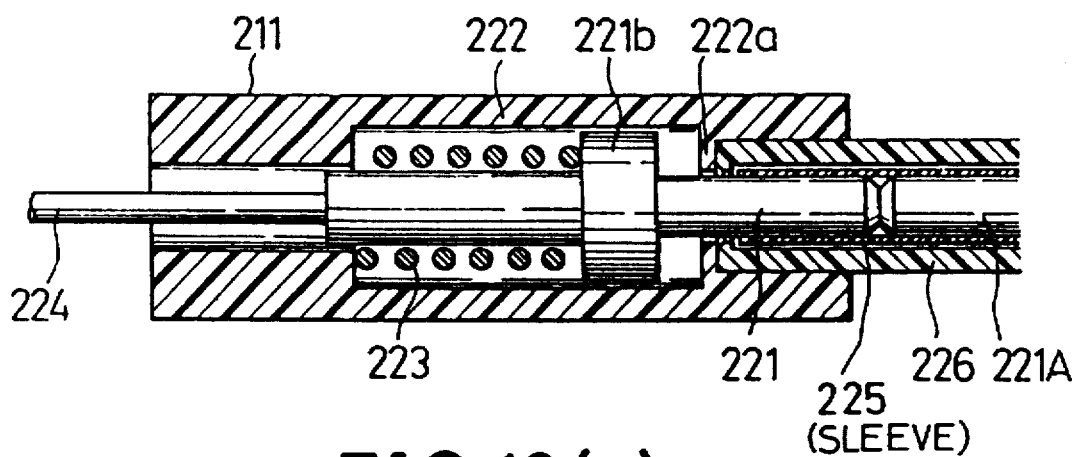
Figure 13C:
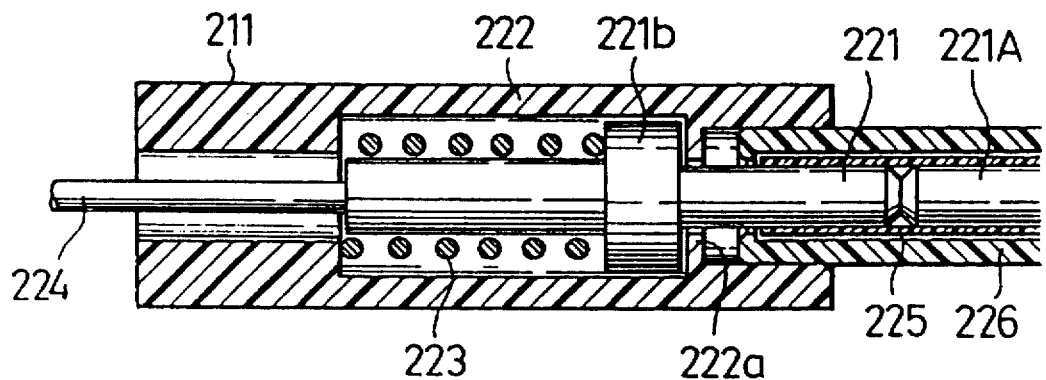

FIGS. 13(a) to 13(c) show a prior-art plug structure and the positional relationship between the plug and jack when the single optical fiber connector is applied to the plug-in optical connector.

With reference to these drawings, the ferrule 221 for supporting the optical fiber 224 is urged via the flange portion 221b by a spring 223, and the flange portion 221b is in contact with an inner wall 222a of a plug housing 222.

The ferrule 221 and another ferrule 221A supported by a jack side ferrule (not shown) are butted against each other within the elastic sleeve 225 by inserting a sleeve holder 226 (fitted into the jack side plug) into the plug 211 to couple the two optical fibers. In the case of the plug-in optical connector, an axial engagement error of about 1 mm can be absorbed by a clearance between the inner wall 222a and the sleeve holder 226 when the two ferrules are coupled. After coupled, the two optical connectors are automatically locked independently when the package board is inserted to maintain the two element positional relationship correctly.

Figure 14A:
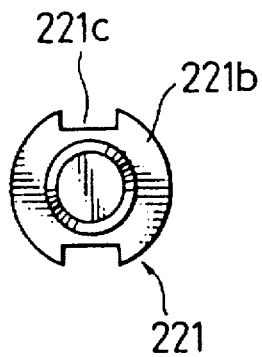
FIG. 14(a) is a front view showing a prior-art ferrule.
Figure 14B:
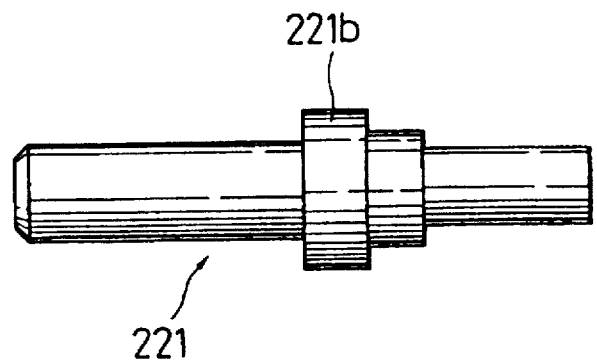
FIG. 14(b) is a side view showing the same prior-art ferrule.

FIGS. 14(a) and 14(b) show the ferrule 221. The ferrule 221 is formed with a flange portion 221b with two key grooves 221c. Therefore, when keys (not shown) provided for the plug housing 222 are engaged with the key grooves 221c, it is possible to prevent the ferrule 21 from being rotated.

In the optical connector explained in clause (3) above, since the connector 213 is of plug-in type as in clause (2) above, it is necessary to absorb an axial engagement error of about 1 mm when coupled. Therefore, it is necessary to consider the first extreme coupling position where the plug and jack are close to each other as shown in FIG. 13(b) and the second extreme coupling position where the plug and jack are apart from each other by a clearance between the inner wall 222a and the sleeve holder 226 as shown in FIG. 13(c). To provide this clearance, the elastic sleeve 225 must be shortened or the ferrule 221 must be lengthened. If the elastic sleeve 225 is short, the connection reliability is deteriorated; and if the ferrule 221 is long, the bending strength of the ferrule 221 is reduced and not preferable from the standpoint of interchangeability with other optical connectors. Further, although it may be possible to provide another axial engagement error absorbing mechanism separately from each plug element, this results in another problem in that the size of the plug housing 222 is increased and thus the fiber mounting density is reduced.

The third feature of the optical connector according to the present invention is to provide an optical connector ferrule support structure and optical connector plug whose optical connector element can be engaged and disengaged by simple insertion and removal operation and by which an axial engagement positional error of about 1 mm can be absorbed when used as a plug-in optical connector. Further, another object of the present invention is to provide an optical connector ferrule support structure applicable to the self-lock optical structure as disclosed with reference to FIGS. 2 and 3.

With reference to FIGS. 15 to 17, a ferrule support structure and an optical connector plug used for the ferrule support structure according to the present invention will be explained hereinbelow.

Figure 15A:
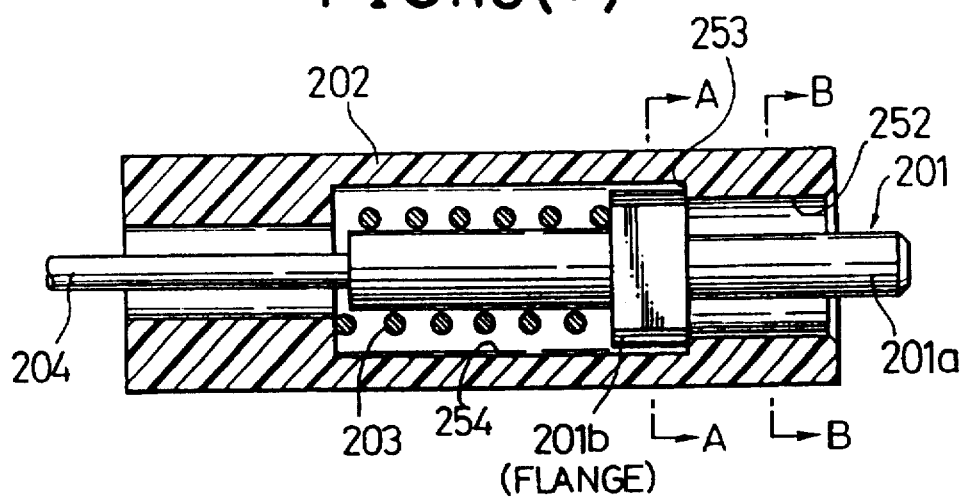
FIG. 15(a) is a cross-sectional view showing an embodiment of the optical connector plug according to the present invention.
Figure 15B:
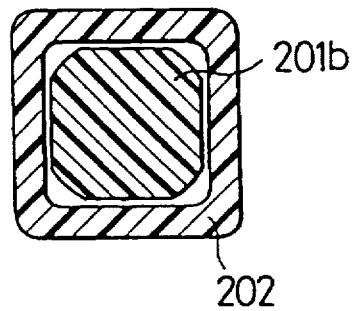
FIG. 15(b) is a cross-sectional view taken along the line A—A in FIG. 1(a)
Figure 15C:
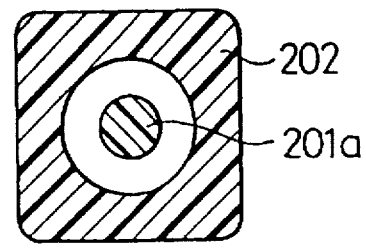
FIG. 15(c) is a cross-sectional view taken along the line B—B.
Figure 17A:
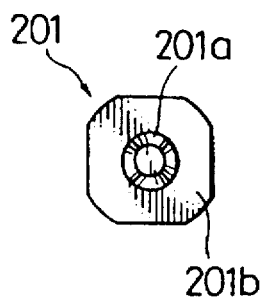
FIG. 17(a) is a front view showing the ferrule.
Figure 17B:
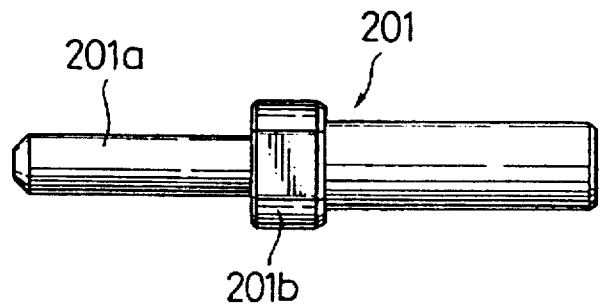
FIG. 17(b) is a side view showing the ferrule.

FIG. 15(a) is a cross-sectional view showing an embodiment of the optical connector plug according to the present invention; FIG. 15(b) is a cross-sectional view taken along the line A—A in FIG. 15(a); FIG. 15(c) is a cross-sectional view taken along the line B—B; FIG. 17(a) is a front view showing the ferrule; and FIG. 17(b) is a side view showing the ferrule.

As shown in FIG. 15(a), an optical fiber 204 is bonded to a body of a ferrule 201, and the ferrule 201 is floatingly supported within the plug housing 202. The ferrule 201 is formed with a flange portion 201b slidably fitted into the plug housing 202. As shown in FIGS. 15(b) and 17(a) the flange portion 201b is formed into a square shape whose corners are chamfered in cross section. Therefore, the plug housing 202 is formed with a square hollow portion to which the flange portion 201b of the ferrule 201 is fitted without rotation. The shape of the flange portion 201b is not limited to a chamfered square shape, and a polygonal (e.g. hexagonal) shape can be applicable. A spring 203 is housed within the plug housing 202 to urge the flange portion 201b of the ferrule 201 in the rightward direction in FIG. 15(a).

The large-diameter hollow portion 254 of the plug housing 202 communicates with the small-diameter ferrule support portion 252 via a shoulder opening portion 253 to receive the outer circumferential edge of the flange portion 201b by a shoulder portion 253. As shown in FIG. 15(c), an end portion 201a of the ferrule 201 is floatingly supported within a ferrule support portion 252 and fitted to a sleeve holder 206, as described later.

Figure 16A:
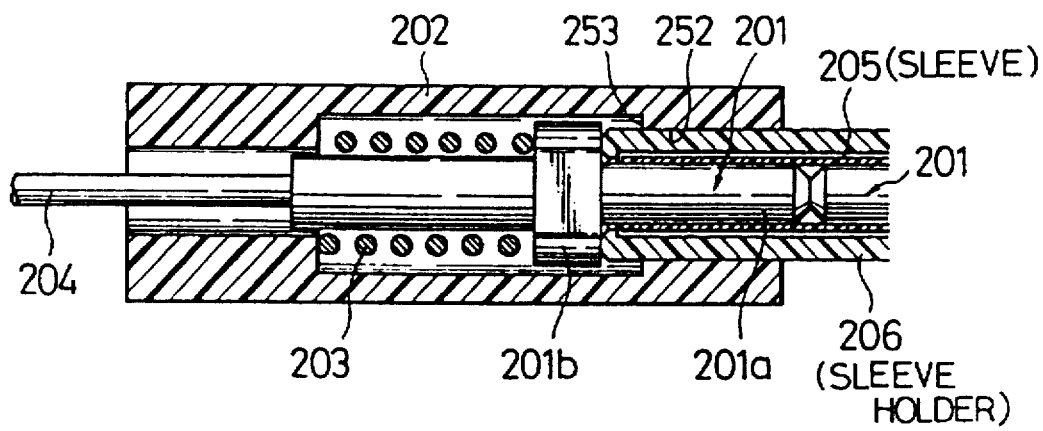
FIGS. 16(a) and 16(b) are cross-sectional views for assistance in explaining the engagement relationship between the optical connector plug and the sleeve holder.

The ferrule support structure will be explained with reference to FIGS. 16(a) and (b), in which a plug and jack are engaged. The plug includes an elastic slit sleeve 205 and a sleeve holder 206 for supporting the slit sleeve 205. In FIG. 16, no jack side is shown. The sleeve holder 206 is slidably fitted into the ferrule support portion 252, and inserted into the plug housing 202 through the shoulder opening portion 253.

Figure 16B:
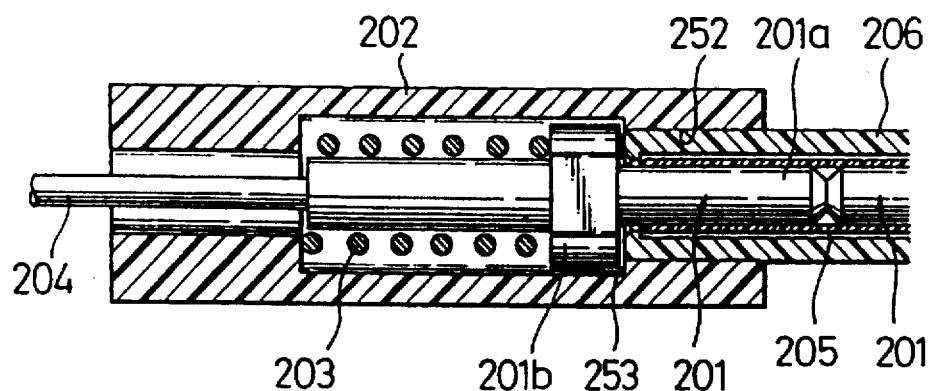

In the ferrule support structure as described above, the sleeve holder 206 can be inserted into the plug housing 202, because no inner wall 222a formed in the prior-art structure as shown in FIG. 13 is formed. Therefore, as shown in FIG. 16(a), it is possible to insert the sleeve holder 206 deep from the initial ferrule position beyond the shoulder portion 253 against the urging force of the spring 203, thus absorbing an axial engagement error when used as a plug-in optical connector. Accordingly, as shown in FIG. 16(b), the deepest engagement position can be determined in the state where the ferrule 201 is the most deeply inserted into the slit sleeve 205 in the same way as in the ordinary single fiber optical connector.

Further, it is necessary to couple two ferrules in the same angular position, in order to obtain an excellent optical connector coupling and decoupling characteristics. In the ferrule support structure of the present invention, since the ferrule flange portion 201b is formed into chamfered square shape, it is possible to reliably determine the angular position of the ferrule 201 about the axis thereof, thus permitting an excellent ferrule engagement and disengagement characteristics.

As described above, in the optical connector ferrule support structure and the optical connector plug according to the present invention, since it is possible to insert the ferrule from the initial position further deep by inserting the sleeve holder 206 into the plug housing 202, the axial engagement error can be easily absorbed, without providing another special parts or mechanism. Further, the structure can be effectively applied to the small-sized and multifiber plug-in optical connector. In addition, since the structure can be applied to the single fiber optical connector, it is possible to reduce the cost of the optical connector plug, because the plug can be used in common for both the single and multifiber plug-in optical connector. Further, the angular position of the ferrule can be determined by the square flang portion of the ferrule, it is possible to further reduce the size of the optical connector, which is effective in particular when a multifiber plug-in optical connector is constructed.

The fourth feature of the present invention relates to an optical connector for removably connecting an optical cord, and in particular to secure a coupling force against a tensile force applied to the optical cord in connection.

Prior to the description of the optical connector, a reference will be made to a prior-art optical connector with reference to the attached drawings.

When a plurality of optical cords including optical fibers, respectively are removably coupled, in general an optical connector is used in such a way that an optical plug is connected to an end of an optical cord, respectively, and the optical cords are connected to each other with these optical plugs via a plug adapter. A high performance small coupling loss optical connector easily and removably engageable with a plug adapter is disclosed in Japanese Published Unexamined Patent Appli. No. 63-239407, for instance as a single core optical connector.

FIG. 1(b) shows the structure of this single core optical connector. An optical plug 12 is connected to an end portion of an optical cord (fiber) 18. An plug adapter 10 removably engaged with the optical plug 12 includes an adapter housing 10a. Elastic levers 17 are provided within the adapter housing 10a. Each elastic lever 17 is formed with an engage claw 20 and two side projections 17a of the free end thereof. On the other hand, the optical plug 12 includes a ferrule 15, a plug housing 16 formed with an engage projections 18, and a knob block 9 slidably attached to the plug housing 16 and formed with release projections 11.

Therefore, when the optical plug 12 is engaged with the plug adapter 10, since the engage claws 20 formed in the elastic levers 17 provided in the plug adapter 10, respectively are brought into contact with the engage projections 18 formed in the plug housing 16 of the optical plug 12, the plug adapter 10 is coupled to the optical plug 12. Reversely, when the optical plug 12 is removed from the plug adapter 10, since the knob block 9 of the optical plug 12 is removed from the adapter housing 10, the release projections 11 formed in the knob block 9 are brought into contact with the side projections 17a to deform the elastic arm 17, so that the engagement between the claws 20 and the engage projections 18 is released to allow the optical plug 12 to be decoupled from the plug adapter 10.

Figure 18:
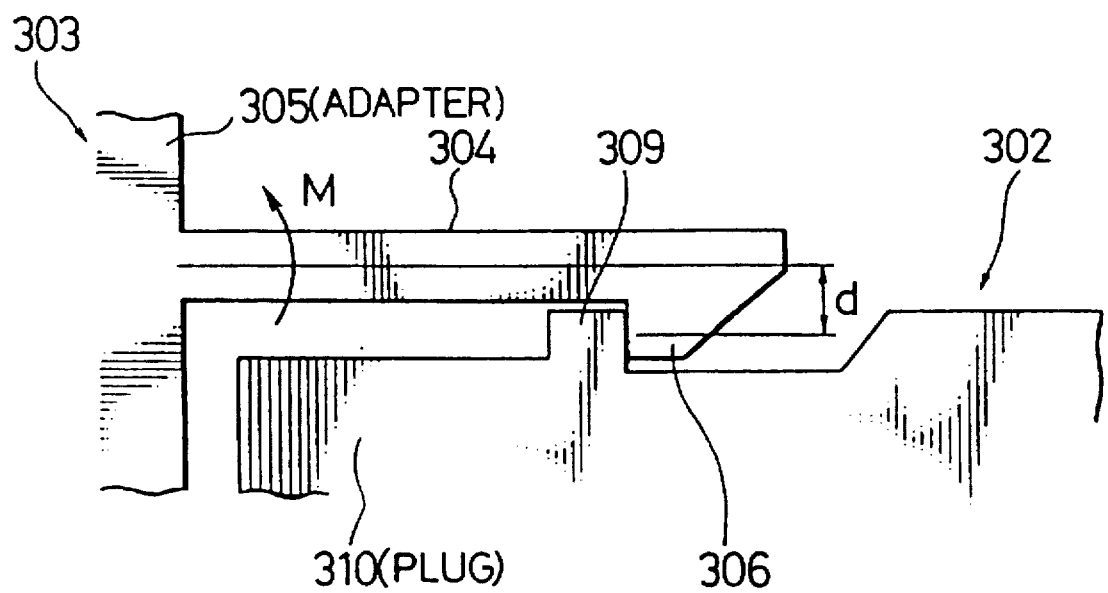
FIG. 18 is a pricipal illustration showing the engagement relationship of the prior-art optical connector.

FIG. 18 shows an enlarged view showing the prior-art engagement portion of the single core optical connector, in which the engagement between the optical plug 302 and the plug adapter 303 is achieved between the claw 306 of the elastic lever 304 provided in the adapter housing 305 and the engage projection 309 formed at an end of the plug housing 310. Therefore, when the optical plug 302 is pulled in the rightward direction in the drawing, a force is transmitted to the claw 306 via the engage projection 309. In this case, since a point of force application is offset by a distance d from the base portion of the elastic lever 304, a counterclockwise moment M is applied to the elastic lever 304 at the fixed portion of the elastic lever 304.

Therefore, when a tensile force between the optical plug 302 and the plug adapter 303 is large, there exist problems in that the free end portion of the elastic lever 304 is bent upwardly, so that the engage surface of the claw 306 slips away from the engage surface of the engage projection 309 into disengagement condition and therefore the optical plug 302 is removed from the plug adapter 303.

To overcome this problem, the frictional coefficient between the engage surface of the claw 306 and that of the engage projection 309 has been increased or an angle subtended by the tensile direction of the optical plug 302 and the engage surface between the claw 306 and the engage projection 309 has been determined to be an acute angle, as disclosed in the afore-mentioned document 63-239407.

However, when the optical connector is small in size, since the dimensions of the claw 306 and the engage projection 309 are also small, it is rather difficult to obtain a sufficient frictional force between the claw 306 and the engage projection 309. Further, if the angle between the tensile direction and the engage surface (between the claw 306 and the projection 309) is determined to be an acute angle, since a stress is concentrated to these claw 306 and the fixed portion of the engage projection 309 and therefore these parts are easily broken, it has been difficult to prevent the optical plug 302 from being removed from the plug adapter 303.

The fourth feature of the optical counter according to the present invention is to provide an optical connector by which the optical plug can be engaged with the plug adapter firmly even when a large tensile force is applied to the optical cord.

Figure 19:
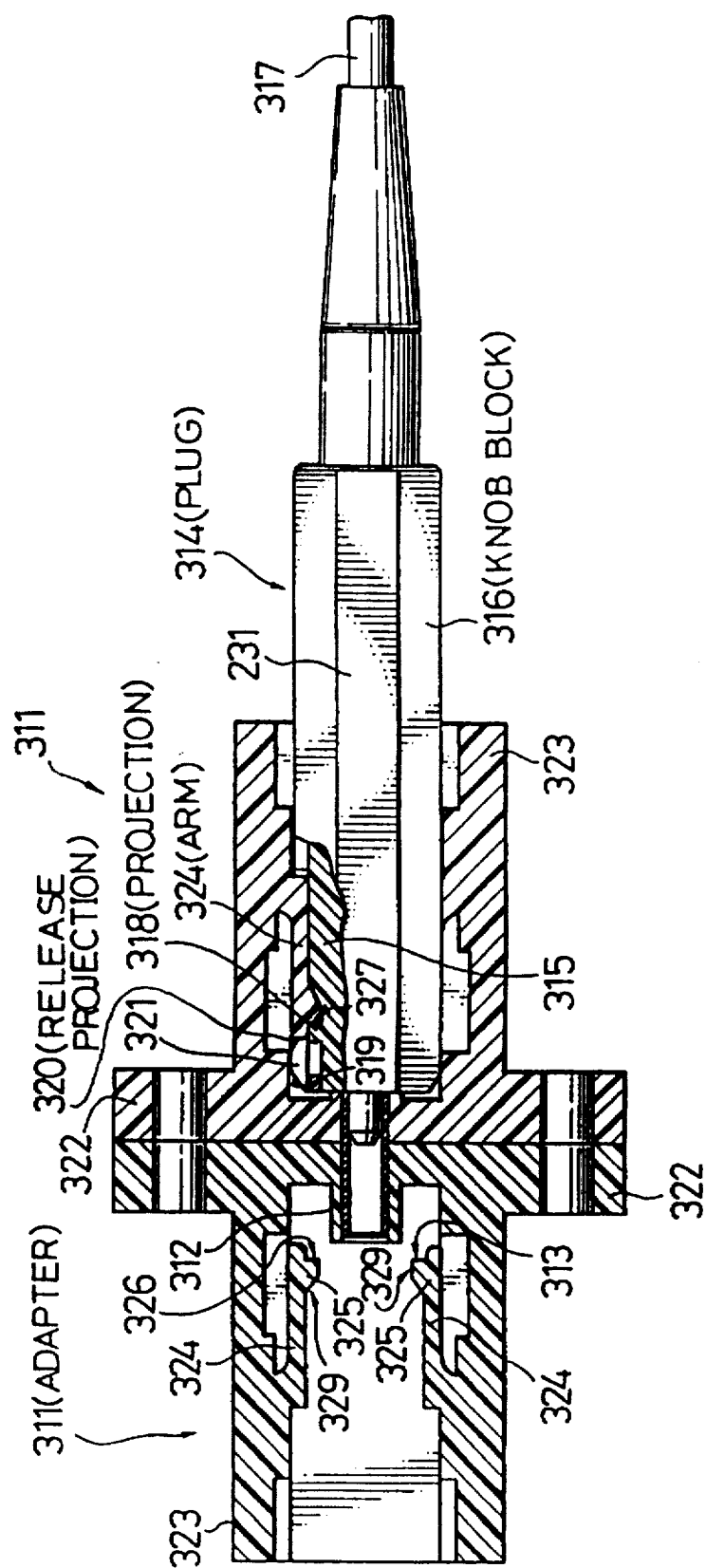
FIGS. 19 to 24 are views for assistance in explaining the fourth feature of the present invention.
Figure 20:
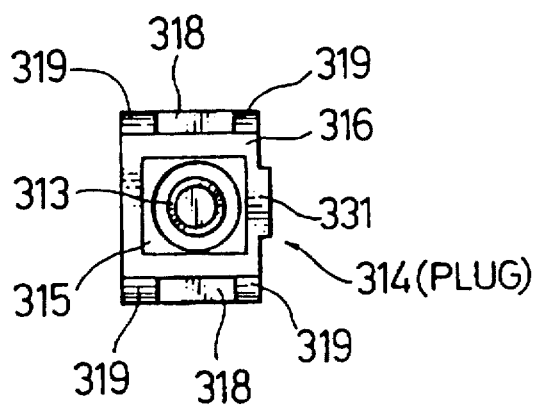
Figure 21:
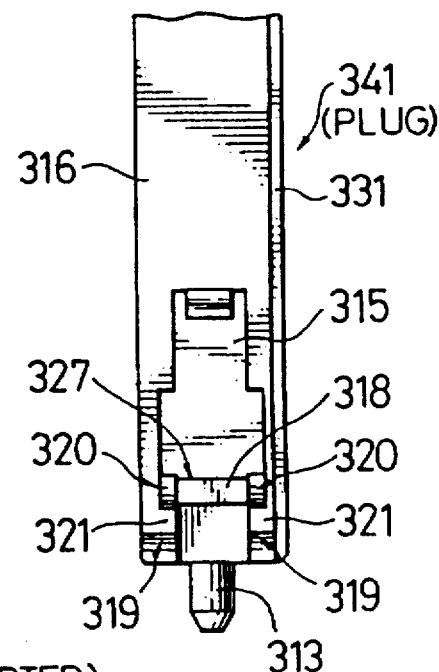
Figure 22:
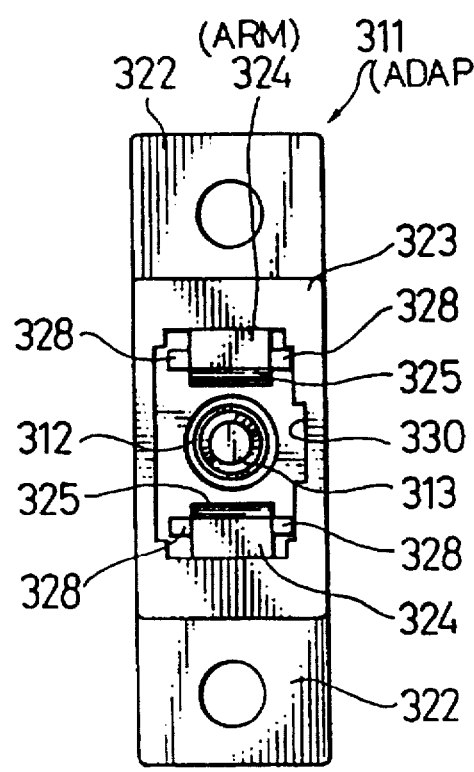

FIG. 19 shows an embodiment of a push-pull type optical connector according to the present invention. FIG. 20 is a front view of the optical plug and FIG. 21 is a plan view thereof. FIG. 22 shows a left side surface of the optical connector shown in FIG. 19.

A plug adapter 311 is used to connect two optical plugs 314 under butt conditions. A cylindrical sleeve 312 is fitted to the center of the plug adapter 311. A ferrule 313 is also closely fitted to the cylindrical sleeve 312. An optical plug 314 having the ferrule 313 at one end is formed with a plug housing 315. A square knob block 316 is fitted to the plug housing 315 so as to be slidable within a predetermined range in the axial direction of the optical plug 314. The plug housing 315 to which an optical cord 317 is attached is formed with a pair of engage projections 318 at the inner end thereof. On both sides of these engage projections 318, an engage release projection 321 having an insertion inclined surface 319 and a removal inclined surface 320 is formed for the knob block 316 at the end thereof.

The plug adapter 311 includes a coupling flange 322 and a square claw holder 323 into which the optical plug 314 is inserted. The square claw holder 323 is formed with a pair of elastic arms 324 extending axially and inwardly from outside to inside so as to sandwich the optical plug 314. Each elastic arm 324 is formed with a claw 325 engageable with each engage projection 318 of the optical plug 314. An engage surface 326 of this claw 325 is formed facing inward, and an engage surface 327 of the engage projection 318 is formed facing outward. Further, the elastic arm 324 of the optical adapter 311 is formed with two release side portions 328 (shown in FIG. 22) on both the sides of the engage claw 325, respectively so as to be brought into contact with the insertion inclined surface 319 and the removal inclined surface 320 of the engage release projection 321 of the optical plug 314.

Figure 23:
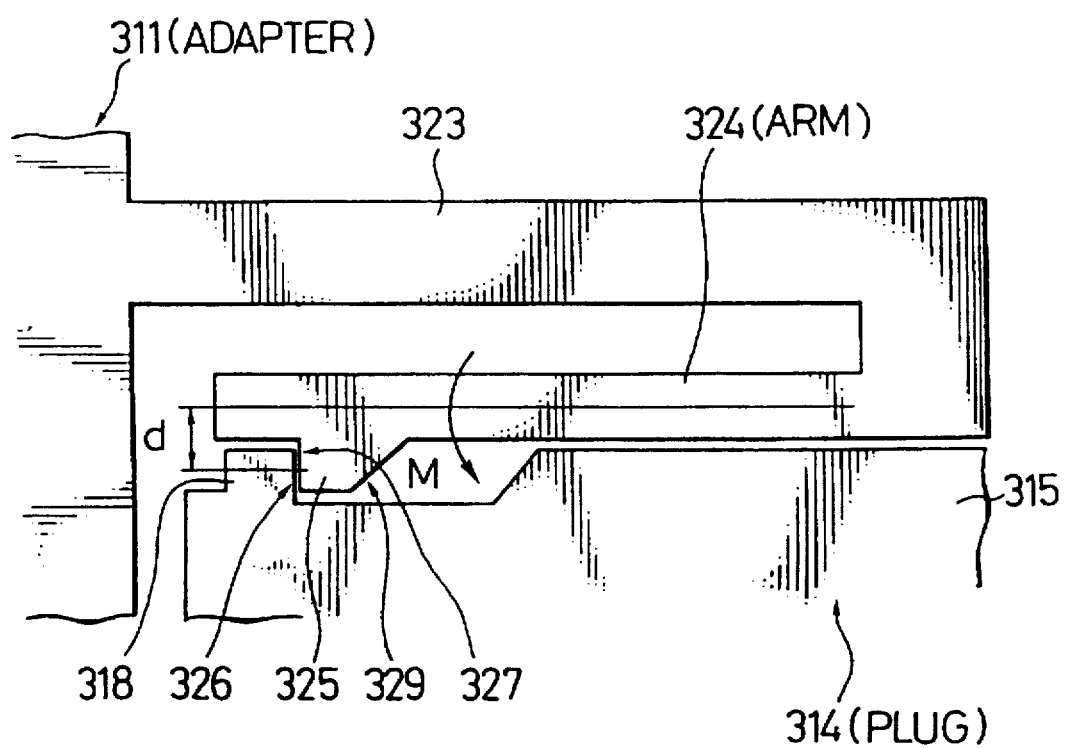

Therefore, as shown in FIG. 23, when the optical cord 317 is pulled and therefore the plug 314 is pulled in the rightward direction from the optical adapter 311, although the tensile force is applied to the claw 325 via the engage projection 318, since a point of force application is offset inward by a distance d from the fixed portion of the elastic arm 324 extending from the claw holder 323, a counterclock wise moment M is generated around the fixed portion of the elastic arm 324.

As a result, when a tensile force is applied so that the optical plug 314 is removed from the plug adapter 311, the free end of the elastic arm 324 is bent inward in the direction that the engage surface 326 of the claw 325 is brought into tight contact with the engage surface 327 of the engage projection 318 to maintain the tight engagement condition between the optical plug 314 and the plug adapter 311.

As described above, when a tensile force is applied to the optical cord 317, since the claw 325 is further tightly engaged with the engage projection 318, it is possible to sufficiently increase the coupling strength between the two, without increasing the frictional coefficient between the engage surface 326 of the claw 325 and the engage surface 327 of the engage projection 318 or determining the angle between the optical cord removal direction and the two engage surfaces 326 and 327 at an acute angle.

In particular, when the optical connector is small in size, although the dimensions of the engage claw 325 and the engage projection 318 are also small, it is unnecessary to increase the frictional coefficient of the two engage surfaces 326 and 327 or to set the angle between the optical cord removal direction and the two engage surfaces 326 and 327 to an acute angle. Therefore, it is possible to reduce the stress concentration of the claw 325 and the fixed portion of the engage projection 318, thus increasing the strength of the claw 325 and the engage projection 318.

When the optical plug 314 is coupled to the plug adapter 311, the knob block 316 is pinched by the fingers and the end surface of the optical plug 314 is inserted into the plug adapter 311. In this case, since the insertion inclined surface 319 of the engage release projection 321 formed at the end of the knob block 316 is brought into contact with the engage release side projection 328 (FIG. 22) of the elastic lever 324, the free end of the elastic arm 324 is bent away from the engage projection 318. Subsequently, the removal inclined surface 320 is brought into contact with the engage release side projection 328 of the elastic lever 324, so that the knob block 316 is located within the plug adapter 311.

In parallel with the above operation, since the engage projection 318 of the optical plug 314 is brought into contact with an insertion inclined surface 329 of the claw 325 (opposite side to the engage surface 326), the free end of the elastic arm 324 is bent away from the engage projection 318. After the engage projection 318 has passed through the claw 325 of the elastic arm 324, the elastic arm 324 is automatically is returned to the original condition to engage the engage projection 318 with the claw 325 of the elastic arm 324.

On the other hand, when the optical plug 314 is removed from the plug adapter 311, the knob block 316 is pulled away from the plug adapter 311 in the rightward direction. Therefore, the knob block 316 is moved away from the optical plug 314 together with the optical plug 314 in the rightward direction. In this case, the removal inclined surface 320 of the engage release projection 321 formed at an end of the knob block 316 is brought into contact with the engage release side projection 328 of the elastic arm 324, so that the end of the elastic arm 324 is bent away from the engage projection 318. Therefore, the engagement between the engage projection 318 and the claw 325 is released. Under these conditions, the optical plug 314 can be removed from the plug adapter 311 together with the knob block 316.

Further, in this embodiment, in order to prevent the so-called reverse insertion of the optical plug into the plug adapter, the outer shape of the optical plug 314 is formed in asymmetry with respect to the axial center of the ferrule 313. In more detail, as shown in FIG. 22 the plug adapter 311 is formed with a locating groove 330 on one inner side wall thereof and the knob block 316 is formed with a locating projection 331 on one outer side well thereof so as to be engaged with the locating groove 330 as shown in FIG. 20. Further, the widths of the engage release projections 321 formed in the knob block 316 on both the sides thereof as shown in FIG. 21 and the widths of the engage release cutout portions 3 formed in the plug adapter 311 as shown in FIG. 22 are determined to be different between the right and left sides, respectively. In other words, since the coupling orientation between the plug adapter 311 and the optical plug 314 is determined, when the optical plug 314 is inserted into the plug adapter 311 in the opposite erroneous direction, since the wider engage release projection 321 interferes with the plug adapter 311, it is possible to prevent the optical plug 314 from being inserted into the plug adapter in erroneous orientation.

In the optical connector according to the present invention, since a distance between the end surface of the ferrule 313 of the optical plug 314 and the engage surface 327 of the engage projection 318 can be reduced smaller than that of the prior-art plug adapter shown in FIGS. 1(b) and 18, it is possible to determine the engage position between the engage projection 318 of the optical plug 314 and the claw 325 of the elastic arm 324 at a position near the inner end of the optical plug 314. Therefore, the optical connector of the present invention is preferably applicable to the plug-in optical connector.

Figure 24:
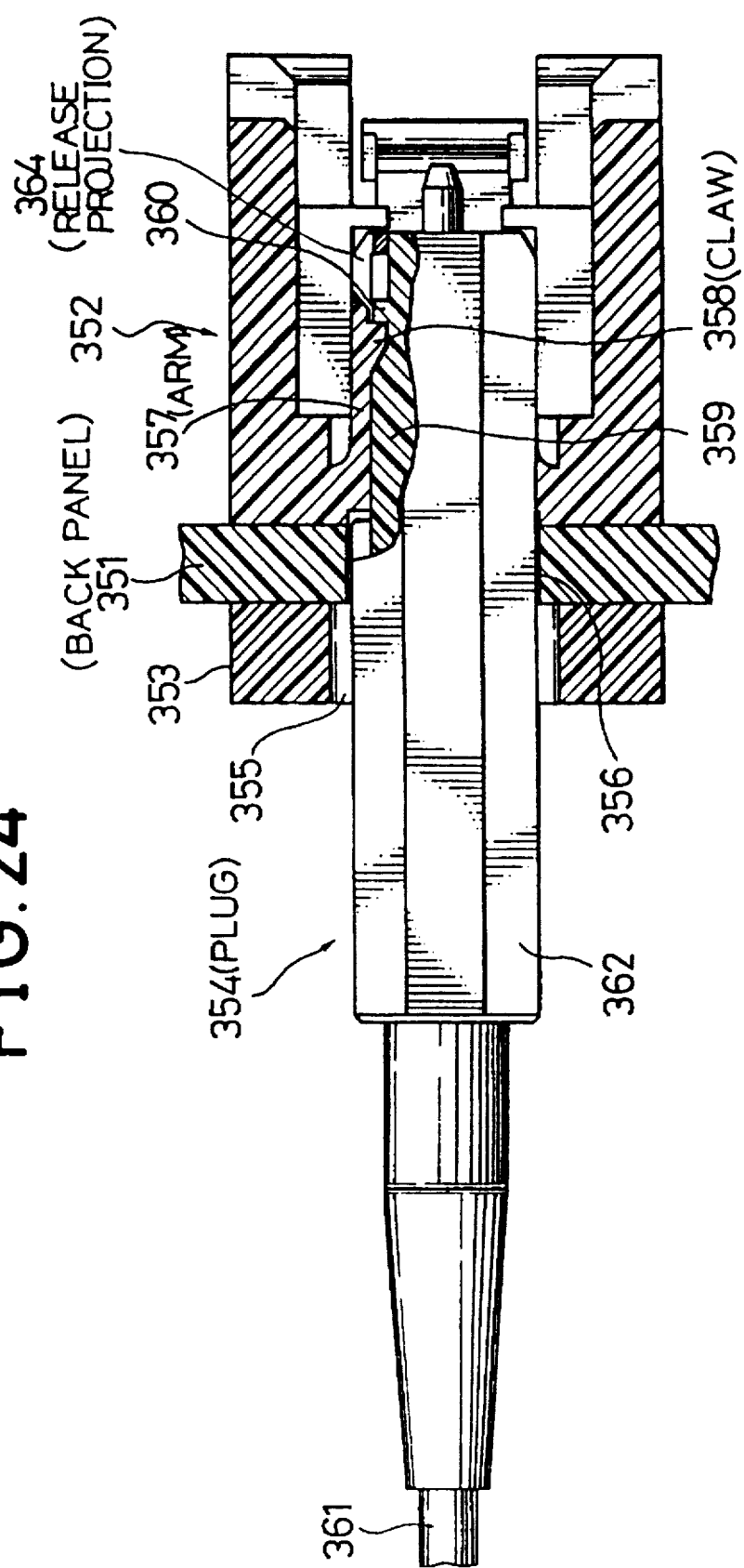

FIG. 24 shows another embodiment of the optical connector of the present invention, which is applied to a plug-in optical connector fixed to a back panel side of a book-self connector package unit.

In the drawing, a main back panel housing 352 (substantially the same in structure as the plug adapter 311 already explained) and a subsidiary back panel housing 353 are attached to a pack panel 351 so as to sandwich the pack panel 351 between the two housings 352 and 353. Into this main back panel housing 352, an optical plug 354 (substantially the same in structure as the optical plug 314 already explained) is removably inserted.

The subsidiary back panel housing 353 and the back panel 351 are formed with through holes 355 and 356, respectively through which the optical plug 354 is passed. An elastic arm 357 extends axially and inwardly from the back panel side of the main back panel housing 352. When a claw 358 of the elastic lever 357 is engaged with an engage projection 360 of a plug housing 359, the optical plug 354 is coupled to the main back panel housing 352.

In this embodiment, when an optical cord 361 extending from the optical plug 354 is pulled, since the tensile force is applied to the claw 358 of the elastic arm 357 via the engage projection 360 of the plug housing 359, the claw 358 and the engage projection 360 are more tightly engaged with each other as in the embodiment shown in FIGS. 19 to 22, so that the optical plug 354 is kept coupled with the main back panel housing 352.

Further, the well-known structure can be adopted on the package side. Or else, the structure shown in FIG. 19 can be modified as shown in FIG. 24. Further, when the optical plug 354 is removed from the main back panel housing 352, the knob block 362 is moved in the leftward direction in FIG. 24 in the same way as in the embodiment shown in FIGS. 19 to 22.

As described above, although the optical connector according to the present invention has been applied to the single core optical connector and the plug-in optical connector, it is of course possible to apply the optical connector according to the present invention to other optical connectors.

In the optical connector according to the present invention, even if a large tensile force is applied to the optical cord, since the free ends of the elastic arms of the plug adapter are deformed toward the engage projections of the optical plug, it is possible to maintain the tight engagement condition between the engage surfaces of the claws of the elastic arms and the engage surfaces of the engage projections of the optical plug. Further, the optical plug is removed from the plug adapter by simply moving the knob block away from the plug adapter, thus realizing an optical connector of higher tensile strength and excellent coupling/decoupling operability.

The fifth feature of the present invention relates to an optical connector structure for connecting an optical fiber, and more specifically to an optical connector locating structure suitable for a plug-in optical connector used to connect a package board on which optical or electrical parts are mounted to a unit frame or suitable when optical connectors are required to be arranged at high mounting density.

Prior to the description of the optical connector, a reference will be made to a prior-art optical connector with reference to the attached drawings.

JIS prescribes F04 single-core optical fiber connectors used to connect optical fibers, in which an optical fiber is fixed to the center of a cylindrical ferrule and this ferrule is inserted into a precise cylindrical hollow alignment sleeve so that two opposing ferrule end surfaces can be connected to each other.

Figure 25:
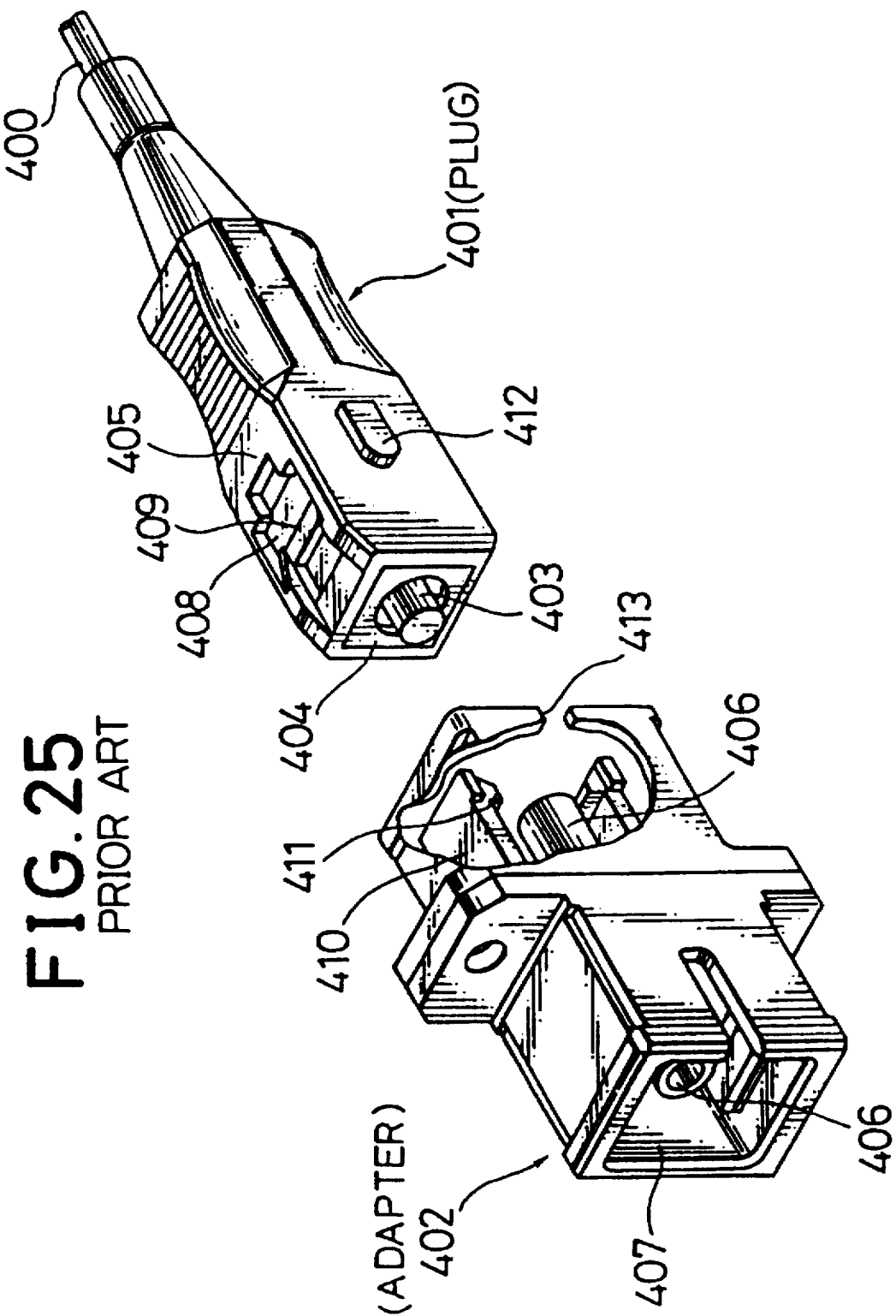
FIG. 25 is a perspective view showing a prior-art optical connector.

FIG. 25 shows this optical connector composed of an optical connector plug 401 and a connector housing 402 called adapter. A pair of optical connector plugs 401 are fitted to both the side surfaces of the connector housing 102 for coupling the two optical connector plugs 401.

The connector plug 401 is composed of a plug housing 404 for supporting a ferrule 403 attached to one end of the optical fiber 400 and a knob 405. The plug housing 104 is slidable in the axial direction of the ferrule 103 within the knob 405. The connector housing 402 engaged with the optical connector plug 401 is composed of a cylindrical hollow alignment sleeve 406 to which the ferrule 403 is inserted and an insertion hole 407 to which the end portion of the knob 405 is inserted. These optical connector plug 401 and the connector housing 402 are coupled to each other by fitting the ferrule 403 into the alignment sleeve 406 and fitting the knob 405 into the insertion hole 407, respectively. Further, the above engagement is locked when two claw portions 411 of two engage arms 410 of the connector housing 402 are engaged with two engage recessed portions 409 of two grooves 408 formed on two opposing side surfaces of the optical connector 401, respectively. When the optical connector as described above is used to connect a single core optical fiber, generally two mating plugs are coupled to each other in a predetermined orientation so as to eliminate an eccentricity between the ferrule and the optical fiber core, that is, to maintain a required connection characteristics.

In the case of the F04 single core optical fiber connector, therefore, a projection 412 is formed on one side surface of the optical connector plug 401, and a groove 413 fittable to this projection 412 is formed in the connector housing 402 so that the optical connector plug 401 having two symmetrical surfaces can be engaged with the connector housing 402 in a predetermined positional relationship.

On the other hand, where package boards on each of which various optical modules are mounted are attached to a unit frame and optical signals are transmitted between these package boards and between the package board and an external device, a plug-in optical is used as disclosed in U.S. Pat. No. 4,895,425 entitled "Plug-in Optical Fiber Connector".

In the case of the plug-in optical connector, a plurality of optical connector plugs are fitted to the respective housings, and two mated optical connector plugs are connected simultaneously when the two housings are coupled with each other. In this usage, it is required to mount a plurality of optical connector plugs on a housing at high mounting density.

Further, when a higher mounting density is required for the ordinary single core optical connector, a method of using an adapter is known to simultaneously couple a plularity of plugs.

Figure 26A:
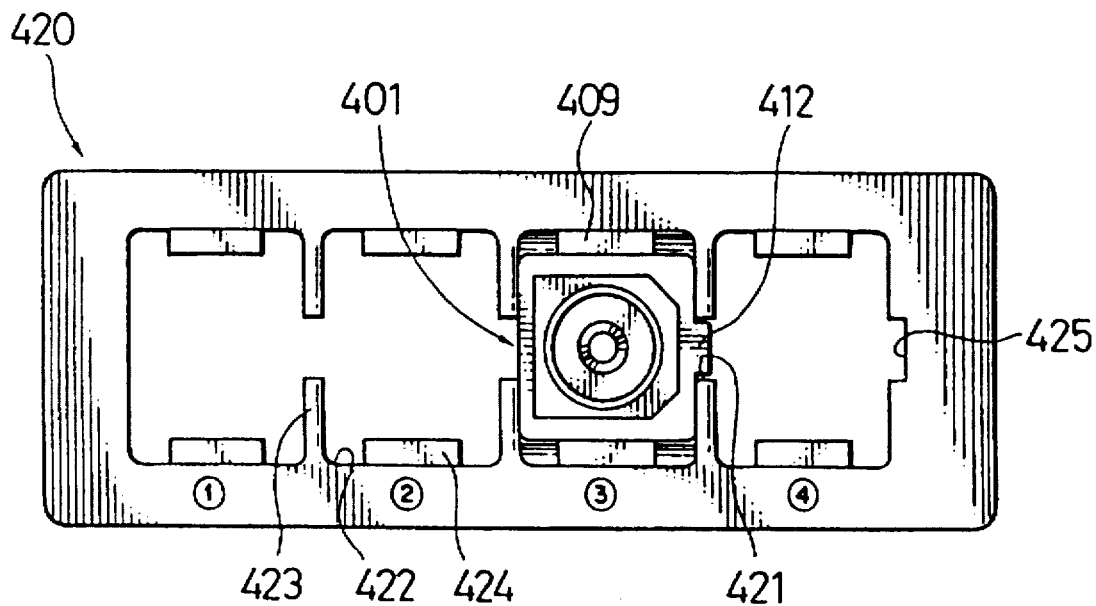
FIGS. 26(a) and 26(b) are front view for assistance in explaining the states where the prior-art optical connector plug is inserted into the connector housing.
Figure 26B:
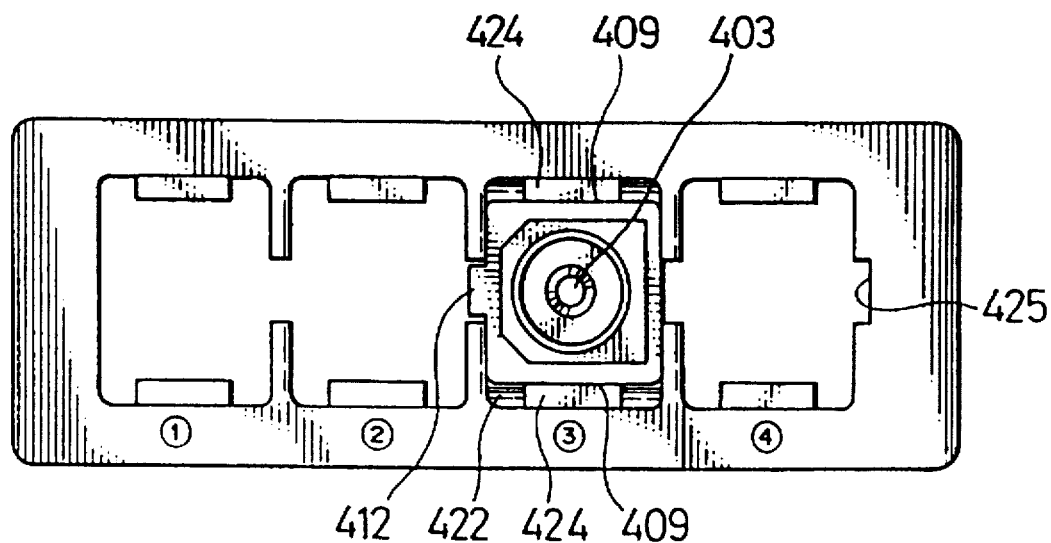

FIGS. 26(a) and (b) show a connector housing 420 to which a plurality of optical connector plugs 401 are fitted. In this case, since each groove 421 for receiving a projection 412 formed on the side surface of the optical connector plug 401 is formed at each insertion hole 422 of the connector housing 420, each partition wall 423 for partitioning two adjacent insertion holes 422 is cut away to minimize the mounting pitch, so that two adjacent insertion holes 422 are connected to each other as shown. When the optical connector plug 401 is coupled with the connector housing 420, the optical connector plug 401 is locked by engaging an engage member 424 formed on an inner surface of each insertion hole 422 of the connector housing 420 with a groove 409 formed in a side surface of the optical connector plug 401, in the same way as shown in FIG. 25.

FIG. 26(a) shows a state where an optical connector plug 401 is engaged with the above-mentioned connector housing 420, in which the optical connector plug 401 is fitted to the connector housing 420 by engaging two grooves 409 and a single projection 412 formed in the side surfaces of the optical connector plug 401 with two engage members 424 and a single groove 425 formed in the inner surfaces of the connector housing 420.

When the plug locating structure of the F04 optical connector as described above is adopted, the following problems arise:

Since the optical connector plug 401 is symmetrical with respect to the center line passing through the middle position of the groove 409, if the projection 412 is assumed to be removed, it is possible to fit the optical connector plug 410 into the insertion hole 422 (No. 3), for instance in two different directions as shown in FIGS. 26(a) and (b). In case the optical connector plug 401 is inserted in the direction opposite to the predetermined direction, since the eccentric direction of the fiber core is reversed with respect to the center of the ferrule 403 in the case of the single core optical fiber, there exists a problem in that the eccentricity of fiber axis changes as compared with when the two fibers are coupled under the predetermined (selected) coupling conditions and therefore the coupling loss increases. Further, where one of the optical plug connectors 401 is inserted reversely, there inevitably exists some insertion holes 422 into which other plug connectors will not be inserted.

The fifth feature of the optical connector according to the present invention is to provide an optical connector locating structure in which the optical connector plugs can be inserted only in a predetermined direction or orientation into a connector housing at which a plurality of optical connector plugs are mounted at the highest possible mounting density.

A preferred embodiment of the present invention will be explained with reference to the attached drawings.

Figure 28A:
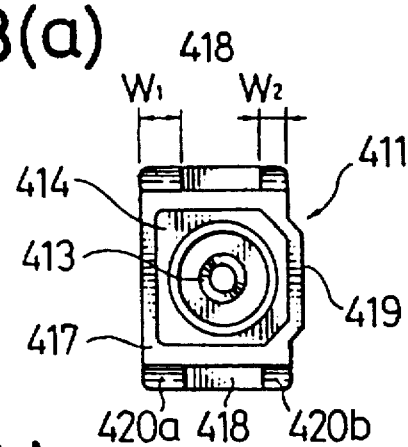
FIGS. 28(a) to 28(d) are illustrations for assistance in explaining the construction of the optical connector
Figure 28B:
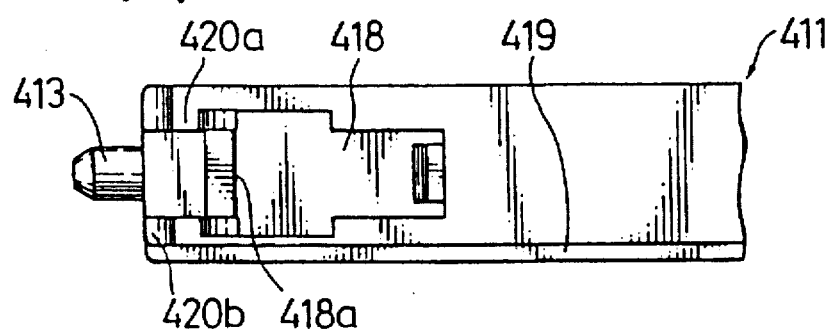
Figure 28C:
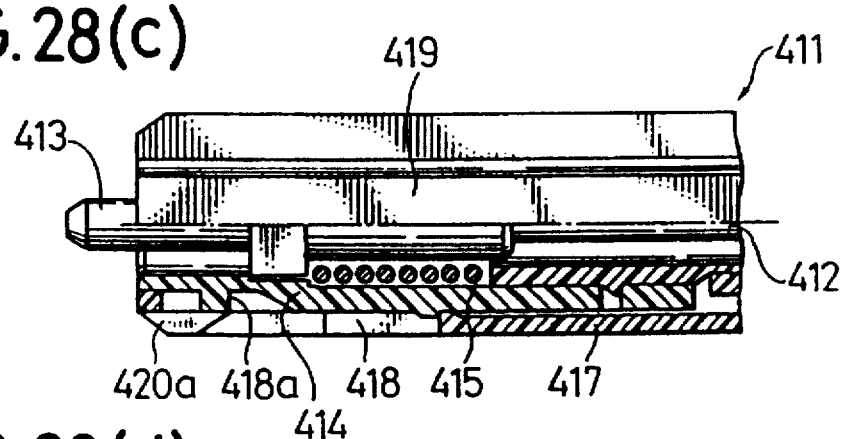
Figure 28D:
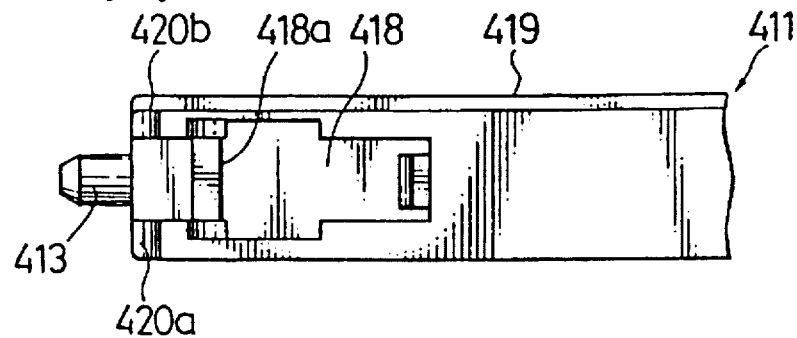
Figure 29:
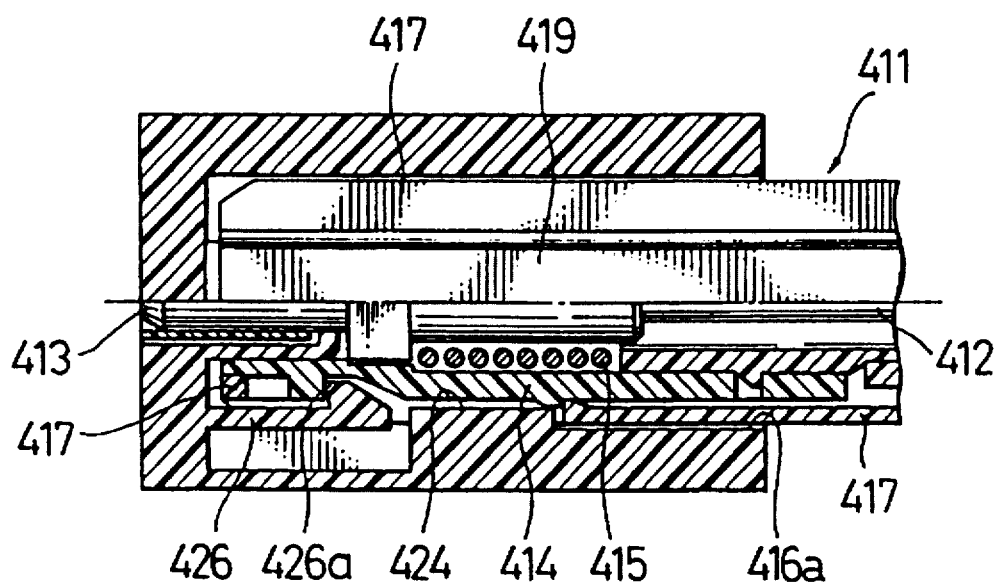
Figure 30:
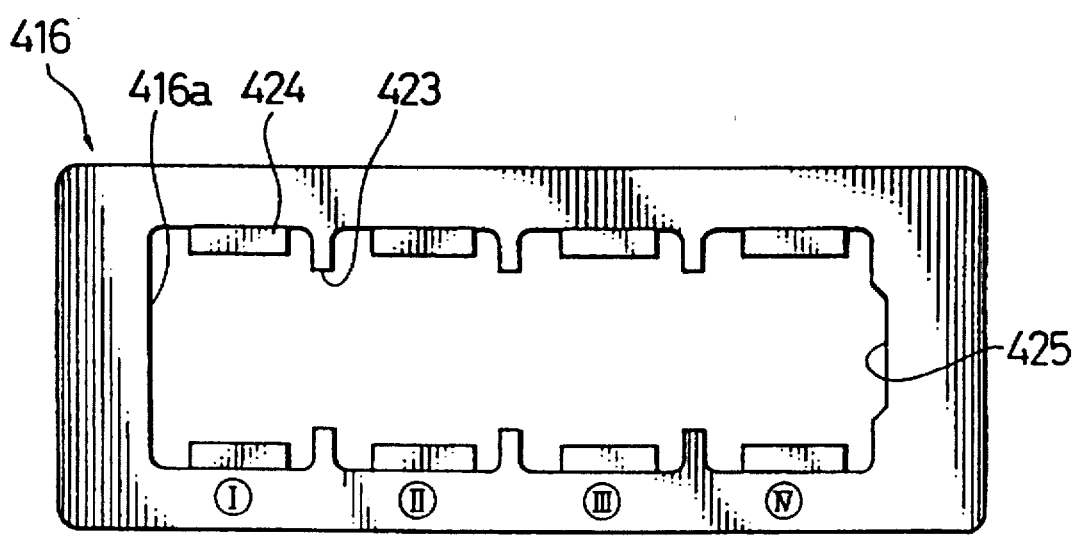

FIG. 27 is a perspective view showing the optical connector according to the present invention, FIG. 28(a) is a front view showing the optical connector plug, FIG. 28(b) and 28(d) are side views thereof, FIG. 28(c) is a side cross-sectional view thereof, FIG. 29 is a side cross-sectional view showing the state where the optical connector plug is inserted into the connector housing, and FIG. 30 is a front view showing the connector housing.

As shown in these drawings, an optical connector plug 411 comprises a plug housing 414 for supporting a ferrule 413 into which an optical fiber 412 is bonded, a spring 415 for urging the ferrule 413 and a knob 417 for locking and unlocking the optical connector plug to and from the connector housing 416, in the same way as in the prior-art F04 optical connector. The connector plug 411 is square in cross section thereof and formed with two axially extending grooves 418 on the opposing side surfaces of the knob 417 and with a projection portion 419 axially extending on another side surface thereof.

The groove 418 is formed on each of the two opposing side surfaces of the knob 417 so as to be a little offset from the middle portion thereof, in such a way that the width $W_1$ of one inclined projection portion 420a is wider than that $W_2$ of the other inclined projection portion 420b. Therefore, both the opposing side surfaces in which the grooves 418 are formed, respectively are symmetrical with respect to a plane passing through the center of the ferrule 413 in parallel to both the side surfaces of the square plug 411 and through the middle portion of the projection portion 419, but asymmetrical with respect to a center of the axis of the ferrule 413.

On the other hand, in the connector housing 416, the housing body 422 is formed with a plurality of insertion holes 416a into which optical connector plugs 411 are inserted, and with projections 424 and grooves 425 fitted to the grooves 418 and the projection 419 of the optical connector plugs 411, respectively.

Further, cylindrical hollow alignment sleeves 425 into each of which the ferrule 413 of the optical connector plug 411 is inserted are provided within the insertion holes 416a of the connector housing 416. Further, two elastic deformable engage arms 426 each having an engage claw 426a are formed within the connector housing 416 so as to be engageable with the recessed portion 418a of the groove 418 of the optical connector plug 411. Further, the engage arm 426 is formed with side projection portions 426b (only one is shown) brought into contact with the inclined projection portions 420a and 420b for locking and unlocking function, when the optical connector plug 411 is inserted into or removed from the connector housing 416. Therefore, when the optical connector 411 is inserted into the insertion hole 416a of the connector housing 416, the grooves 418 formed in both the surfaces of the knob 417 are engaged with the projections 424 formed within the insertion holes 416a, so that the claw portions 426a are engaged with the recessed portion 418a of the grooves 418 and further the projections 424 are engaged deep with the grooves 418 to engage the optical connector plug 411 with the connector housing 416 as shown in FIG. 29.

FIG. 30 shows an example of the connector housing 416 for supporting a plurality of optical connector plugs, in which four insertion holes 416a are formed as four parts I, II, III and IV.

Figure 31A:
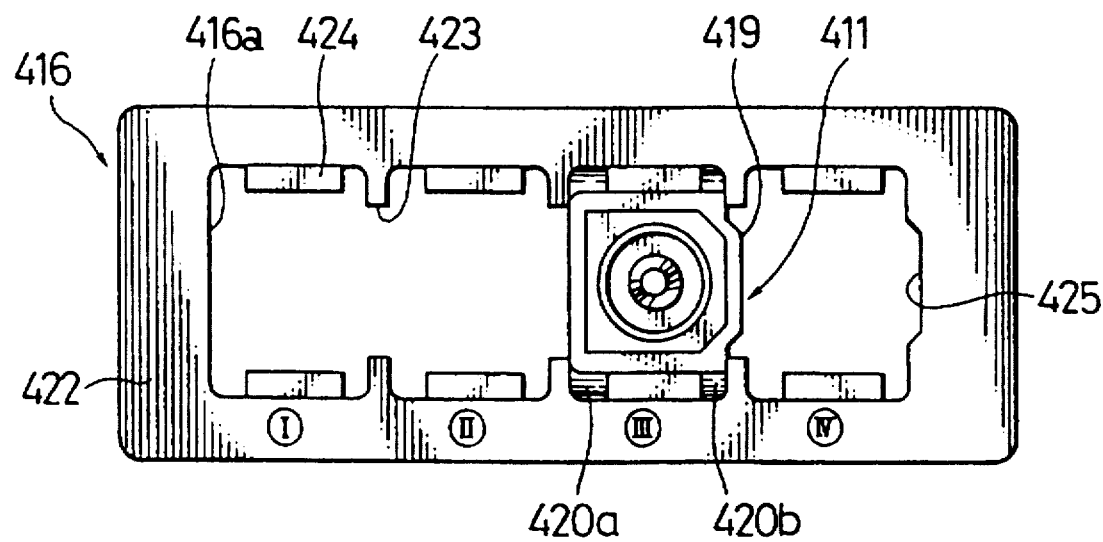
FIGS. 31(a) and 31(b) are plan views for assistance in explaining the states where the optical connector plug of the present invention is inserted into the connector housing.
Figure 31B:
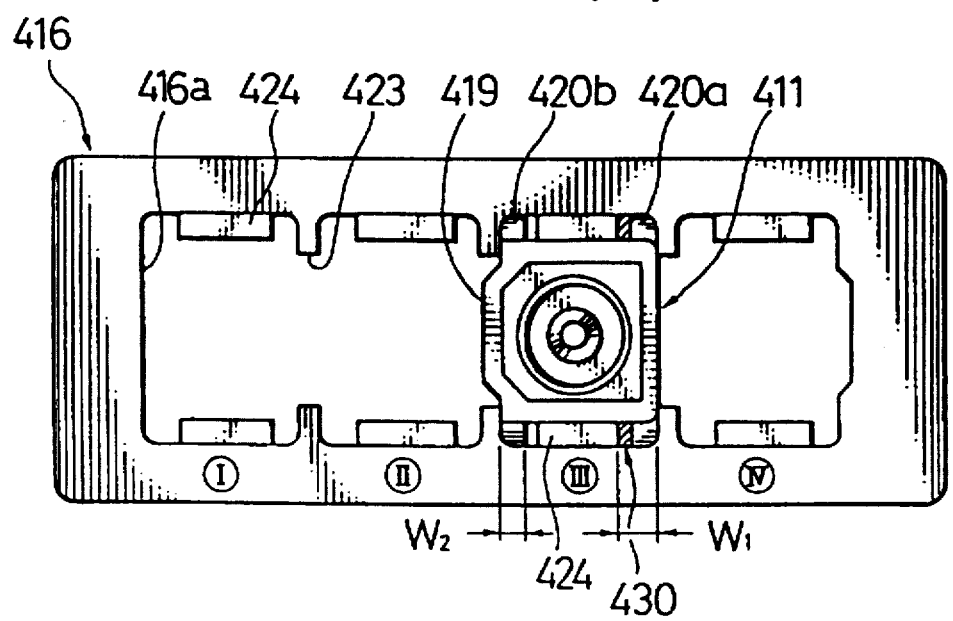

In the above-mentioned structure between the optical connector plug 411 and the connector housing 416, even when only a single optical connector plug is inserted into a part III, for instance as shown in FIG. 31(a), it is impossible to insert the optical connector plug 411 in the reverse direction, because the groove 418 between the projections 420a and 420b having two different widths $W_1$ and $W_2$ of the optical connector plug 411 will not be engaged with the projections 424 of the connector housing 416 with an interference 430 ($W_1-W_2$) between the two.

Therefore, it is possible to prevent the optical connector plug 411 from being inserted into the connector housing 416 erroneously even when the optical connectors 411 are arranged at the highest possible mounting density.

Further, in the above embodiment, the asymmetry with respect to the axial center of the optical connector plug 411 is realized by offsetting the grooves 418 from the longitudinal center of the knobs 417 to obtain two different widths $W_1>W_2$ of the two projections 420a and 420b. Without being limited thereto, however, it is possible to obtain the same effect by forming the two opposing surface shapes in symmetry with respect to a plane passing through the axial center of the connector plug and parallel to the two opposing surfaces but in asymmetry with respect to an axial center of the connector plug.

As described above, in the optical connector plug locating structure according to the present invention, since the two opposing surfaces are symmetrical in shape with respect to a plane passing through the axial center of the connector plug and a middle portion of the plug projection but asymmetrical in shape with respect to the axial center of the connector plug, it is possible to prevent the optical connector plugs from being inserted into the connector housing erroneously in the reverse direction when the optical connector plugs are mounted at the highest possible arrangement density.

Therefore, the structure of the present invention is advantageous in particular when applied to a plug-in optical connector for allowing a plurality of fibers to be connected simultaneously, because the highest possible mounting density is required for the plug-in optical connector.

The six features of the present invention relates to an optical connector jack used for a plug-jack optical connector for removably connecting an optical fiber.

Prior to the description of the optical connector, a reference will be made to a prior-art optical connector with reference to the attached drawing.

The prior-art optical connector is classified into a plug-adapter-plug (PAP) optical connector and a plug-jack (PJ) optical connector. The PAP optical connector is composed of two optical connector plugs for supporting two ferrules, respectively to each of which an optical fiber end is connected, and an optical adapter engaged with these plugs so as to support two alignment sleeves to each of which the ferrule is inserted. Further, the PJ optical connector is composed of an optical connector plug for supporting the ferrule to which an end of the optical fiber is connected, and an optical connector jack engaged with the optical connector plug and supporting the ferrule to which an optical fiber end is connected and the alignment sleeve into which the ferrule is inserted.

Figure 32:
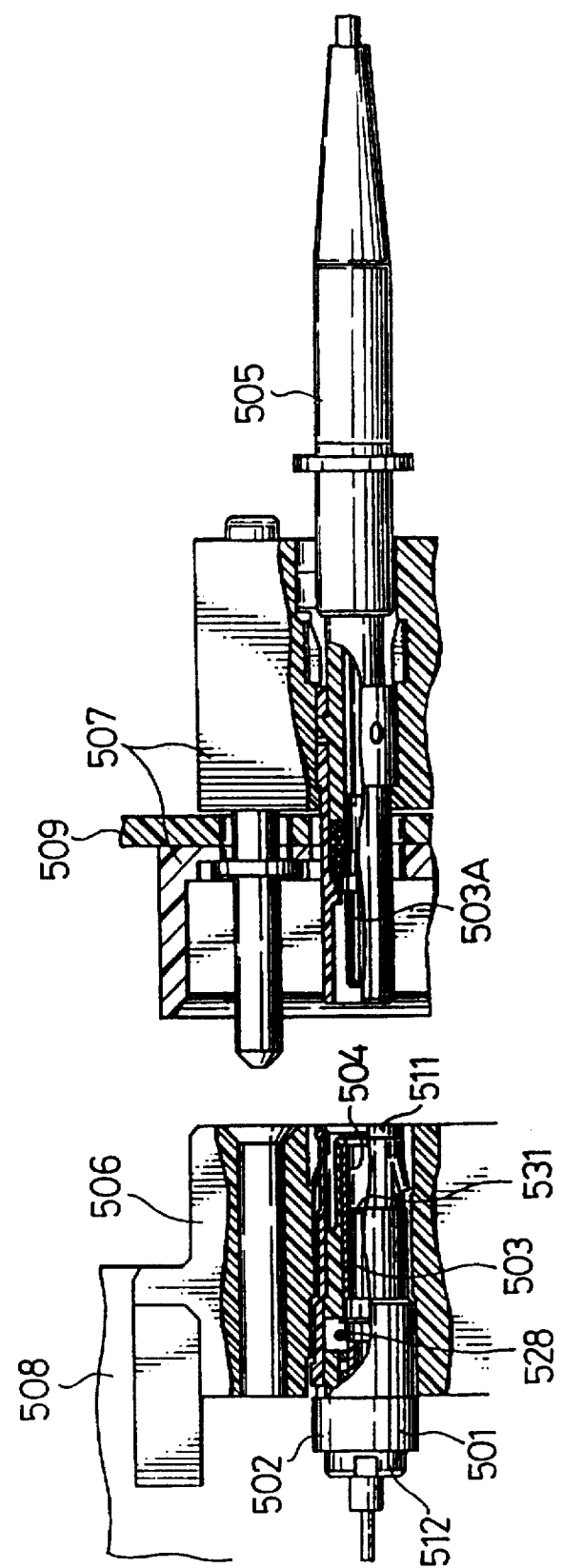
FIG. 32 is a cross-sectional view showing a prior-art plug-jack optical connector.

In various optical devices, however, the P-J optical connectors are widely used. FIG. 32 shows a prior-art P-J optical connector applied to a plug-in optical connector disclosed in U.S. Pat. No. 4,895,425. This optical connector includes a package connector 506 attached to a package board 508 and a back panel connector 507 attached to a back panel 509. That is, an optical connector plug 505 is attached to the back panel connector 507. The connector plug 505 supports a ferrule 503A to which an optical fiber end is connected. An optical connector jack 501 is attached to the package connector 506. The optical connector jack 501 is constructed so as to be engaged with the optical connector plug 505. Within a jack body 502 of the optical connector jack 501, an alignment sleeve 504, a ferrule 503 and a housing 521 for supporting these elements 503 and 504 are housed. The ferrule 503 is inserted into the alignment sleeve 504 and an optical fiber end is connected to the ferrule 503.

Therefore, the two optical fibers are connected by locating the optical connector jack 501 and the optical connector plug 505, inserting the ferrule 503A within the optical connector plug 505 into the alignment sleeve 504 within the optical connector jack 501, opposing two ferrule end surfaces 531 coaxially, and pushing these two ferrules against each other by a spring 528.

Here, since not only the ferrule 503 but also the ferrule 503A are inserted into the alignment sleeve 504, the ferrule end surface can be located roughly at the center of the alignment sleeve 504. In other words, the end surface 531 of the ferrule 503 is located inside the alignment sleeve 504, that is, deep within the optical connector jack 501.

In the above-mentioned optical fiber connection by the optical connector, when dust or wear chip attached onto the inner surface of the ferrule end surface 531 and the alignment sleeve 504, the connection characteristics of the optical fibers are deteriorated due to an increase in connection loss or return loss. Therefore, it is necessary to periodically clean the ferrule end surface 531 and the alignment sleeve 504.

In the prior-art optical connector jack, however, since the ferrule end surface 531 and the alignment sleeve 504 are located deep within the jack from the structural standpoint, it has been difficult to clean the ferrule end surface 531 located deep within the alignment sleeve 504 by inserting a cleaning element (e.g. a cotton swab) into a narrow alignment sleeve 504.

With the development of optical communications technology, since the optical connectors are reduced in size more and more for higher arrangement density, it is indispensable to reduce the length and the diameter of the ferrules 503 and 503A and the alignment sleeve 504.

In the prior-art optical connector jack, however, when the inner diameter of the alignment sleeve 504 is further reduced, it is impossible to insert a cotton swab into the sleeve 504, so that it is impossible to clean the ferrule end surface 531 and the alignment sleeve inner surface.

Further, in the optical connector, whenever the connectors are connected to or disconnected from each other, wear chip is produced due to friction between the ferrule 503 or 503A and the alignment sleeve 504.

In case the wear chip sticks onto the ferrule end surface 531, since the connection loss or the reflection thereof increase, the connection characteristics deteriorate. To reduce the wear chip, recently excellent abrasion resistant ceramics such as Zirconia ceramics are used as the material for the alignment sleeve. In this case, however, since the alignment sleeve made of ceramics is brittle and therefore easily broken when a torsional stress beyond a predetermined value is applied to the alignment sleeve by mistake, the alignment sleeve must be easily replaced with a new one.

In the prior-art optical connector jack, however, since the alignment sleeve 504 cannot be easily removed out of the optical connector jack, in case the alignment sleeve 504 is broken, it has been difficult or impossible to remove the alignment sleeve 504 from the end surface (511) side for replacement.

As described above, in the prior-art P-J optical connector, since the alignment sleeve is supported within the optical connector jack, there exist problems in that it is difficult to clean the ferrule end surface and the alignment sleeve inner surface and further difficult to replace the broken alignment sleeve with a new one.

The above-mentioned problems with difficulty in ferrule cleaning and alignment sleeve replacement are serious because the optical connectors are miniaturized at higher arrangement density by reducing the diameters of the ferrule and the alignment sleeve or by making the alignment sleeve of ceramics.

The sixth feature of the optical connector according to the present invention is to provide an optical connector jack easy to clean the ferrule and the alignment sleeve and further easy to replace the alignment sleeve with a new one.

An embodiment of the present invention will be described hereinbelow with reference to the attached drawings.

Figure 33A:
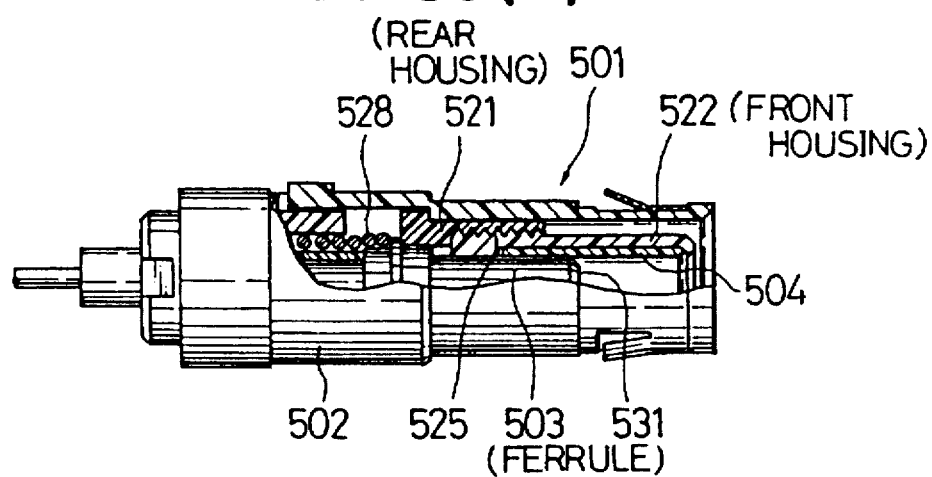
FIG. 33(a) is a cross-sectional view showing a first embodiment of the optical connector jack according to the present invention.
Figure 33C:
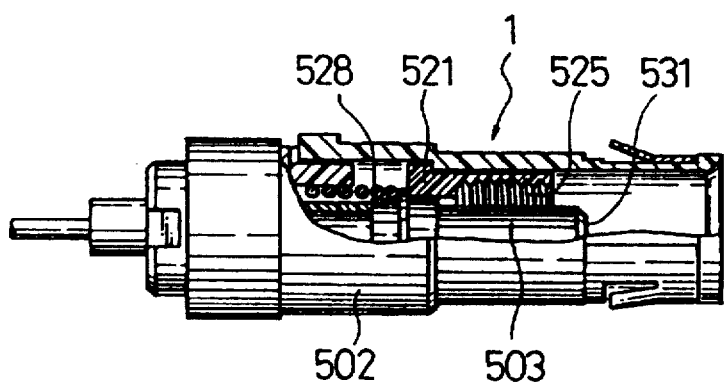
FIG. 33(c) is a cross-sectional view showing the rear housing of the optical connector jack according to the present invention.

FIGS. 33(*a*), (*b*) and (*c*) show an embodiment of the present invention. An optical connector jack 501 includes a jack body 502 within which a rear housing 521 and a front housing 522 are separatably provided. The rear housing 521 and the front housing 522 are both formed into cylindrical shape. The rear housing 521 is formed with a female threaded portion 525 on a front inner circumference thereof as engage means. The front housing 522 is formed with a male threaded portion 523 on a rear outer circumference thereof as engage means. Therefore, when the female threaded portions 525 are engaged with the male threaded portion 523, the front housing 522 and the rear housing 521 are both engaged with each other. Further, when unscrewed, the engagement between the two can be released.

An alignment sleeve 504 is loosely supported within the front housing 522. To prevent removal of the alignment sleeve 504 in the rearward direction, the front housing 522 is formed with a shoulder portion 524 with a smaller inner diameter at the rear side thereof.

The rear housing 521 is formed with a shoulder portion with a smaller inner diameter at the rear side thereof to support the ferrule 503 therewithin. A ferrule 503 is inserted into the front housing 522 and the alignment sleeve 504. An end of an optical fiber 530 is connected to the ferrule 503. Further, the end surface 531 of the ferrule 503 is located frontward from the engagement position between the front housing 522 and the rear housing 521. In other words a housing is engageably or disengageably divided into the front housing 522 and the rear housing 521 at a position rearward from the ferrule end portion 531.

Further, a sprig 528 is provided on the rear side of the ferrule 503 to push the ferrule end surface 531 against another ferrule end surface of an optical connector plug (not shown) within the alignment sleeve 504.

Figure 33B:
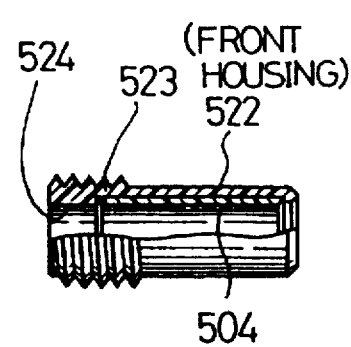
FIG. 33(b) is a cross-sectional view showing the front housing removed from the rear housing of the optical connector jack.
Figure 34A:
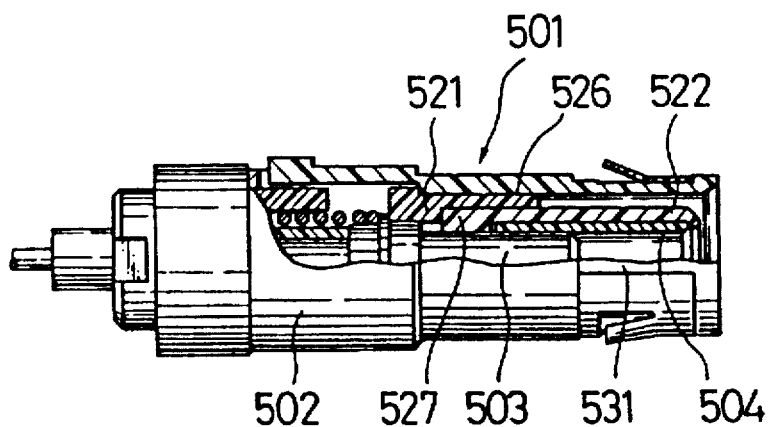
FIG. 34(a) is a partially broken cross-sectional view showing a second embodiment of the optical connector jack according to the present invention.
Figure 34B:
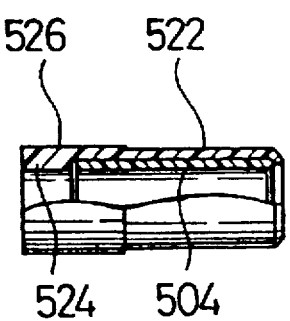
FIG. 34(b) is a cross-sectional view showing the front housing.

In the optical connector jack of the present invention, the structure is such that the front housing 522 can be easily removed from the rear housing 521 by loosening the engagement between the female threaded portion 525 and the male threaded portion 523 as shown in FIGS. 33(b) and (c). Further, when the female threaded portion 525 and the male threaded portion 523 are fastened each other, the rear housing 521 and the front housing 522 can be securely engaged with each other.

Therefore, when the front housing 522 is removed from the rear housing 521 of the optical connector jack 501, since the alignment sleeve 504 is loosely supported within the front housing 522, it is possible to easily remove the alignment sleeve 504 from the front housing 522 for replacement with a new one.

Further, when the front housing 522 is removed from the rear housing 521, since the end surface 531 of the ferrule 503 projects from the rear housing 521, it is possible to easily clean the ferrule 503 by use of a cotton swab, for instance without inserting the cotton swab into the alignment sleeve 504 with a small inner diameter.

A second embodiment of the present invention will be described in detail with reference to FIGS. 35(a) and (b).

In this embodiment, a frictional force is utilized as engage means between the rear housing 521 and the front housing 522.

That is, the front housing 526 has an outer friction engage portion 526 at the rear outer circumferential surface thereof, and the rear housing 521 has an inner-friction engage portion 527 (whose inner diameter is a little smaller than that of the outer frictional engage portion 526) at the front inner circumferential surface thereof. Therefore, the two friction engage portions 526 and 527 are fitted to each other for frictional connection. The construction other than the above is the same as in the first embodiment.

Therefore, when the front housing 522 is removed from the rear housing 521 against the frictional force between the two friction engagement portions 526 and 527, the alignment sleeve 504 supported within the front housing 522 can be easily replaced with a new one, and further the end surface 531 of the ferrule 503 projecting from the rear housing 521 can be easily cleaned by a cotton swab, for instance.

Figure 35:
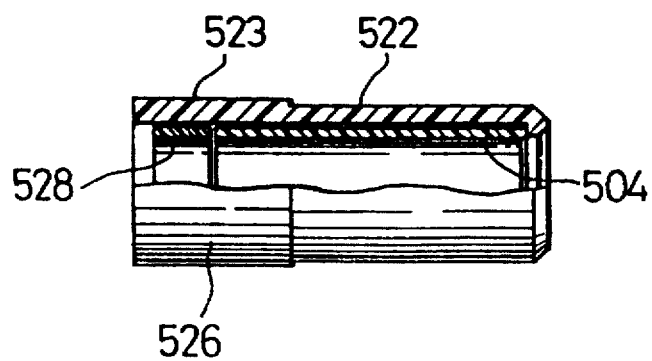

Further, in the above first and second embodiments, the shoulder portion 524 of the front housing 522 is formed integral with the front housing 522. Without being limited thereto, however, it is also possible to provide another ring 528 within the front housing 522 in place of the shoulder portion 524, as shown in FIG. 35. In this case, the ring 528 is friction fitted into the front housing 522 by determining the outer diameter thereof to be a little larger than the inner diameter of the front housing 522. Since the ring 528 also can be removed, it is possible to more easily replace the alignment sleeve 504 with a new one.

FIGS. 36(a), (b) and (c), FIG. 37 and FIG. 38 show a third embodiment of the present invention.

This embodiment relates to a plug-in optical connector by which a plurality of optical fibers can be connector or disconnected simultaneously.

As shown in FIGS. 36(a), (b) and (c), this plug-in optical connector is composed of a package connector 506 attached to a package board 508 and a back panel connector 507 attached to the back panel 509. A plurality of optical connector jacks 501 are attached to the package connector 506, and a plurality of optical connector plugs 505 coupled with the jacks 501 are attached to the back panel connector 507.

As shown in FIGS. 37(a) and 37(b), the optical connector jack 501 is composed of the jack body 502, the rear housing 521, and the front housing 522. The rear housing 521 is attached to the front portion of the jack body 502. The front housing 522 is friction fitted to the front portion of the rear housing 521 so as to be engaged with and disengaged from each other. Within the cylindrical front housing 522, the alignment sleeve 504 is supported. Within the rear housing 521, the ferrule 503 is supported. The ferrule 503 is inserted into the alignment sleeve 504. The ferrule end surface 531 is located frontward from the engagement position between the rear housing 521 and the front housing 522. A small-diameter portion 524 is formed at the rear inner circumference of the front housing 522 to prevent the alignment sleeve 504 from being removed. The spring 528 is provided within the rear housing 521 to urge the ferrule 503 frontward.

Therefore, when the package connector 506 and the back panel connector 507 are connected by locating the optical connector jacks 501 and the optical connector plugs 505 as shown in FIG. 36(b), the ferrule 503A can be inserted into the alignment sleeve 504, so that the optical fibers can be coupled.

Further, as shown in FIG. 38, when the front housing 522 is removed from the rear housing 521 against the frictional force, the alignment sleeve 504 supported within the front housing 522 can be easily replaced with a new one, and further the end surface 531 of the ferrule 503 projecting from the rear housing 521 can be easily cleaned by use of a cotton swab, for instance.

Further, in the above embodiments, although the front and rear housings can be engaged or disengaged by means of threaded portions or friction surface portions. Without being limited thereto, it is possible to adapt other means for securely engage and easily disengage these two housings with and from each other.

As described above, in the optical connector jack according to the present invention, since the housing is divided into the front and rear housings, when the front housing is removed from the rear housing, the alignment sleeve can be replaced with a new one. In this case, since the ferrule end surface projects from the rear housing, the ferrule end surface can be easily cleaned. Therefore, in case the alignment sleeve is broken, the broken alignment sleeve can be replaced; and if the optical connector jack is deteriorated in the connection loss, the connection loss can be restored by cleaning the ferrule end surface.

In particular, when the diameters of the ferrule and the alignment sleeve are reduced, it is possible to facilitate maintenance of the optical connector jack. Therefore, when the characteristics of the optical connector jacks are deteriorated, it is possible to restore the jack connection characteristics by cleaning the ferrules or by replacing the alignment sleeves, without replacing the overall package board.

An embodiment of the plug-in optical connector to which the first to fifth futures according to the present invention are realized will be described hereinbelow with reference to FIGS. 39 to 43.

In this embodiment, the first connector 30 is attached to the package board 1 and the second connector 31 is attached to the back panel 5, being different from the embodiment shown in FIGS. 2 and 3.

Figure 40A:
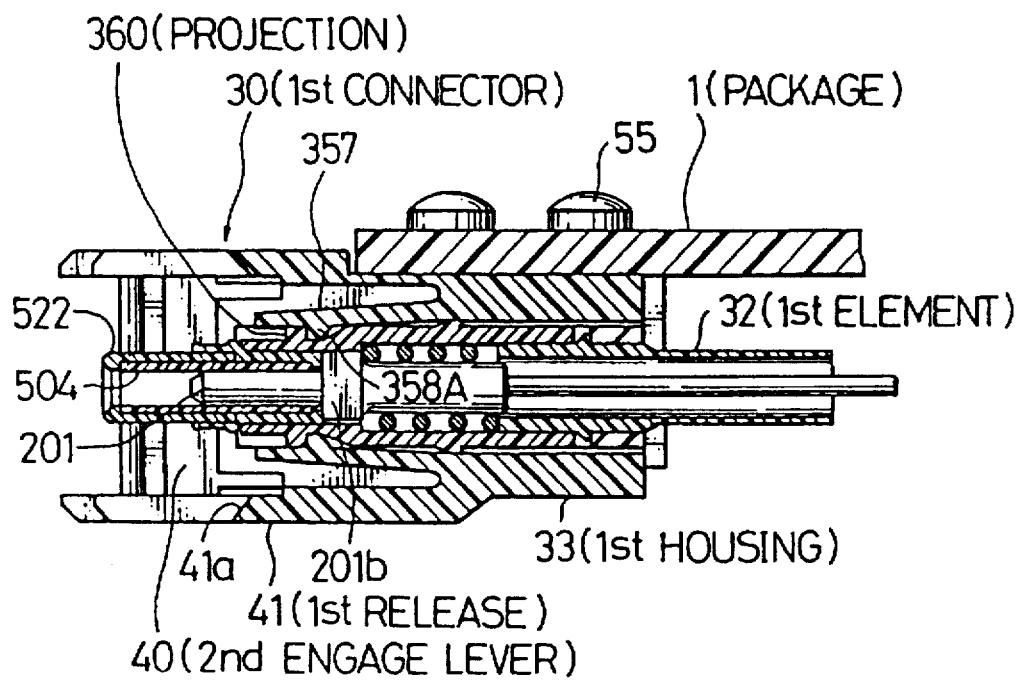
FIG. 40(a) is an enlarged transversal cross-sectional view showing the essential portions of the same optical connector.
Figure 40B:
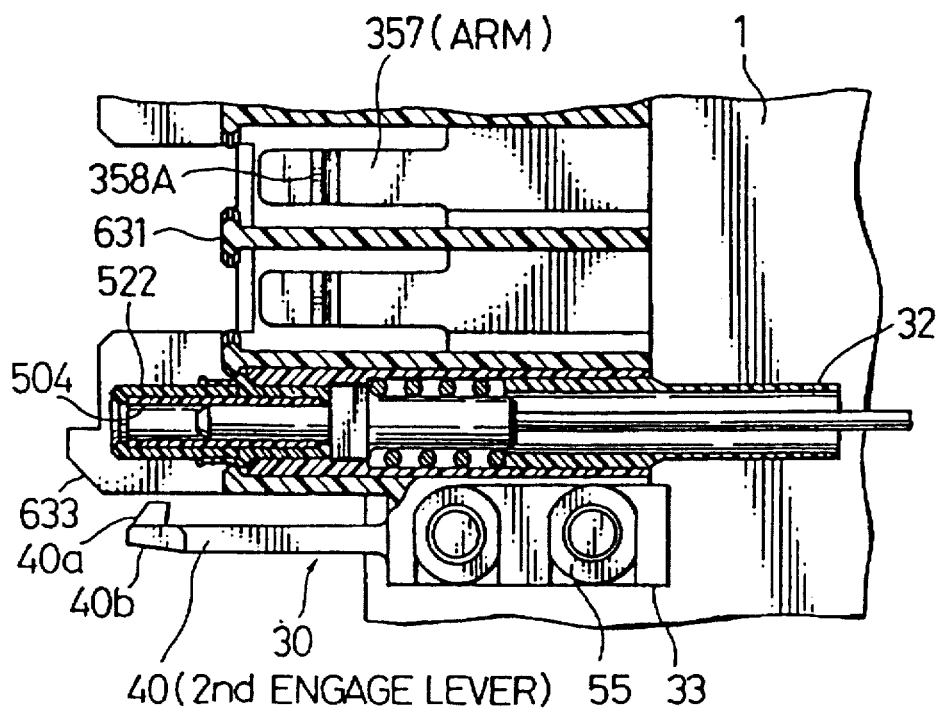
FIG. 40(b) is an enlarged longitudinal cross-sectional view showing the same optical connector.
Figure 42A:
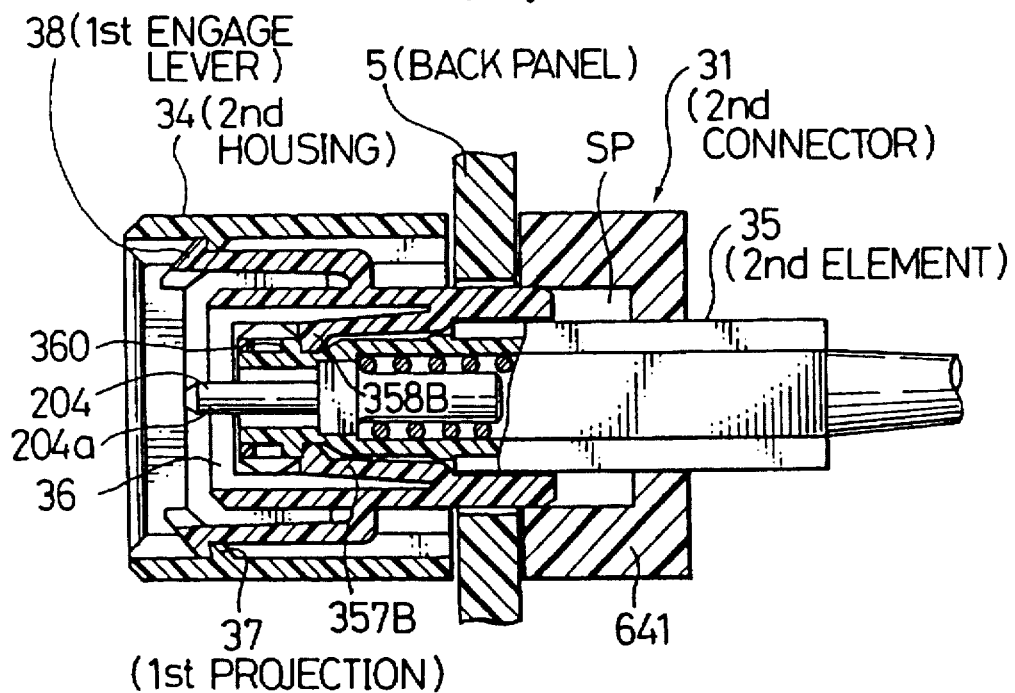
FIG. 42(a) is an enlarged transversal cross-sectional view showing the essential portions of the same optical connector.
Figure 42B:
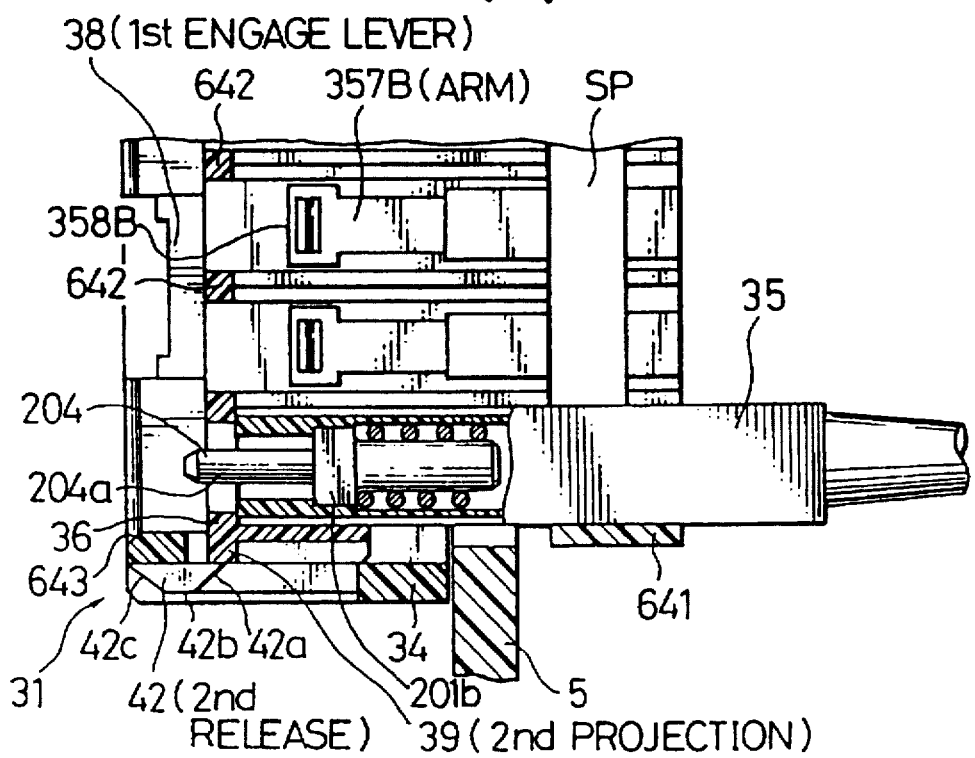
FIG. 42(b) is an enlarged longitudinal cross-sectional view showing the same optical connector.
Figure 43:
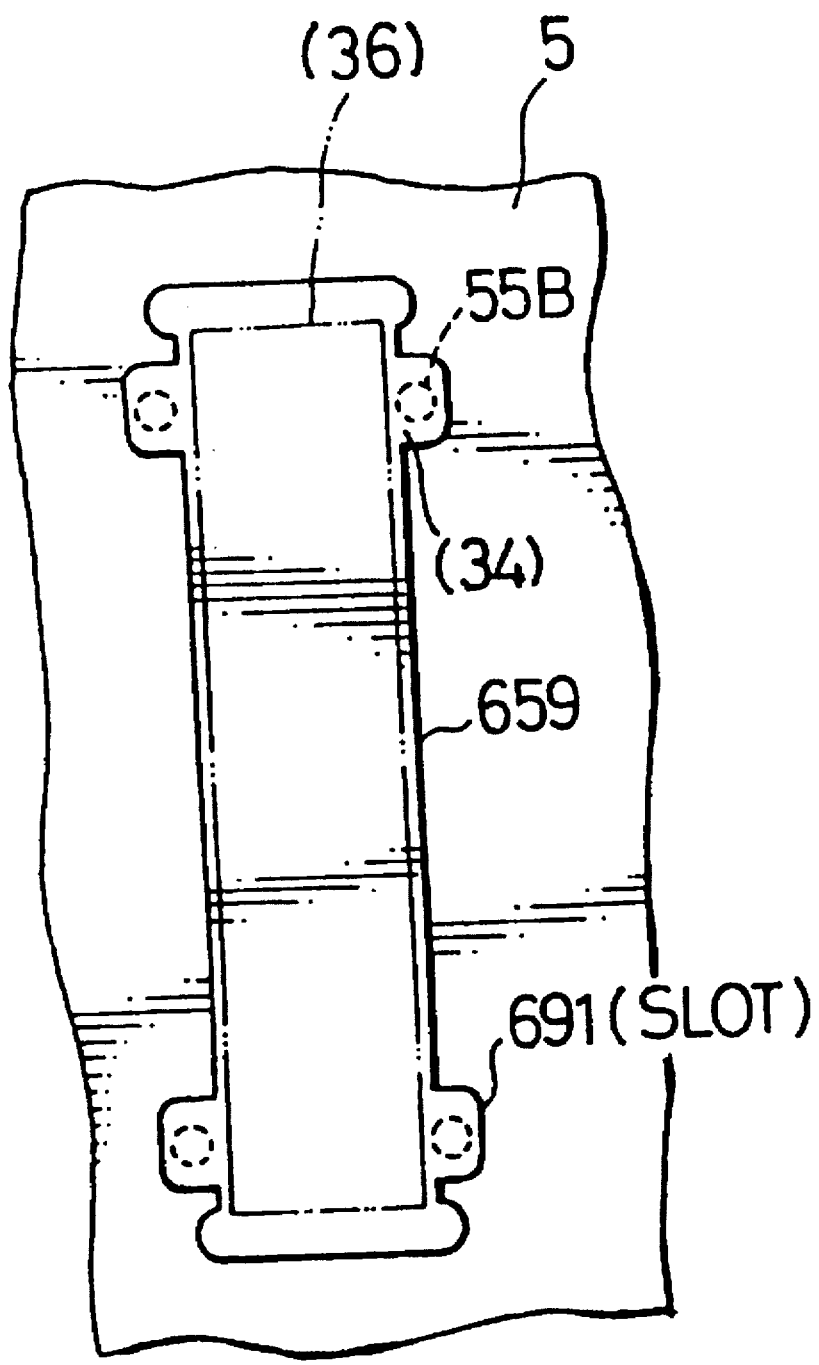
FIG. 43 is an illustration for assistance in explaining the floating structure of the second connector relative to the back panel.

FIGS. 39(a) to (d) are left side, partially broken cross-sectional front, right side, and top views, respectively showing the first connector. FIGS. 40(a) and (b) are enlarged cross-sectional views showing the essential portions of the first connector, in which FIG. 40(a) is a transversal cross-sectional view and FIG. 40(b) is a longitudinal cross-sectional view thereof. FIGS. 41(a) to (d) are left side, partially broken cross-sectional front, right side, and top views, respectively showing the second connector. FIGS. 42(a) and (b) are enlarged cross-sectional views showing the essential portions of the second connector, in which FIG. 42(a) is a transversal cross-sectional view and FIG. 42(b) is a longitudinal cross-sectional view thereof. FIG. 43 is a plan view showing a back panel.

With reference to FIGS. 39(a) to (d), the first connector 30 having the first housing 33 is fixed to the package board 1 with screws 55. The first housing 33 is formed with the second elastic engage levers 40 on the upper and lower surfaces thereof. In the same way as shown in FIG. 2, the second elastic engage lever 40 is formed with the claw portion 40a and two side projection portions 40b. Further, the first housing 33 is also formed with the first release members 41 having the inclined surfaces 41a.

Within the first housing 33, there are provided partitions 632 for supporting the first optical connector element (plug) 32 having a ferrule 201 therebetween as shown in FIG. 40(a), and elastic arms 357A each having a claw portion 358A (as shown in FIG. 24) for holding the first optical connector element 32 therebetween. Further, the first housing 33 is formed with crosspiece members 631 connected to the partitions 632 to hold the front housings (sleeve holders) 522 (as shown in FIG. 33) into each of which the alignment sleeve 504 is inserted. Further, in FIG. 39(b), chamfered insertion guide corners 633 are formed in the first housing 30. In FIGS. 40(a) and (b), two engage projections 360 (as shown in FIG. 24) are formed in each first optical connector element 32.

With reference to FIGS. 41(a) to (d), the second connector 31 floatingly supported on the back panel 5 is composed of the second housing 34, the third housing 36 and a reverse side housing 641.

As shown in FIGS. 41(d) and 43, a roughly square mounting opening 659 is formed in the pack panel 5. Near the four corners of the mounting opening 659, four screw supporting slots 691 are formed. Each slot 691 is formed with two widths wider than the diameter of floating screws 55B in both the horizontal and vertical directions. The second connector 31 is floatingly supported in such a way that the back panel 5 is sandwiched between the second housing 34 and the reverse side housing 641 with the floating axles (55B) and screws 55C. Therefore, the second connector 31 is floatingly supported by the back panel 5 with a clearance between the diameter of the floating axles 55B and the width of the screw supporting slots 691, and the third housing 36 is slidably supported within both the second housing 34 and the reverse side housing 641 so as to pass through the mounting opening 659.

The third housing 36 is formed with the first elastic engage levers 38 and the second projections 39. As shown in FIG. 42(a), when the second housing 34 is not engaged with the first housing 33, the first elastic engage levers 38 of the third housing 36 are engaged with the first projections 37 of the second housing 34 in the same way as shown in FIG. 3(a). On the other hand, when the second housing 34 is engaged with the first housing 33, the first elastic engage levers 38 of the third housing 36 are disengaged from the first projections 37 of the second housing 34, so that the third housing 36 is slidable within the second housing 34 in the horizontal direction in FIG. 41(b). To allow the third housing 36 to be slidable, a space SP is formed between the second housing 34 and the reverse side housing 641.

The second projections 39 of the third housing 36 are engaged with the claw portions 40a of the second elastic engage levers 40 of the first housing 33, when the second housing 34 is connected to the first housing 33. To smoothly engage or disengage the second housing 34 with or from the first housing 33, the second release members 42 are formed in the second housing 34.

Within the third housing 36, there are provided partitions 642 for supporting the second optical connector element (jack) 35 having a ferrule 204 therebetween as shown in FIG. 42(a), and elastic arms 357B each having a claw portion 358B (as shown in FIG. 24) for locking the second optical connector element 35 therebetween.

Further, the second housing 34 is formed with the second release member 42 having two inclined surfaces 42a and 42c and a flat surface 42b.

Within the third housing 36, the second optical connector element 35 is engaged by the second elastic arms 357B. The third housing 36 is engaged with the second housing 34 by the engagement between the first elastic engage levers 38 of the third housing 36 and the first projection portions 37 of the second housing 34.

As already explained, the first connector 30 is fixed to the package board 1 with screws 55. Within the first housing 33, the first optical connector element 32 is held by the elastic arms 357A. In front of the first optical connector element 32, the front housing (sleeve holder) 522 is supported. The alignment sleeve 504 is inserted into the front housing 522 to align the ferrule 201 of the first optical connector element 32 with the ferrule 204 of the second optical connector element 35.

At the front end of the first housing 33, the first inclined surfaces 41a of the first release members 41 are formed to release the engagement between the first elastic engage levers 38 of the third housing 36 and the first projection portions 37 of the second housing 34 when the second connector 31 is connected to the first connector 30.

In the second housing 34 of the second connector 31, the second release members 42, each having the two inclined surfaces 42a and 42c and the flat surface 42b are formed. In the third housing 36, the second projection portions 39 are formed.

On the other hand, within the first housing 33 of the first connector 30, the second elastic engage levers 40 each having the claw portion 40a and two side projections 40b are formed so that the two side projections 40b are brought into contact with the inclined surfaces 42b into engagement with the second projections 39 of the third housing 36 when the second connector 31 is connected to the first connector 30.

Further, the first housing 33 is formed with chamfered corner guide portions 633 and the second housing 34 is formed with the similar chamfered corner guide portions 643 at the end thereof, respectively to allow the two connector housings to be easily connected to each other.

The engage and disengage operation of these connectors is as follows:

Engagement (1) The second housing 34 and the third housing 36 are aligned with the first housing 33,
(2) the side projections 40b of the second elastic engage levers 40 of the first housing 33 are brought into contact with the inclined surfaces 42c of the second release member 42 of the second housing 34 to deform the second elastic engage levers 40;
(3) the ferrules 204 of the second optical connector elements 35 are aligned with the alignment sleeves 504;
(4) the ferrules 204 of the second optical connector elements 35 are brought into contact with the ferrules 201 of the first optical connector elements 32;
(5) the second elastic engage levers 40 of the first housing 33 are engaged with the second projections 39 of the third housing 36;
(6) the engagement between the first projections 37 of the second housing 34 and the first elastic engage levers 38 of the third housing 36 is released; and
(7) the third housing 36 is connected with the first housing 33 so as to be slidable within the second housing 34, thus completing the coupling between the first connector 30 and the second connector 31.

Disengagement (1) the first housing 33 and the third housing 36 are slid together within the second housing 34;
(2) the first elastic engage levers 38 of the third housing 36 are engaged with the first projections 37 of the second housing 34;
(3) the side projections 40b of the second elastic engage levers 40 of the first housing 33 are brought into contact with the inclined surfaces 42a of the second release member 42 of the second housing 34, so that the second elastic engage levers 40 are disengaged from the second projections 39 of the third housing 36;
(4) the ferrules 204 of the second optical connector elements 35 are moved away from the ferrules 201 of the first optical connector elements 32;
(5) the ferrules 204 of the second optical connector elements 35 are removed from the alignment sleeve 504;
(6) the side projections 40b of the second elastic engage levers 40 are moved away from the inclined surfaces 42c of the second release members 42 of the second housing 34; and
(7) the second housing 34 and the third housing 36 are removed together from the first housing 33, thus completing the decoupling between the first connector 30 and the second connector 31.

What is claimed is:

1. An optical connector, comprising:
   (a) an adapter housing (311) provided with an inner elastic lever arm (324) axially extending inwardly in the direction from outside to inside and having a claw (325) formed with an insertion inclined surface (329), an engage surface (326), and a side projection portion (328) at a free end thereof;
   (b) a plug housing (315) connected to an end of an optical fiber (317) and coupled to said optical adapter, said plug housing having an outer engage projection (318); and
   (c) a knob block (316) slidably fitted between said optical adapter and said plug housing, said knob block having an outer release projection (321) formed with an engage inclined surface (319) and a release inclined surface (320).

2. The optical connector of claim 1, wherein when said plug housing (315) is coupled to said optical adapter (311), the engage inclined surface (319) of the outer release projection (321) of said knob block (316) is brought into contact with the side projection portion (328) of said inner elastic lever arm (324) of said optical adapter (311) to outwardly deform said inner lever arm to engage said outer engage projection (318) with the engage surface (326) of said inner elastic arm (324); when said optical plug housing (315) is decoupled from said optical adapter, the release inclined surface (320) of the outer release projection (321) is brought into contact with the side projection portion (328) of said inner elastic lever arm (324) to outwardly deform said inner lever arm to disengage said inner elastic arm (324) from said engage projection (318).

* * * * *